United States Patent
Lee et al.

(10) Patent No.: US 12,552,817 B2
(45) Date of Patent: *Feb. 17, 2026

(54) BORON COMPOUND AND ORGANIC LIGHT-EMITTING DIODE COMPRISING SAME

(71) Applicant: SFC CO., LTD., Cheongju-si (KR)

(72) Inventors: Se-Jin Lee, Cheongju-si (KR); Yeong-Tae Choi, Cheongju-si (KR); Ji-Young Kim, Cheongju-si (KR); Kyungtae Kim, Cheongju-si (KR); Myeong-Jun Kim, Cheongju-si (KR); Kyeong-Hyeon Kim, Cheongju-si (KR)

(73) Assignee: SFC CO., LTD., Cheongju-si (KR)

( * ) Notice: Subject to any disclaimer, the term of this patent is extended or adjusted under 35 U.S.C. 154(b) by 895 days.

This patent is subject to a terminal disclaimer.

(21) Appl. No.: 17/778,751

(22) PCT Filed: Feb. 4, 2021

(86) PCT No.: PCT/KR2021/001503
§ 371 (c)(1),
(2) Date: May 20, 2022

(87) PCT Pub. No.: WO2021/162347
PCT Pub. Date: Aug. 19, 2021

(65) Prior Publication Data
US 2023/0039080 A1    Feb. 9, 2023

(30) Foreign Application Priority Data
Feb. 13, 2020    (KR) .................. 10-2020-0017609

(51) Int. Cl.
*C07F 5/02*    (2006.01)
*H10K 85/30*    (2023.01)

(52) U.S. Cl.
CPC ........... *C07F 5/027* (2013.01); *H10K 85/322* (2023.02)

(58) Field of Classification Search
None
See application file for complete search history.

(56) References Cited

U.S. PATENT DOCUMENTS 12,291,543 B2 *   5/2025  Lee .................. H10K 85/6576
2021/0408390 A1 * 12/2021  Lee .......................... C07F 5/027

FOREIGN PATENT DOCUMENTS

| CN | 107417715 A | 12/2017 |
| CN | 113015738 A | 6/2021 |
| EP | 3885350 A1 | 9/2021 |
| EP | 4123735 A1 | 1/2023 |

(Continued)

OTHER PUBLICATIONS

The extended European search report of EP 21 75 3123, Mar. 18, 2024.

(Continued)

*Primary Examiner* — Amy C Bonaparte
(74) *Attorney, Agent, or Firm* — STIP Law Group, LLC

(57) ABSTRACT

The present disclosure relates to a boron compound useful in an organic light-emitting diode and an organic light-emitting diode comprising same and, more particularly, to a boron compound represented by [Chemical Formula A], wherein [Chemical Formula A] is as defined in the description.

19 Claims, 1 Drawing Sheet

(56) References Cited

FOREIGN PATENT DOCUMENTS

| | | |
|---|---|---|
| EP | 4148049 A1 | 3/2023 |
| KR | 20160119683 A | 10/2016 |
| KR | 20170122296 A | 11/2017 |
| KR | 20170130435 A | 11/2017 |
| KR | 102053569 B1 | 12/2019 |
| WO | WO2017188111 A1 | 11/2017 |
| WO | WO2018095397 A1 | 5/2018 |
| WO | WO2020009467 A1 | 1/2020 |
| WO | WO2020105990 A1 | 5/2020 |

OTHER PUBLICATIONS

International search report of PCT/KR2021/001503, May 10, 2021, English translation of abstract.

* cited by examiner

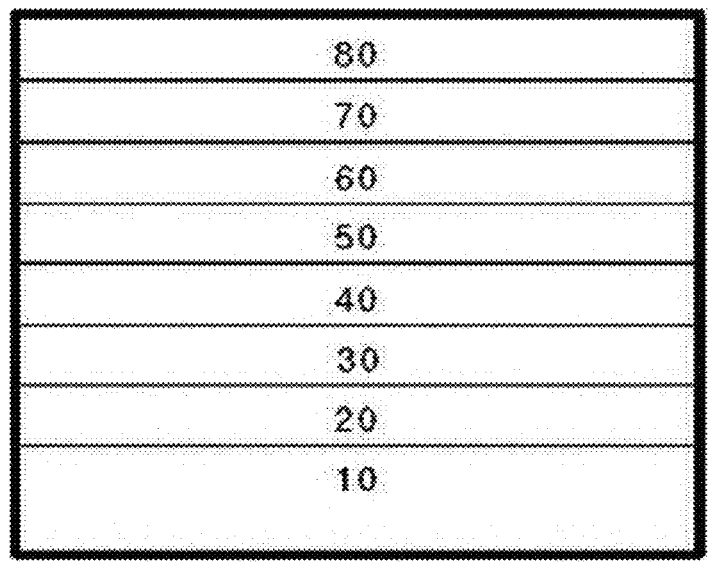

BORON COMPOUND AND ORGANIC LIGHT-EMITTING DIODE COMPRISING SAME

CROSS-REFERENCE TO RELATED APPLICATIONS

This application is the U.S. National Phase under 35 U.S.C. § 371 of International Application No. PCT/KR2021/001503 filed on Feb. 4, 2021, which in turn claims the benefit of Korean Application No. 10-2020-0017609 filed on Feb. 13, 2020, the disclosures of which are incorporated by reference into the present application.

TECHNICAL FIELD

The present disclosure relates to a novel boron compound useful for an organic light-emitting diode and, more particularly, to a novel boron compound that can be used as a dopant material in an organic light-emitting diode and allow for excellent diode characteristics including high luminous efficiency and low driving voltage, and an organic light-emitting diode comprising the boron compound.

BACKGROUND ART

Organic light-emitting diodes (OLEDs), based on self-luminescence, are used to create digital displays with the advantage of having a wide viewing angle and being able to be made thinner and lighter than liquid crystal displays. In addition, an OLED display exhibits a very fast response time. Accordingly, OLEDs find applications in the full color display field or the illumination field.

In general, the term "organic light-emitting phenomenon" refers to a phenomenon in which electrical energy is converted to light energy by means of an organic material. An organic light-emitting diode using the organic light-emitting phenomenon has a structure usually including an anode, a cathode, and an organic material layer interposed therebetween. In this regard, the organic material layer may have, for the most part, a multilayer structure consisting of different materials, for example, a hole injection layer, a hole transport layer, a light-emitting layer, an electron transport layer, and an electron injection layer in order to enhance the efficiency and stability of the organic light-emitting diode. In the organic light-emitting diode having such a structure, application of a voltage between the two electrodes injects a hole from the anode and an electron from the cathode to the organic layer. In the luminescent zone, the hole and the electron recombine to produce an exciton. When the exciton returns to the ground state from the excited state, the molecule of the organic layer emits light. Such an organic light-emitting diode is known to have characteristics such as self-luminescence, high luminance, high efficiency, low driving voltage, a wide viewing angle, high contrast, and high-speed response.

Materials used as organic layers in OLEDs may be divided according to functions into luminescent materials and charge transport materials, for example, a hole injection material, a hole transport material, an electron transport material, and an electron injection material and, as needed, further into an electron-blocking material or a hole-blocking material.

As for the luminescent materials, there are two main families of OLED: those based on small molecules and those employing polymers. The light-emitting mechanism forms the basis of classification of luminescent materials as fluorescent and phosphorescent materials, which use excitons in singlet and triplet states, respectively.

When a single material is employed as the luminescent material, intermolecular actions cause the maximum luminescence wavelength to shift toward a longer wavelength, resulting in a reduction in color purity and luminous efficiency due to light attenuation. In this regard, a host-dopant system may be used as a luminescent material so as to increase the color purity and the luminous efficiency through energy transfer.

This is based on the principle whereby, when a dopant which is smaller in energy band gap than a host forming a light-emitting layer is added in a small amount to the light-emitting layer, excitons are generated from the light-emitting layer and transported to the dopant, emitting light at high efficiency. Here, light with desired wavelengths can be obtained depending on the kind of the dopant because the wavelength of the host moves to the wavelength range of the dopant.

Meanwhile, studies have been made to use boron compounds as dopant compounds. With regard to related art pertaining to the use of boron compounds, reference may be made to Korean Patent No. 10-2016-0119683 A (Oct. 14, 2016), which discloses an organic light-emitting diode employing a novel polycyclic aromatic compound in which multiple aromatic rings are connected via boron and oxygen atoms. In addition, International Patent No. WO 2017/188111 (Nov. 2, 2017) disclosed an organic light emitting diode in which a compound structured to connect multiple polycondensed aromatic rings via boron and nitrogen atoms is used as a dopant in a light emitting layer while an anthracene derivative is used as a host.

Despite a variety of kinds of compounds prepared for use in light emitting layers in organic light emitting diodes including the related arts, there is still a continuing need to develop a novel compound that allows an OLED to be stably driven at a lower voltage and exhibits high efficiency, and an OLED including the same.

DISCLOSURE

Technical Problem

Therefore, an aspect of the present disclosure is to provide a W boron compound having a novel structure which can be used as a dopant material in a light-emitting layer of an organic light-emitting diode.

In addition, another aspect of the present disclosure is to provide an organic light-emitting diode (OLED) having the boron compound applied as a dopant material therein and exhibiting excellent diode characteristics including high luminous efficiency and low-voltage driving.

Technical Solution

In order to accomplish the purposes, the present disclosure provides a boron compound represented by the following Chemical Formula A:

[Chemical Formula A]

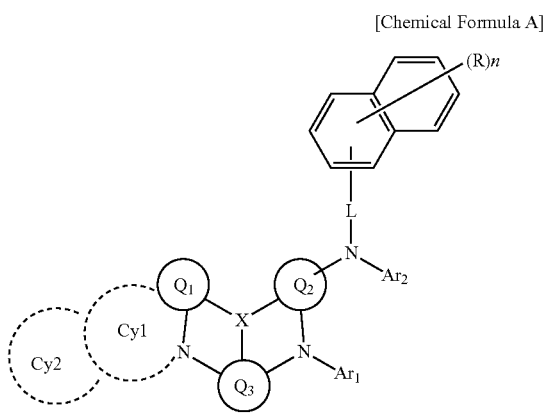

wherein,
Q₁ to Q₃, which may be the same or different, are each independently a substituted or unsubstituted aromatic hydrocarbon ring of 6 to 50 carbon atoms, or a substituted or unsubstituted heteroaromatic ring of 2 to 50 carbon atoms,
X is any one selected from B, P, P=O, and P=S,
Ar₁, Ar₂, and R, which may be the same or different, are each independently any one selected from a hydrogen atom, a deuterium atom, a substituted or unsubstituted, linear, branched, or cyclic alkyl of 1 to 30 carbon atoms, a substituted or unsubstituted, linear, branched, or cyclic halogenated alkyl of 1 to 30 carbon atoms, a substituted or unsubstituted aryl of 6 to 50 carbon atoms, a substituted or unsubstituted heteroaryl of 2 to 50 carbon atoms, a substituted or unsubstituted alkoxy of 1 to 30 carbon atoms, a substituted or unsubstituted aryloxy of 6 to 30 carbon atoms, a substituted or unsubstituted alkylthio of 1 to 30 carbon atoms, a substituted or unsubstituted arylthio of 5 to 30 carbon atoms, a substituted or unsubstituted alkylamine of 1 to 30 carbon atoms, a substituted or unsubstituted arylamine of 5 to 30 carbon atoms, a substituted or unsubstituted alkylsilyl of 1 to 30 carbon atoms, a substituted or unsubstituted arylsilyl of 6 to 30 carbon atoms, a nitro, a cyano, and a halogen,
Ar₁ may be connected to the Q₂ ring moiety or Q₃ ring moiety to form an additional mono- or polycyclic aliphatic or aromatic ring,
n is an integer of 1 to 7 wherein when n is two or greater, the corresponding R's are same or different,
L, which functions as a linker, is any one selected from a single bond, a substituted or unsubstituted arylene of 6 to 30 carbon atoms, and a substituted or unsubstituted heteroarylene of 1 to 30 carbon atoms,
'Cy1' is connected to each of the nitrogen (N) atom and the aromatic carbon atom in the Q1 ring to form a condensed ring, and the ring formed by Cy1 is a substituted or unsubstituted alkylene group of 1 to 10 carbon atoms except for the nitrogen (N) atom, the aromatic carbon atom in the Q1 ring to which the nitrogen (N) atom is bonded, and the aromatic carbon atom in the Q1 ring to which Cy1 is bonded, and 'Cy2' is added to Cy1 to form a saturated hydrocarbon ring, and the ring formed by Cy2 is a substituted or unsubstituted alkylene group of 1 to 10 carbon atoms except for the carbon atoms from Cy1.

Advantageous Effects

When used as a dopant material, the novel compound according to the present disclosure allows for the provision of an organic light-emitting diode that can be driven at a lower voltage with improved luminous efficiency, compared to conventional organic light-emitting diodes.

BRIEF DESCRIPTION OF THE DRAWINGS

FIGURE is a schematic diagram of an organic light-emitting diode according to some embodiments of the present disclosure.

BEST MODE FOR CARRYING OUT THE INVENTION

Below, a detailed description will be given of the present disclosure. In each drawing of the present disclosure, sizes or scales of components may be enlarged or reduced from their actual sizes or scales for better illustration, and known components may not be depicted therein to clearly show features of the present disclosure. Therefore, the present disclosure is not limited to the drawings. When describing the principle of the embodiments of the present disclosure in detail, details of well-known functions and features may be omitted to avoid unnecessarily obscuring the presented embodiments.

In the drawing, for convenience of description, sizes of components may be exaggerated for clarity. For example, since sizes and thicknesses of components in drawings are arbitrarily shown for convenience of description, the sizes and thicknesses are not limited thereto. Furthermore, throughout the description, the terms "on" and "over" are used to refer to the relative positioning, and mean not only that one component or layer is directly disposed on another component or layer but also that one component or layer is indirectly disposed on another component or layer with a further component or layer being interposed therebetween. Also, spatially relative terms, such as "below", "beneath", "lower", and "between" may be used herein for ease of description to refer to the relative positioning.

Throughout the specification, when a portion may "include" a certain constituent element, unless explicitly described to the contrary, it may not be construed to exclude another constituent element but may be construed to further include other constituent elements. Further, throughout the specification, the word "on" means positioning on or below the object portion, but does not essentially mean positioning on the lower side of the object portion based on a gravity direction.

The present disclosure provides a boron compound represented by the following Chemical Formula A:

[Chemical Formula A]

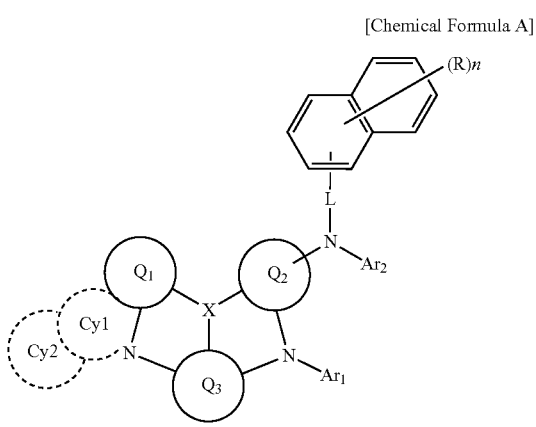

wherein,
$Q_1$ to $Q_3$, which may be the same or different, are each independently a substituted or unsubstituted aromatic hydrocarbon ring of 6 to 50 carbon atoms, or a substituted or unsubstituted heteroaromatic ring of 2 to 50 carbon atoms, X is any one selected from B, P, P=O, and P=S, $Ar_1$, $Ar_2$, and R, which may be the same or different, are each independently any one selected from a hydrogen atom, a deuterium atom, a substituted or unsubstituted, linear, branched, or cyclic alkyl of 1 to 30 carbon atoms, a substituted or unsubstituted, linear, branched, or cyclic halogenated alkyl of 1 to 30 carbon atoms, a substituted or unsubstituted aryl of 6 to 50 carbon atoms, a substituted or unsubstituted heteroaryl of 2 to 50 carbon atoms, a substituted or unsubstituted alkoxy of 1 to 30 carbon atoms, a substituted or unsubstituted aryloxy of 6 to 30 carbon atoms, a substituted or unsubstituted alkylthio of 1 to 30 carbon atoms, a substituted or unsubstituted arylthio of 5 to 30 carbon atoms, a substituted or unsubstituted alkylamine of 1 to 30 carbon atoms, a substituted or unsubstituted arylamine of 5 to 30 carbon atoms, a substituted or unsubstituted alkylsilyl of 1 to 30 carbon atoms, a substituted or unsubstituted arylsilyl of 6 to 30 carbon atoms, a nitro, a cyano, and a halogen, $Ar_1$ may be connected to the $Q_2$ ring moiety or $Q_3$ ring moiety to form an additional mono- or polycyclic aliphatic or aromatic ring, n is an integer of 1 to 7 wherein when n is two or greater, the corresponding R's are same or different, L, which functions as a linker, is any one selected from a single bond, a substituted or unsubstituted arylene of 6 to 30 carbon atoms, and a substituted or unsubstituted heteroarylene of 1 to 30 carbon atoms, 'Cy1' is connected to each of the nitrogen (N) atom and the aromatic carbon atom in the Q1 ring to form a condensed ring, and the ring formed by Cy1 is a substituted or unsubstituted alkylene group of 1 to 10 carbon atoms except for the nitrogen (N) atom, the aromatic carbon atom in the Q1 ring to which the nitrogen (N) atom is bonded, and the aromatic carbon atom in the Q1 ring to which Cy1 is bonded, and 'Cy2' is added to Cy1 to form a saturated hydrocarbon ring, and the ring formed by Cy2 is a substituted or unsubstituted alkylene group of 1 to 10 carbon atoms except for the carbon atoms from Cy1.

wherein, the term "substituted" in the expression "substituted or unsubstituted" used for the compound of Chemical Formula A means having at least one substituent selected from the group consisting of a deuterium atom, a cyano, a halogen, a hydroxy, a nitro, a linear, branched, or cyclic alkyl of 1 to 24 carbon atoms, a linear, branched, or cyclic halogenated alkyl of 1 to 24 carbon atoms, an alkenyl of 2 to 24 carbon atoms, an alkynyl of 2 to 24 carbon atoms, a heteroalkyl of 1 to 24 carbon atoms, an aryl of 6 to 24 carbon atoms, an arylalkyl of 7 to 24 carbon atoms, an alkylaryl of 7 to 24 carbon atoms, a heteroaryl of 2 to 24 carbon atoms, a heteroarylalkyl of 2 to 24 carbon atoms, an alkoxy of 1 to 24 carbon atoms, an alkylamino of 1 to 24 carbon atoms, a diarylamino of 12 to 24 carbon atoms, a diheteroarylamino of 2 to 24 carbon atoms, an aryl(heteroaryl)amino of 7 to 24 carbon atoms, an alkylsilyl of 1 to 24 carbon atoms, an arylsilyl of 6 to 24 carbon atoms, an aryloxy of 6 to 24 carbon atoms, and an arylthionyl of 6 to 24 carbon atoms.

The expression indicating the number of carbon atoms, such as "a substituted or unsubstituted alkyl of 1 to 30 carbon atoms", "a substituted or unsubstituted aryl of 6 to 50 carbon atoms", etc. means the total number of carbon atoms of, for example, the alkyl or aryl radical or moiety alone, exclusive of the number of carbon atoms of substituents attached thereto. For instance, a phenyl group with a butyl at the para position falls within the scope of an aryl of 6 carbon atoms, even though it is substituted with a butyl radical of 4 carbon atoms.

As used herein, the term "aryl" means an organic radical derived from an aromatic hydrocarbon by removing one hydrogen that is bonded to the aromatic hydrocarbon. The aromatic system may include a fused ring that is formed by adjacent substituents on the aryl radical.

Concrete examples of the aryl include phenyl, o-biphenyl, m-biphenyl, p-biphenyl, o-terphenyl, m-terphenyl, p-terphenyl, naphthyl, anthryl, phenanthryl, pyrenyl, indenyl, fluorenyl, tetrahydronaphthyl, perylenyl, chrysenyl, naphthacenyl, and fluoranthenyl. At least one hydrogen atom of the aryl may be substituted by a deuterium atom, a halogen atom, a hydroxy, a nitro, a cyano, a silyl, an amino (—$NH_2$, —NH(R), —N(R') (R") wherein R' and R" are each independently an alkyl of 1 to 10 carbon atoms, in this case, called "alkylamino"), an amidino, a hydrazine, a hydrazone, a carboxyl, a sulfonic acid, a phosphoric acid, an alkyl of 1 to 24 carbon atoms, a halogenated alkyl of 1 to 24 carbon atoms, an alkenyl of 1 to 24 carbon atoms, an alkynyl of 1 to 24 carbon atoms, a heteroalkyl of 1 to 24 carbon atoms, an aryl of 6 to 24 carbon atoms, an arylalkyl of 6 to 24 carbon atoms, a heteroaryl of 2 to 24 carbon atoms, or a heteroarylalkyl of 2 to 24 carbon atoms.

The substituent "heteroaryl" used in the compound of the present disclosure means a hetero aromatic radical of 2 to 24 carbon atoms, bearing one to three heteroatoms selected from among N, O, P, Si, S, Ge, Se, and Te. In the aromatic radical, two or more rings may be fused. One or more hydrogen atoms on the heteroaryl may be substituted by the same substituents as on the aryl.

In addition, the term "heteroaromatic ring", as used herein, refers to an aromatic hydrocarbon ring bearing at least one heteroatom as aromatic ring member. In the heteroaromatic ring, one to three carbon atoms of the aromatic hydrocarbon may be substituted by at least one selected particularly from N, 0, P, Si, S, Ge, Se, and Te.

Unless otherwise defined, the term "alkyl" radicals used in the compounds of the present disclosure refers to a linear, branched, or cyclic saturated aliphatic hydrocarbon radical. In this regard, the cyclic alkyl is intended to encompass not only cycloalkyl radicals alone, but also cycloalkyl radicals having a linear or branched alkyl attached thereto.

For example, a liner or branched alkyl of 1 to 5 carbon atoms includes an alkyl chain of 1 to 5 carbon atoms, that is, may be selected from the group consisting of methyl, ethyl, propyl, isopropyl, isobutyl, n-butyl, sec-butyl, tert-butyl, pentyl, n-isopentyl, sec-pentyl, iso-amyl, hexyl, and t-butylmethyl. At least one hydrogen atom of the alkyl may be substituted by the same substituent as in the aryl.

Concrete examples of the cyclic alkyl radicals used in the compounds of the present disclosure include cyclopropyl, cyclobutyl, cyclopentyl, cyclohexyl, methylcyclopentyl, methylcyclohexyl, ethylcyclopentyl, ethylcyclohexyl, adamantyl, dicyclopentadienyl, decahydronaphthyl, norbornyl, bornyl, and isobornyl. At least one hydrogen atom of the cycloalkyl may be substituted by the same substituent as in the aryl.

The term "alkoxy" radicals used in the compounds of the present disclosure refers to a linear, branched, or cyclic alkyl singularly bonded to oxygen. Concrete examples of the alkoxy include methoxy, ethoxy, propoxy, isobutoxy, sec-butoxy, pentoxy, cyclopentyloxy, iso-amyloxy, hexyloxy, cyclobutyloxy, adamantyloxy, dicyclopentyloxy, bornyloxy, and isobornyloxy. One or more hydrogen atoms on the alkoxy may be substituted by the same substituents as on the aryl.

Examples of the arylalkyl radicals used in the compounds of the present disclosure include phenylmethyl(benzyl), phenylethyl, phenylpropyl, naphthylmethyl, and naphthylethyl. One or more hydrogen atoms on the arylalkyl may be substituted by the same substituents as on the aryl.

Concrete examples of the silyl radicals used in the compounds of the present disclosure include trimethylsilyl, triethylsilyl, triphenylsilyl, trimethoxysilyl, dimethoxyphenylsilyl, diphenylmethylsilyl, diphenylvinlysilyl, methylcyclobutylsilyl, and dimethyl furylsilyl. One or more hydrogen atoms on the silyl may be substituted by the same substituents as on the aryl.

As used herein, the term "alkenyl" refers to a hydrocarbon group containing a carbon-carbon double bond and the term "alkynyl" refers to a hydrocarbon group containing a carbon-carbon triple bond.

As used herein, the term "alkylene" refers to an organic radical regarded as derived from an alkane by removal two hydrogen atoms from one carbon atom for methylene or different carbon atoms for ethylene or higher, such as propylene, isopropylene, isobutylene, sec-butylene, tert-butylene, pentylene, iso-amylene, hexylene, and the like. One or more hydrogen atoms on the alkylene may be substituted by the same substituents as on the aryl.

As used herein, the term "diarylamino" refers to an amine group having aforementioned, two identical or different aryl radicals bonded to the nitrogen atom thereof, the term "diheteroarylamino" to an amine group having two identical or different heteroaryl radicals bonded to the nitrogen atom thereof, and the term "aryl(heteroaryl)amino" to an amine group having the aryl radical and the heteroaryl radical each bonded to the nitrogen atom thereof.

In a specific embodiment of the present disclosure, the term "substituted" in the expression "substituted or unsubstituted" used for the compound of Chemical Formula A means having at least one substituent selected from the group consisting of a deuterium atom, a cyano, a halogen, a hydroxy, a nitro, a linear, branched, or cyclic alkyl of 1 to 12 carbon atoms, a linear, branched, or cyclic halogenated alkyl of 1 to 12 carbon atoms, an alkenyl of 2 to 12 carbon atoms, an alkynyl of 2 to 12 carbon atoms, a heteroalkyl of 1 to 12 carbon atoms, an aryl of 6 to 18 carbon atoms, an arylakyl of 7 to 20 carbon atoms, an alkylaryl of 7 to 20 carbon atoms, a heteroaryl of 2 to 18 carbon atoms, a heteroarylalkyl of 2 to 18 carbon atoms, an alkoxy of 1 to 12 carbon atoms, an alkylamino of 1 to 12 carbon atoms, a diarylamino of 12 to 18 carbon atoms, a diheteroarylamino 2 to 18 carbon atoms, an aryl(heteroaryl)amino of 7 to 18 carbon atoms, an alkylsilyl of 1 to 12 carbon atoms, an arylsilyl of 6 to 18 carbon atoms, an aryloxy of 6 to 18 carbon atoms, and an arylthionyl of 6 to 18 carbon atoms.

In the present disclosure, the boron compound represented by Chemical Formula is technically characterized by the structure in which the $Q_1$ to $Q_3$ ring moieties, which are each independently a substituted or unsubstituted aromatic hydrocarbon ring of 6 to 50 carbon atoms or a substituted or unsubstituted heteroaromatic ring of 2 to 50 carbon atoms, are connected to one another via the central atom (X), with a linkage between the $Q_1$ and the $Q_3$ ring moiety through a nitrogen (N) atom and between the $Q_2$ and the $Q_3$ ring moiety through the nitrogen atom (N) of the linker —N(Ar$_1$)—, wherein the nitrogen atom and the $Q_1$ ring form a fused ring with the saturated alkylene linker Cy1, plus the structural option that the saturated alkylene linker Cy2 is added to Cy1 to form an additional fused ring, wherein an amine group containing at least one substituted or unsubstituted napththyl is bonded to the $Q_2$ ring moiety, whereby the organic light-emitting diode with such a structural characteristic is provided with high efficiency and longevity.

Here, the configuration of the fused rings of Cy1 and Cy2 in Chemical Formula A is elucidated in detail. Cy1 is linked to the nitrogen (N) atom and an aromatic carbon atom of $Q_1$ to which Cy1 is to bond to form a fused ring including the nitrogen atom, the aromatic carbon atom of $Q_1$ to which the nitrogen (N) atom is connected, and the aromatic carbon atom of $Q_1$ to which Cy1 is to bond, wherein the ring formed by Cy1 is a substituted or unsubstituted alkylene of 1 to 10 carbon atoms, particularly a substituted or unsubstituted alkylene of 2 to 7 atoms, and more particularly a substituted or unsubstituted alkylene of 2 to 5 carbon atoms, except for the nitrogen (N) atom, the aromatic carbon atom of $Q_1$ to which the nitrogen (N) atom is connected, and the aromatic carbon atom of $Q_1$ to which Cy1 is to bond.

In addition, "Cy2" in Chemical Formula A may be, except for the carbon atoms included in Cy1, a substituted or unsubstituted alkylene of 1 to 10 carbon atoms, particularly a substituted or unsubstituted alkylene of 2 to 7 carbon atoms, and more particularly a substituted or unsubstituted alkylene of 2 to 5 the opposite ends of which are bonded to two carbon atoms of the substituted or unsubstituted alkylene of Cy1 to form a ring fused to Cy1.

In an embodiment, Ar$_1$ may be a substituted or unsubstituted aryl of 6 to 18 carbon atoms or a substituted or unsubstituted heteroaryl of 2 to 18 carbon atoms.

Here, when Ar$_1$ is a substituted or unsubstituted aryl of 6 to 18 carbon atoms, it may be represented by Structural Formula A, below:

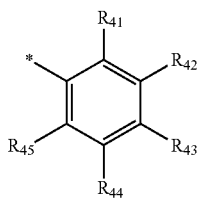

[Structural Formula A]

wherein "-*" denotes a bonding site at which $Ar_1$ bonds to the nitrogen (N) atom, and $R_{41}$ to $R_{45}$, which may be the same or different, are each independently any one selected from a hydrogen atom, a deuterium atom, a substituted or unsubstituted linear, branched, or cyclic alkyl of 1 to 24 carbon atoms, a substituted or unsubstituted aryl of 6 to 24 carbon atoms, a substituted or unsubstituted heteroaryl of 2 to 24 carbon atoms, a substituted or unsubstituted alkoxy of 1 to 24 carbon atoms, a substituted or unsubstituted aryloxy of 6 to 24 carbon atoms, a substituted or unsubstituted alkylamine of 1 to 24 carbon atoms, a substituted or unsubstituted arylamine of 6 to 24 carbon atoms, a substituted or unsubstituted akylsilyl of 1 to 24 carbon atoms, a substituted or unsubstituted arylsilyl of 6 to 24 carbon atoms, a nitro, a cyano, and a halogen, and a linkage may be formed between any adjacent two of $R_{41}$ to $R_{45}$ or between any one of $R_{41}$ to $R_{45}$ and $Q_2$ or $Q_3$ to form an additional mono- or polycyclic aliphatic or aromatic ring.

In an embodiment, $Ar_2$ in Chemical Formula A may be a substituted or unsubstituted aryl of 6 to 18 carbon atoms or a substituted or unsubstituted heteroaryl of 2 to 18 carbon atoms.

In an embodiment, the linker L in Chemical Formula A may be a single bond or a substituted or unsubstituted arylene of 6 to 18 carbon atoms.

In addition, the central atom X in Chemical Formula A may be a boron (B) atom.

In Chemical Formula A, the $Q_1$ to $Q_3$ ring moieties, which are bonded to the central atom X, may be the same or different and may each be independently a substituted or unsubstituted aromatic hydrocarbon ring of 6 to 50 carbon atoms, particularly a substituted or unsubstituted aromatic hydrocarbon ring of 6 to 30 carbon atoms, and more particularly a substituted or unsubstituted hydrocarbon ring of 6 to 18 carbon atoms.

In this regard, the aromatic hydrocarbon ring of $Q_2$ in Chemical Formula A may be a ring represented by Structural Formula B or C, below:

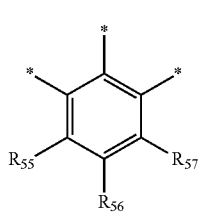

[Structural Formula B]

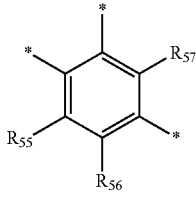

[Structural Formula C]

wherein "-*" denotes bonding sites at which the corresponding carbons in the aromatic ring of $Q_2$ bond to X, the nitrogen atom (N) in the linker —N($Ar_1$)—, and the nitrogen atom (N) linked to the linker L, respectively, and $R_{55}$ to $R_{57}$, which may be the same or different, are each independently any one selected from a hydrogen atom, a deuterium atom, a substituted or unsubstituted linear, branched, or cyclic alkyl of 1 to 24 carbon atoms, a substituted or unsubstituted aryl of 6 to 24 carbon atoms, a substituted or unsubstituted heteroaryl of 2 to 24 carbon atoms, a substituted or unsubstituted alkoxy of 1 to 24 carbon atoms, a substituted or unsubstituted aryloxy of 6 to 24 carbon atoms, a substituted or unsubstituted alkylamine of 1 to 24 carbon atoms, a substituted or unsubstituted arylamine of 6 to 24 carbon atoms, a substituted or unsubstituted akylsilyl of 1 to 24 carbon atoms, a substituted or unsubstituted arylsilyl of 6 to 24 carbon atoms, a cyano, and a halogen, and any adjacent two of $R_{55}$ to $R_{57}$ may be linked to each to each other to form an additional mono- or polycyclic aliphatic or aromatic ring.

In the case where the $Q_1$ to $Q_3$ ring moieties are the same or different and each independently a substituted or unsubstituted aromatic hydrocarbon ring of 6 to 50 carbon atoms, the aromatic hydrocarbon rings of $Q_1$ and $Q_3$ in Chemical Formula A may be the same or different and may each independently a ring represented by the following Structural Formula D:

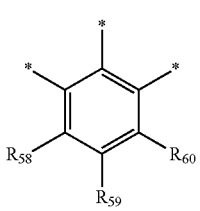

[Structural Formula D]

wherein "-*" denotes bonding sites at which the corresponding carbons in the aromatic ring of $Q_1$ bond to X, the nitrogen atom (N), and a carbon atom in the Cy1 ring moiety, respectively or at which the corresponding carbons in the aromatic ring of $Q_3$ bond to X and the two nitrogen atoms (N), respectively.

$R_{58}$ to $R_{60}$ in Structural Formula D are as defined above.

In addition, Cy1, which partially includes members of the ring accounted for by Cy2 in Chemical Formula A, may be a linker represented by Structural Formula E:

[Structural Formula E]

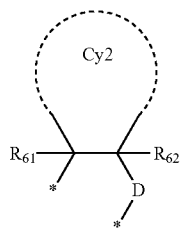

wherein "-*" denotes a bonding site to a carbon within the aromatic ring of $Q_1$, or to the nitrogen atom, D is a single bond, or —$C(R_{63})(R_{64})$— or —$C(R_{65})(R_{66})$—$C(R_{67})(R_{68})$—, B is a single bond, or —$C(R_{63})(R_{64})$— or —$C(R_{65})(R_{66})$—$C(R_{67})(R_{68})$—, the substituents $R_{61}$ to $R_{68}$, which may be the same or different, are each independently selected from a hydrogen atom, a deuterium atom, a halogen, a substituted or unsubstituted linear, branched, or cyclic alkyl of 1 to 24 carbon atoms, a substituted or unsubstituted aryl of 6 to 20 carbon atoms, a substituted or unsubstituted heteroaryl of 2 to 20 carbon atoms, a substituted or unsubstituted alkylsilyl of 1 to 20 carbon atoms, and a substituted or unsubstituted arylsilyl of 6 to 20 carbon atoms, and Cy2 is as defined above, wherein the term 'substituted in the expression "substituted or unsubstituted" used is as defined above.

In addition, the ring formed by Cy1, Cy2, the nitrogen atom, and $Q_1$ in Chemical Formula A of the present disclosure may be a ring represented by the following Structural Formula F:

[Structural Formula F]

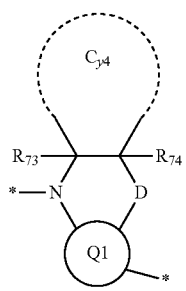

wherein "_*" denotes a bonding site to a carbon atom within the aromatic ring of $Q_3$ or to X, D is a single bond or —$C(R_{75})(R_{76})$— or —$C(R_{75})(R_{76})$—$C(R_{77})(R_{78})$—, $R_{73}$ to $R_{78}$, which may be the same or different, are each independently selected from a hydrogen atom, a deuterium atom, a halogen, a substituted or unsubstituted linear, branched, or cyclic alkyl of 1 to 20 carbon atoms, a substituted or unsubstituted aryl W of 6 to 20 carbon atoms, a substituted or unsubstituted heteroaryl of 2 to 20 carbon atoms, a substituted or unsubstituted alkylsilyl of 1 to 20 carbon atoms, and a substituted or unsubstituted arylsilyl of 6 to 20 carbon atoms, and $Cy_4$ is a substituted or unsubstituted alkylene of 2 to 5 carbon atoms, with a methylene (—$CH_2$—) given for each end, wherein the ring accounted for by Cy4 is fused to a ring including the nitrogen and the linker B and the term "substituted" in the expression "substituted or unsubstituted" used is as defined above The linker L in Chemical Formula A may be a single bond or any one selected from the following Structural Formulas 22 to 30:

[Structural Formula 22]

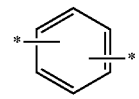

[Structural Formula 23]

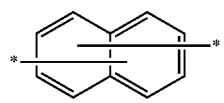

[Structural Formula 24]

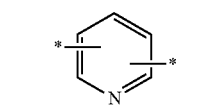

[Structural Formula 25]

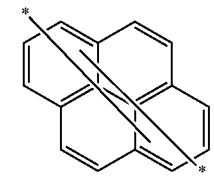

[Structural Formula 26]

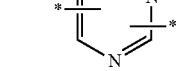

[Structural Formula 27]

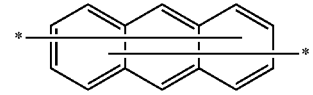

[Structural Formula 28]

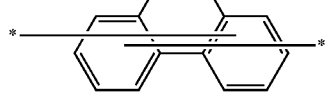

[Structural Formula 29]

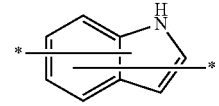

[Structural Formula 30]

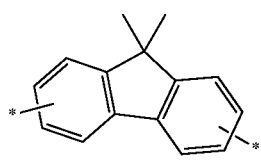

In the linker, hydrogen or deuterium may be positioned on each carbon atoms of the aromatic ring.

In addition, concrete examples of the boron compound represented by Chemical Formula A according to the present disclosure include <Compound 1> to <Compound 129>, below:

<Compound 1>
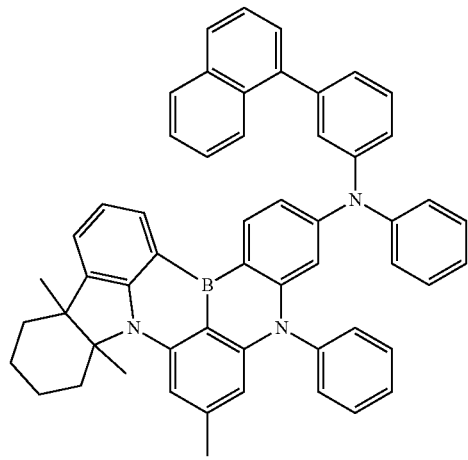
<Compound 2>
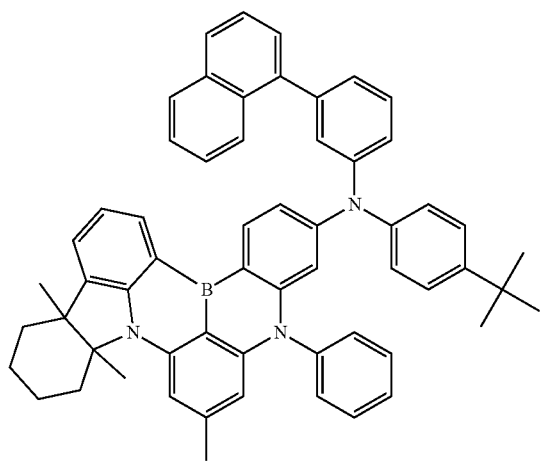
<Compound 3>
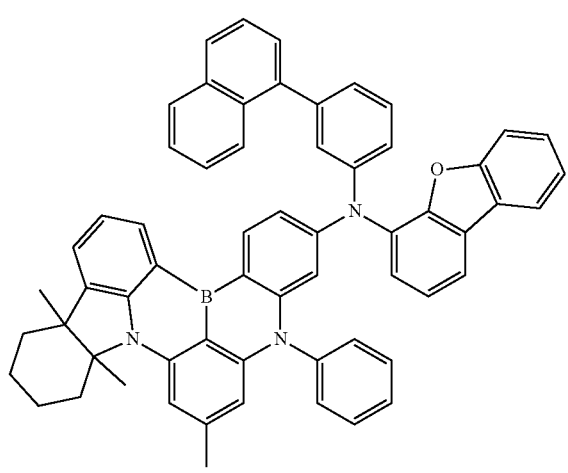
<Compound 4>
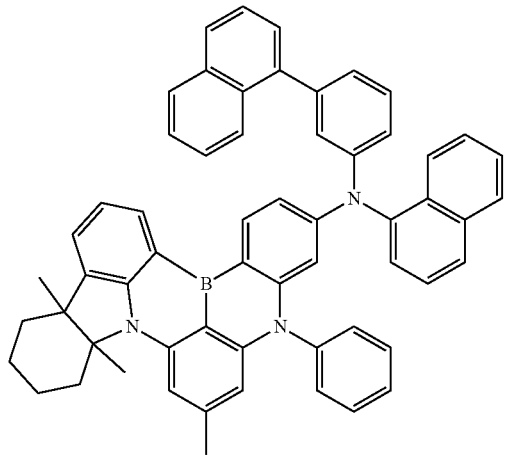
<Compound 5>
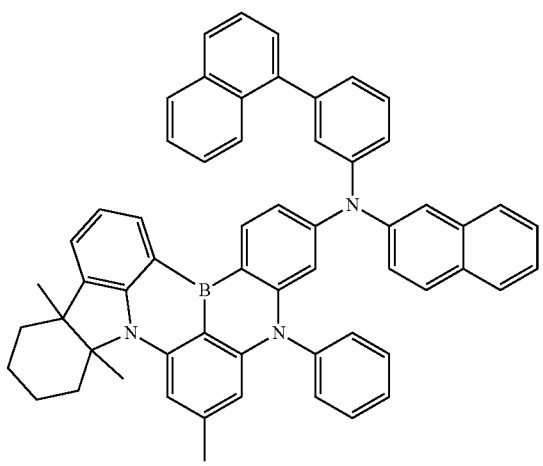
<Compound 6>
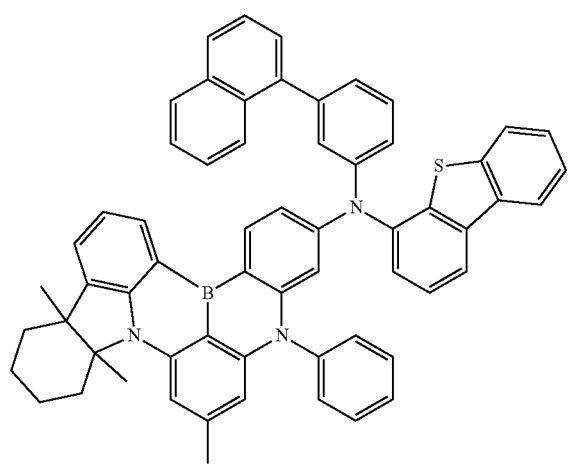

<Compound 7>
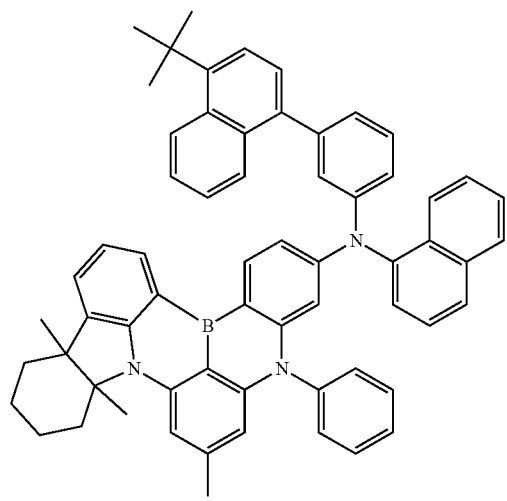
<Compound 8>
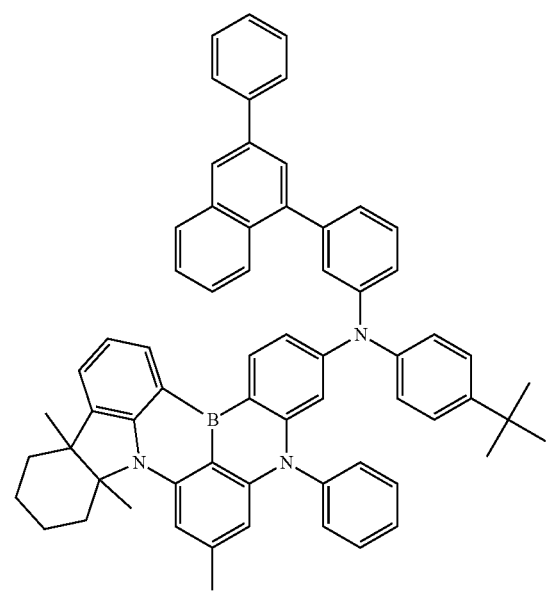
<Compound 9>
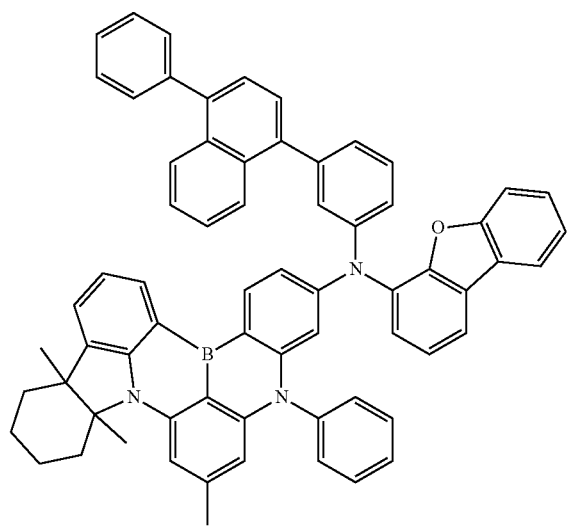
<Compound 10>
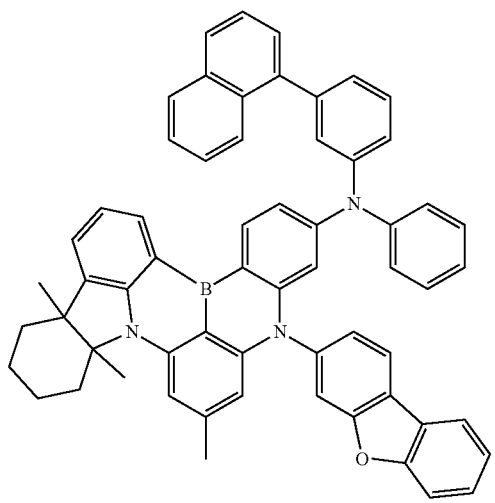
<Compound 11>
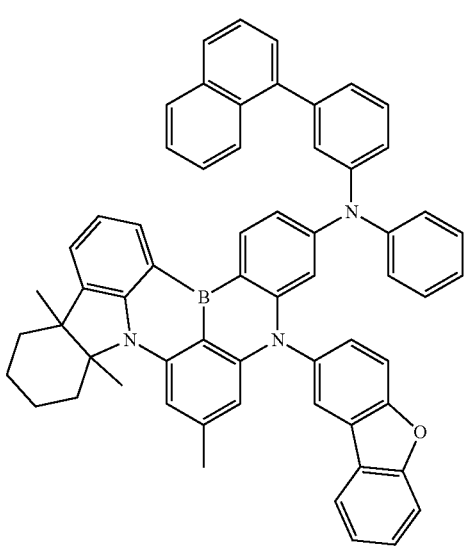
<Compound 12>
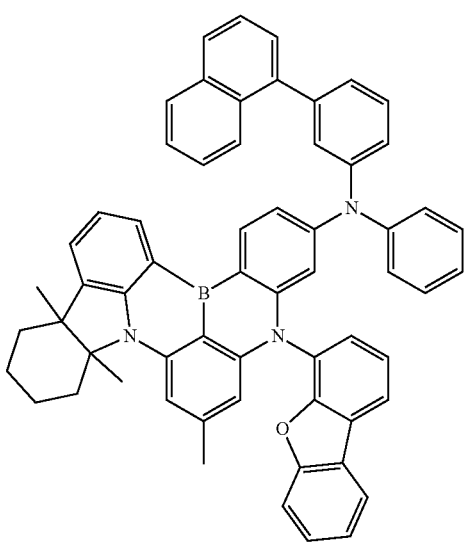

<Compound 13>
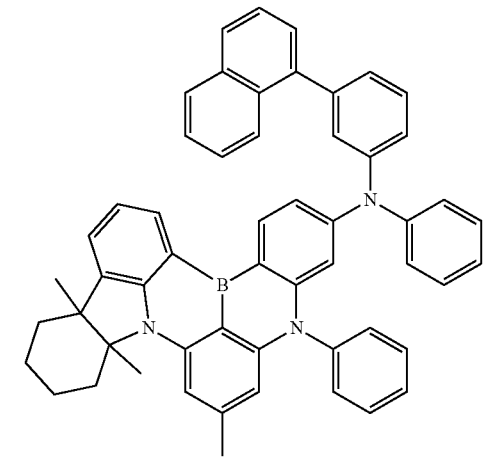
<Compound 14>
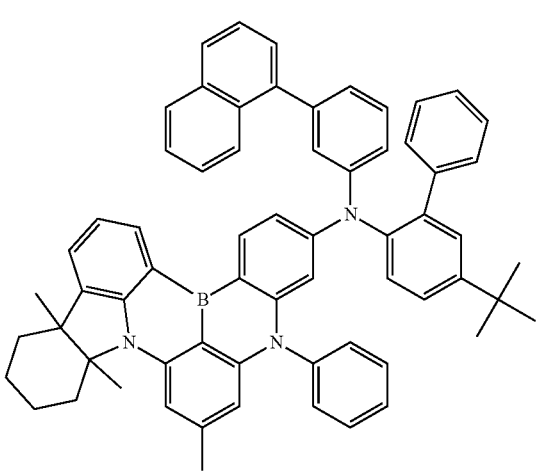
<Compound 15>
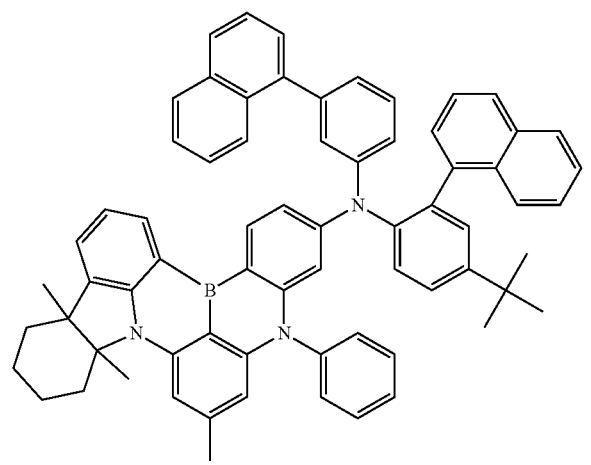
<Compound 16>
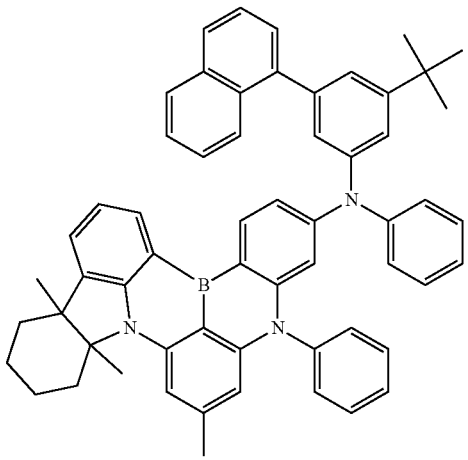
<Compound 17>
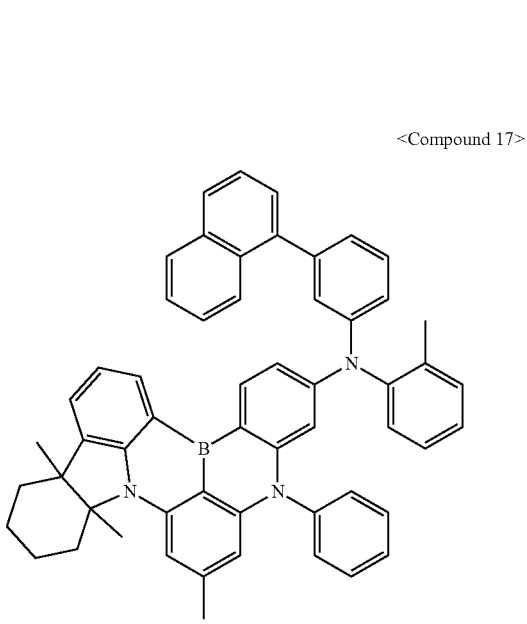
<Compound 18>
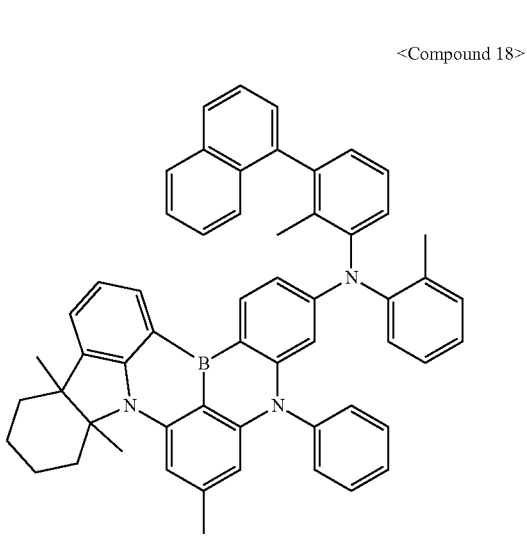

<Compound 19>
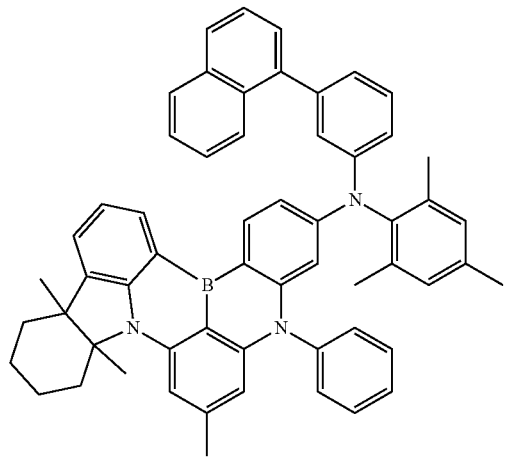
<Compound 20>
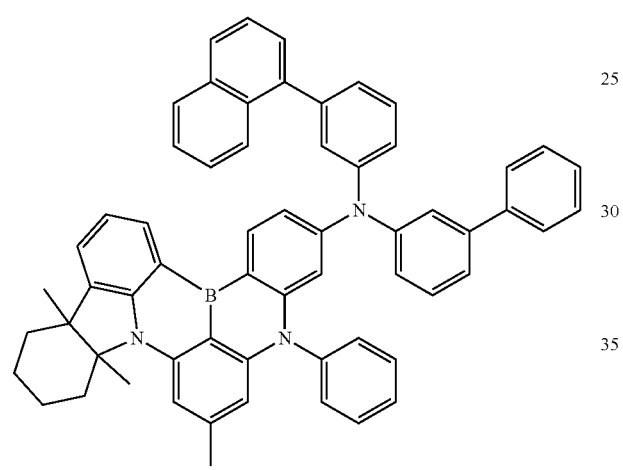
<Compound 21>
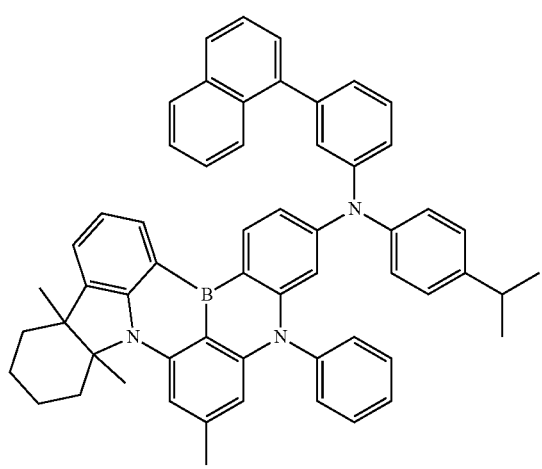
<Compound 22>
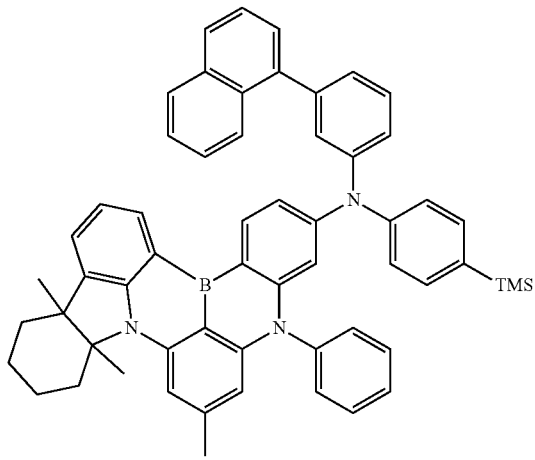
<Compound 23>
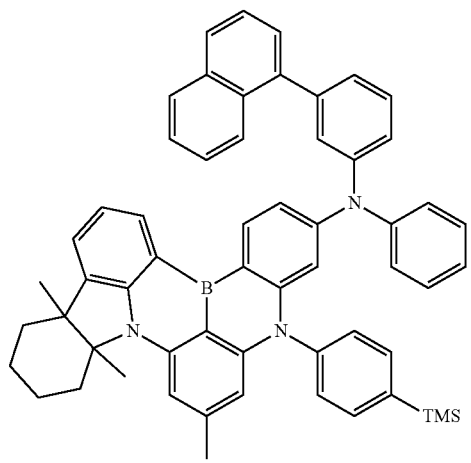
<Compound 24>
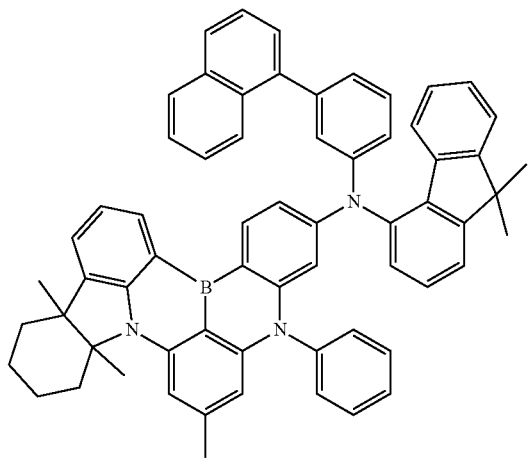

<Compound 25>
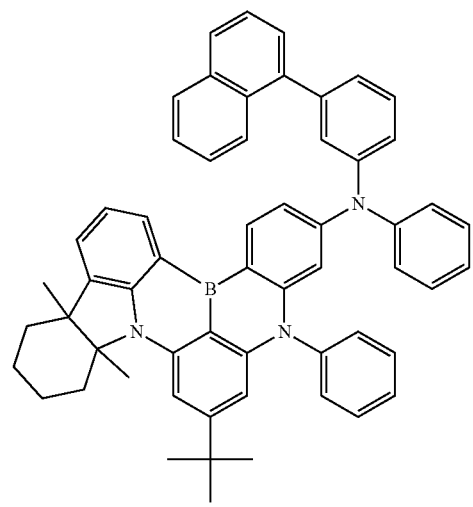
<Compound 26>
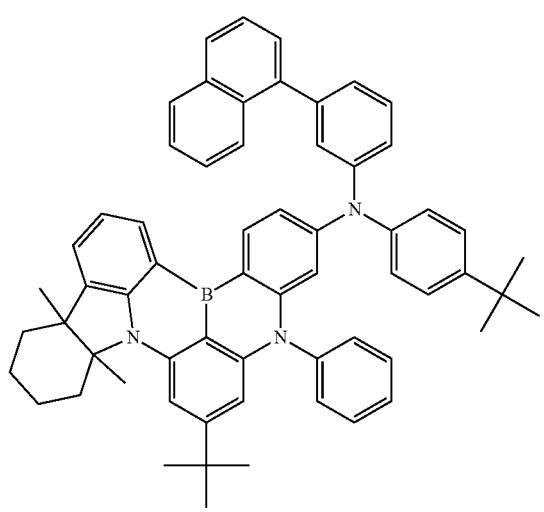
<Compound 27>
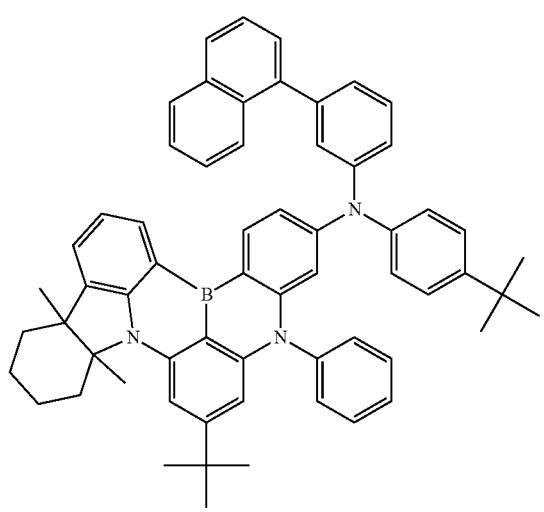
<Compound 28>
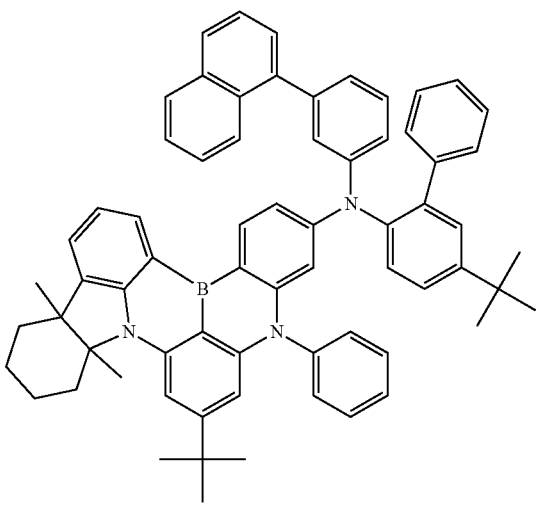
<Compound 29>
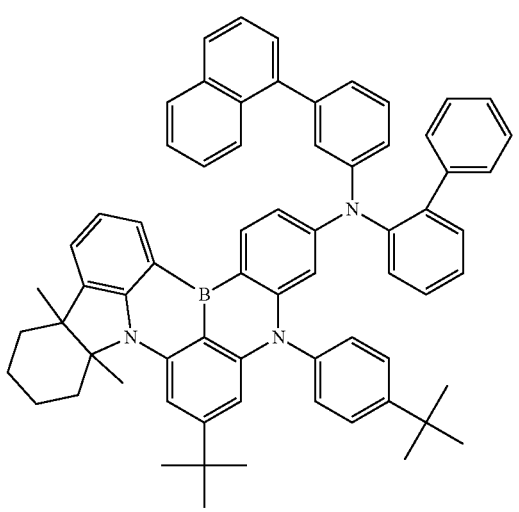
<Compound 30>
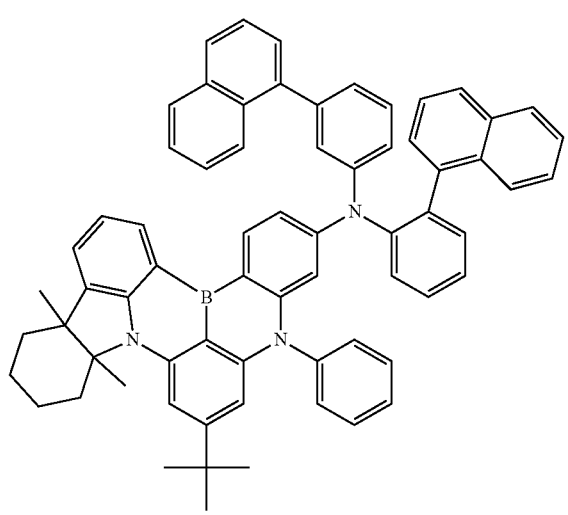

<Compound 31>
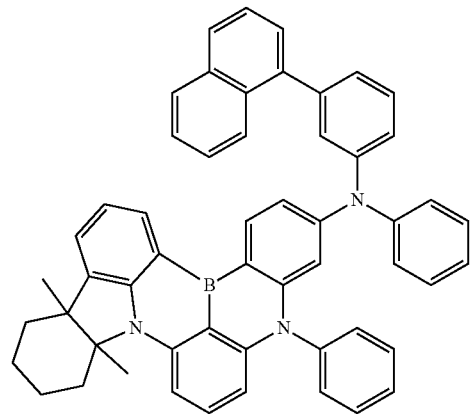
<Compound 32>
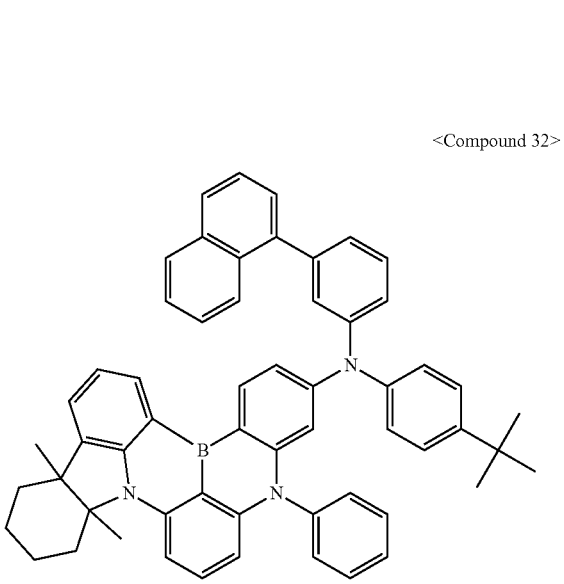
<Compound 33>
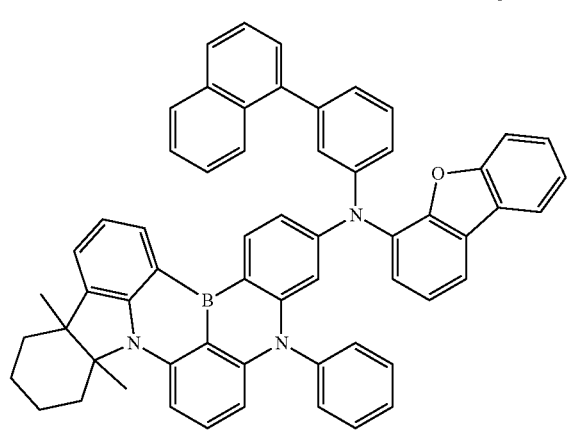
<Compound 34>
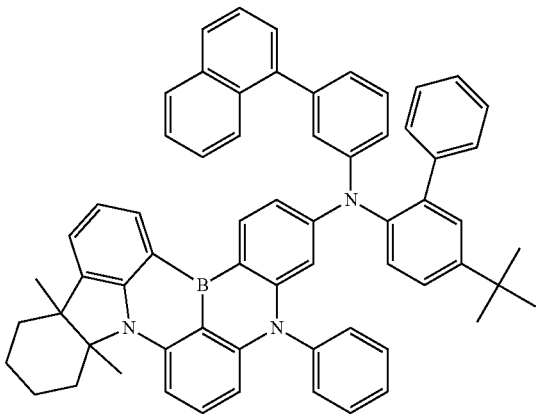
<Compound 35>
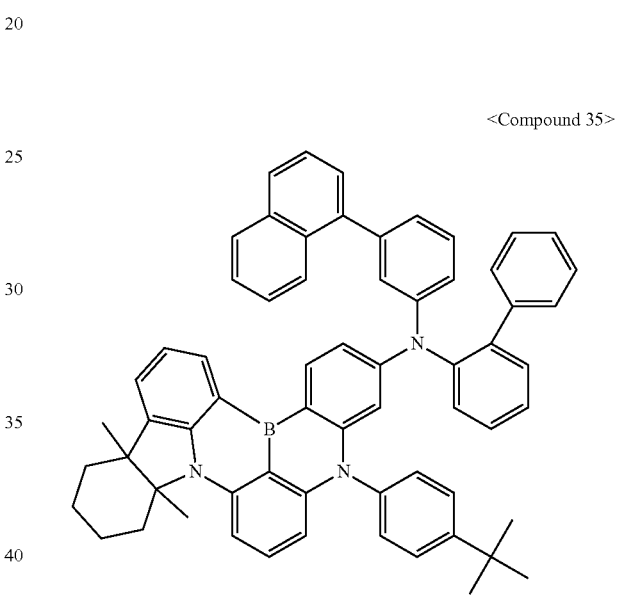
<Compound 36>
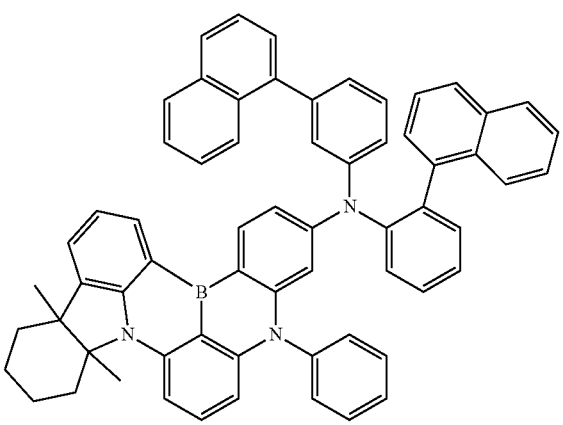

-continued
<Compound 37>
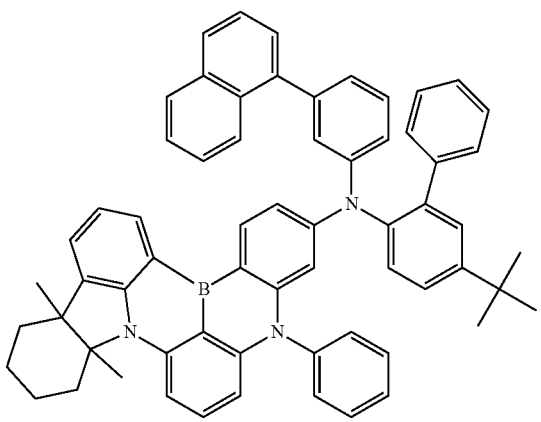
<Compound 38>
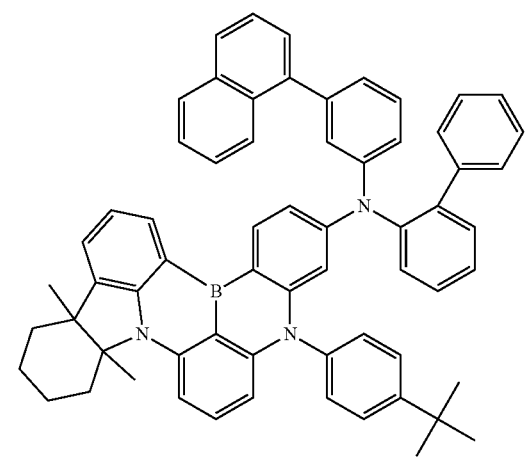
<Compound 39>
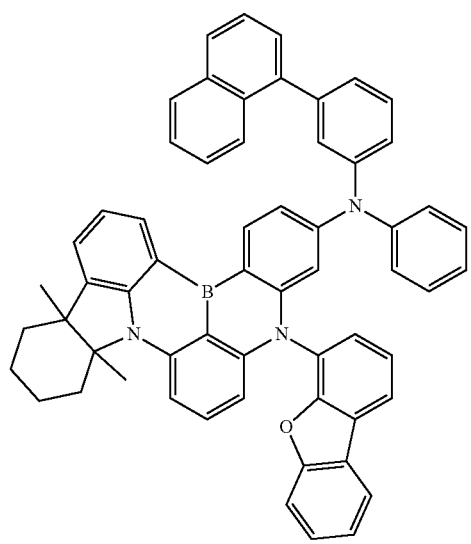
<Compound 40>
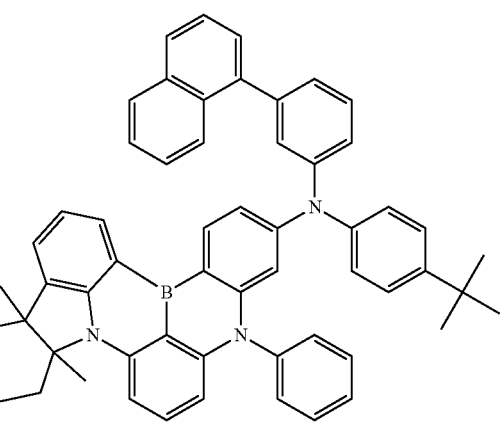
<Compound 41>
<Compound 42>
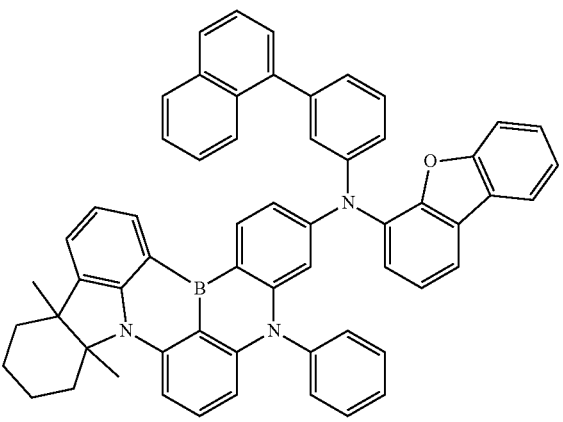

<Compound 43>
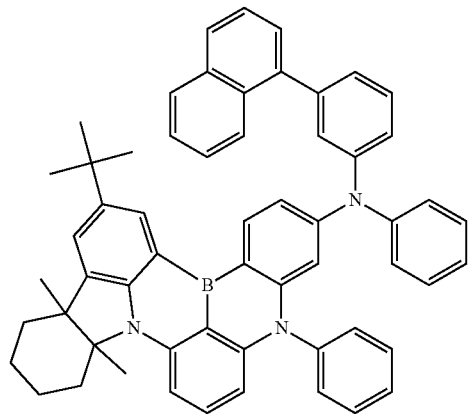
<Compound 44>
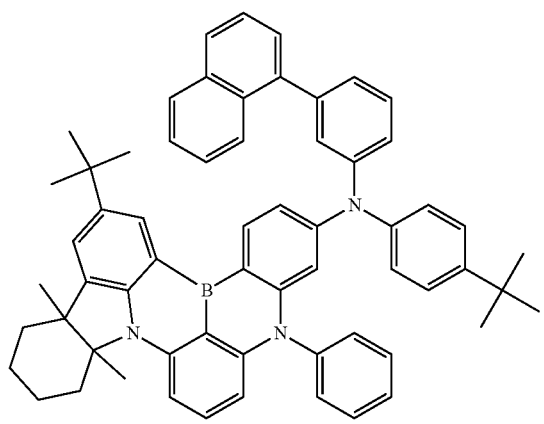
<Compound 45>
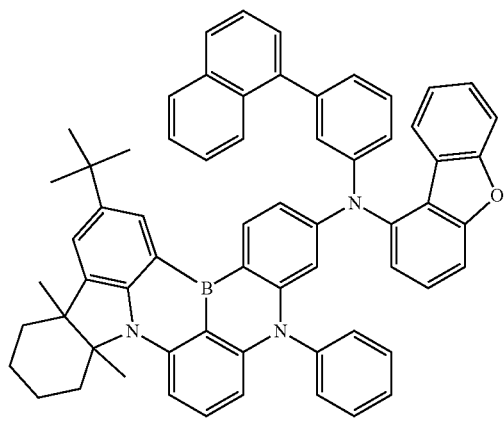
<Compound 46>
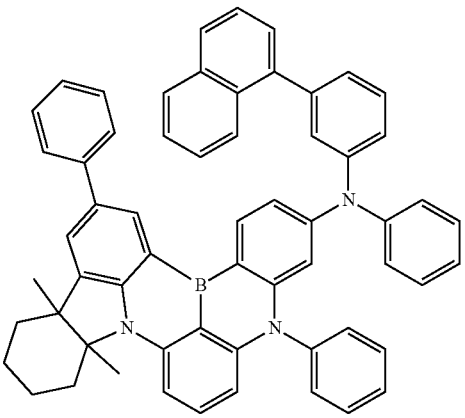
<Compound 47>
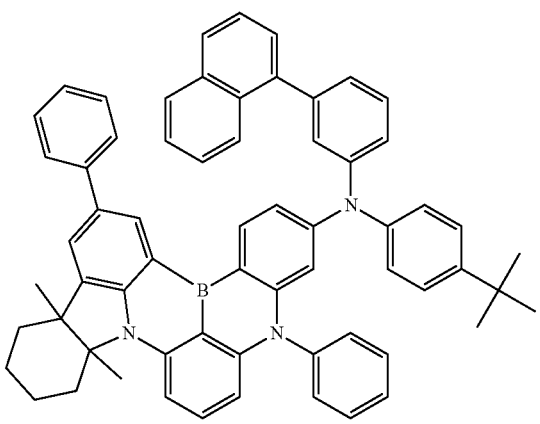
<Compound 48>
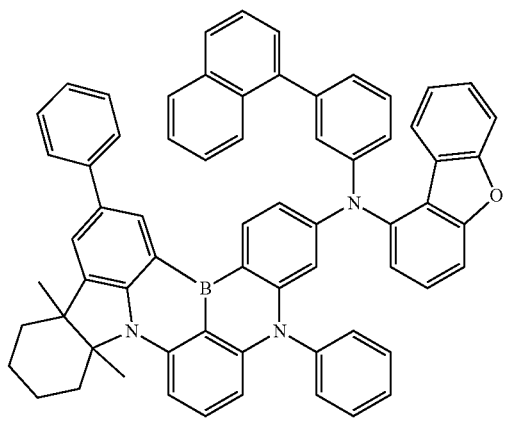

<Compound 49>
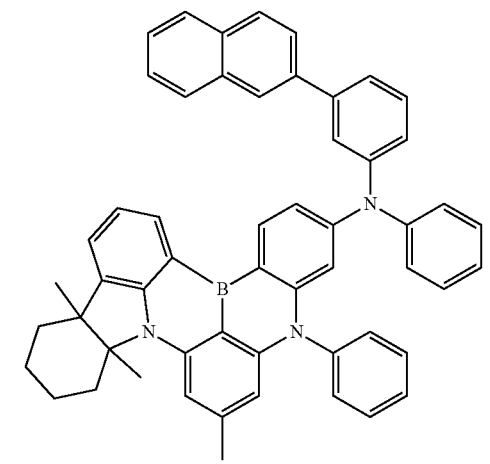
<Compound 50>
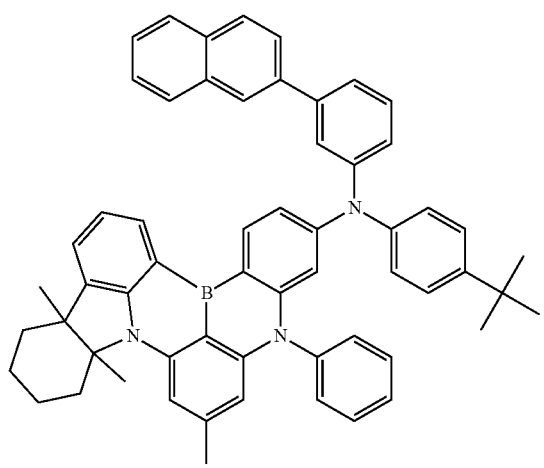
<Compound 51>
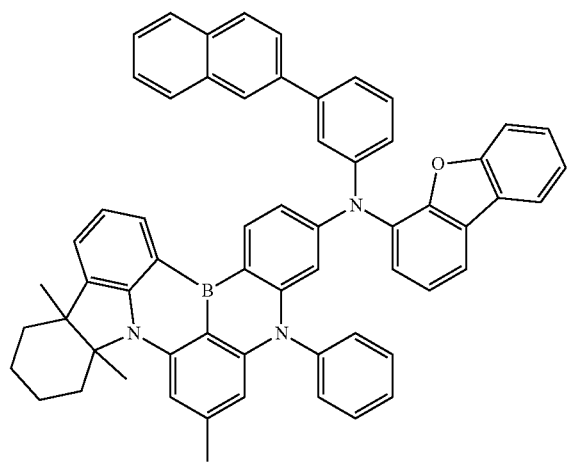
<Compound 52>
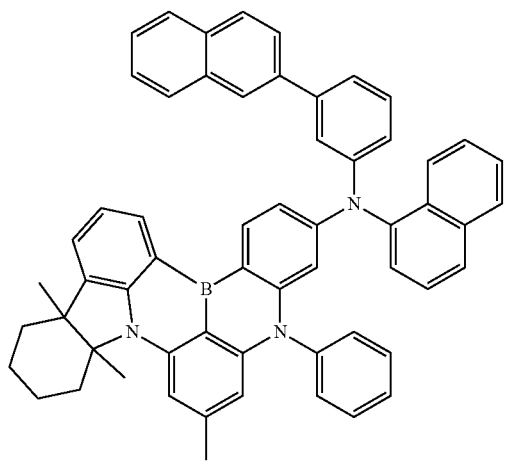
<Compound 53>
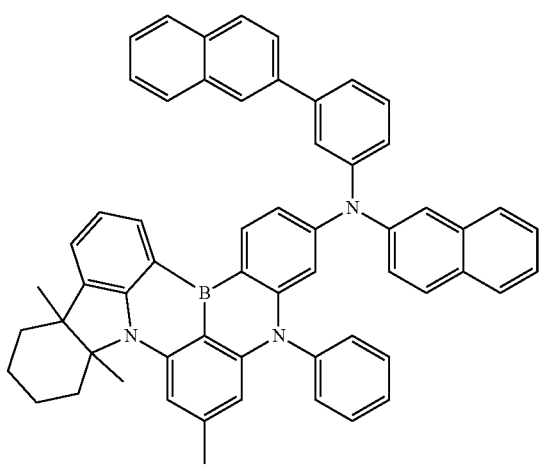
<Compound 54>
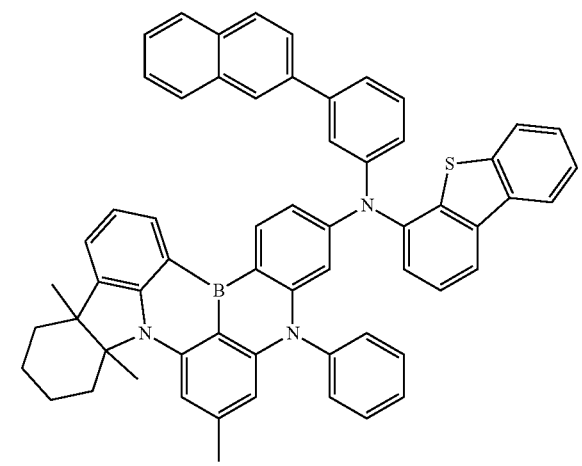

<Compound 55>
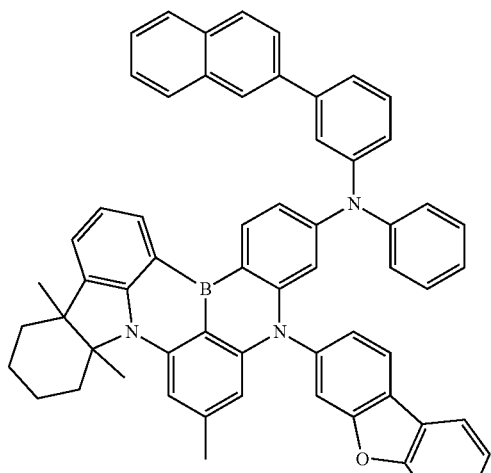
<Compound 56>
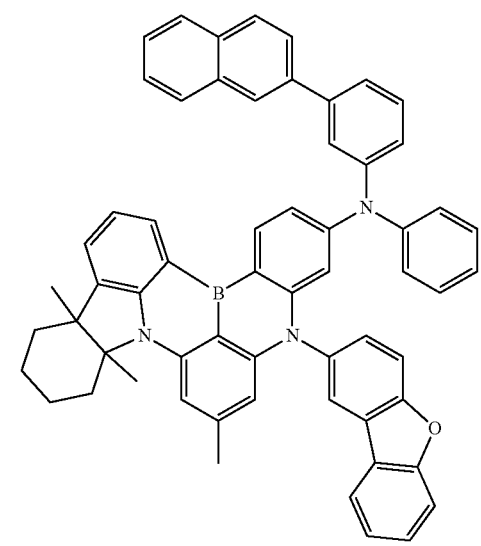
<Compound 57>
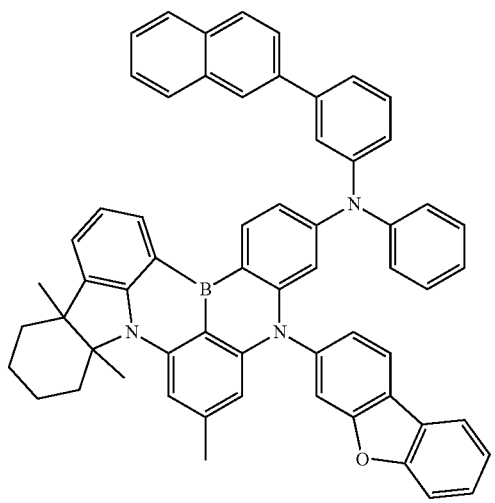
<Compound 58>
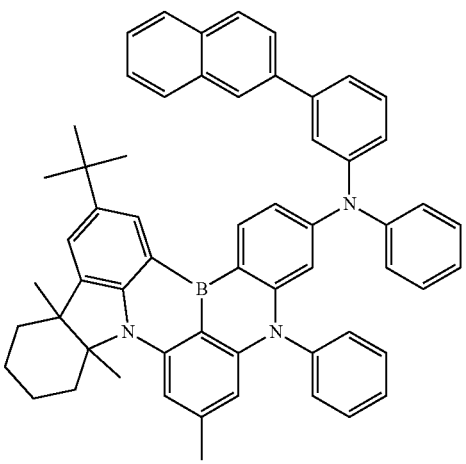
<Compound 59>
<Compound 60>
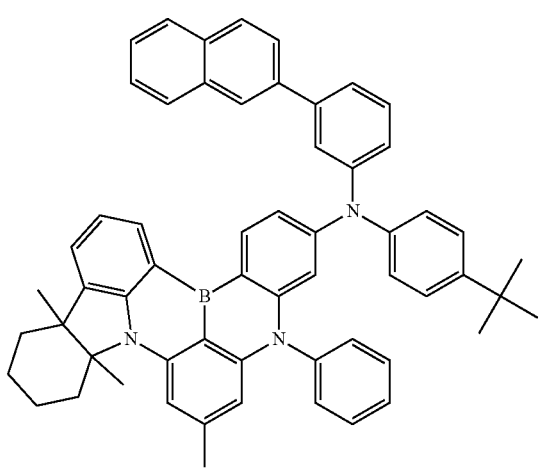

<Compound 61>
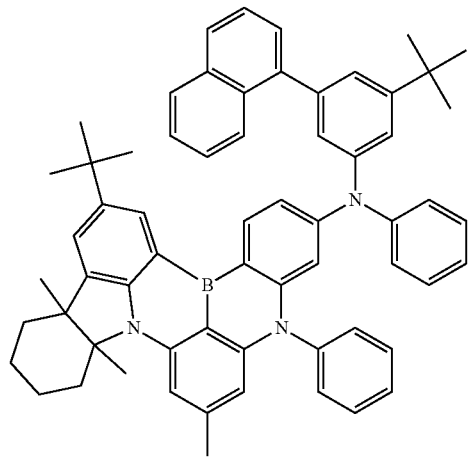
<Compound 62>
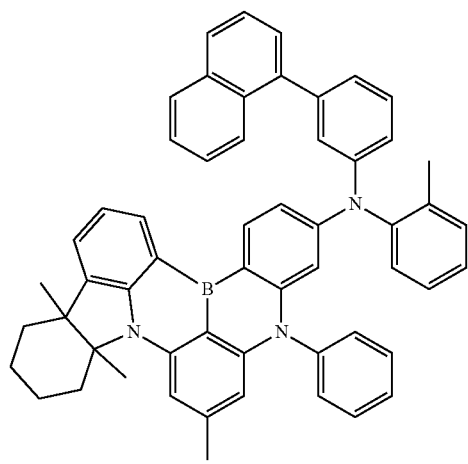
<Compound 63>
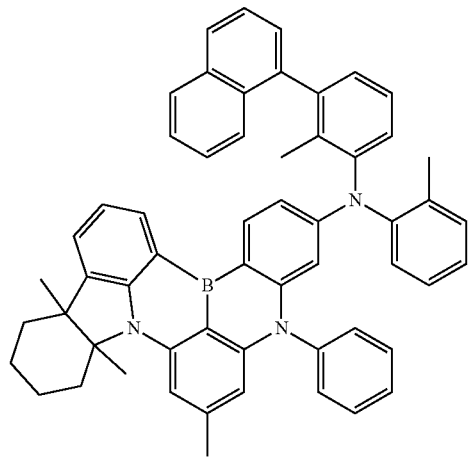
<Compound 64>
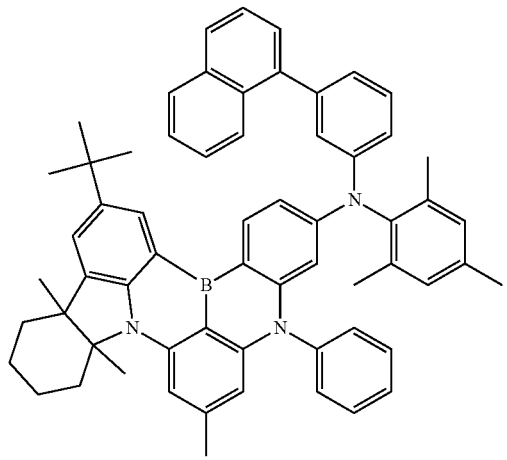
<Compound 65>
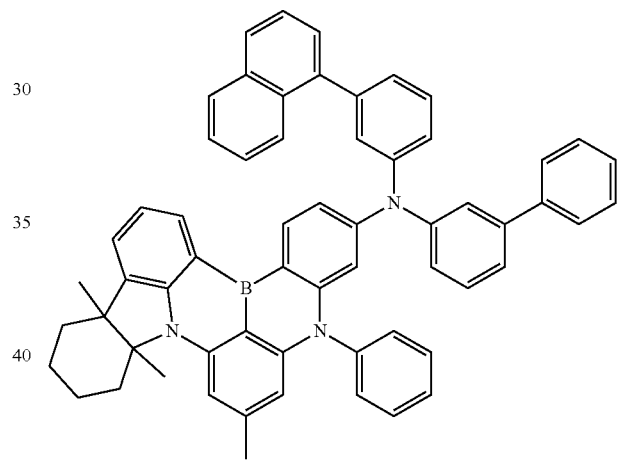
<Compound 66>
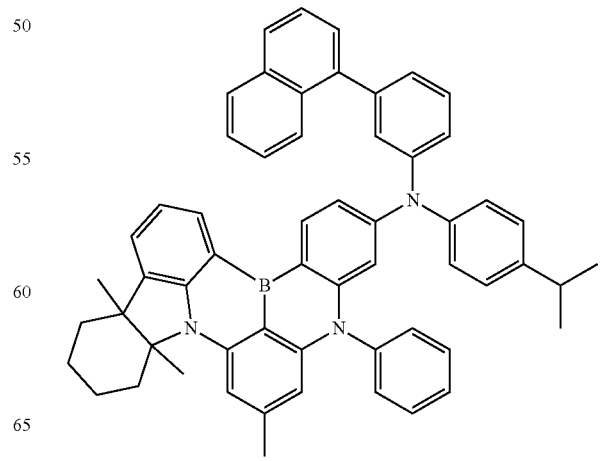

<Compound 67>
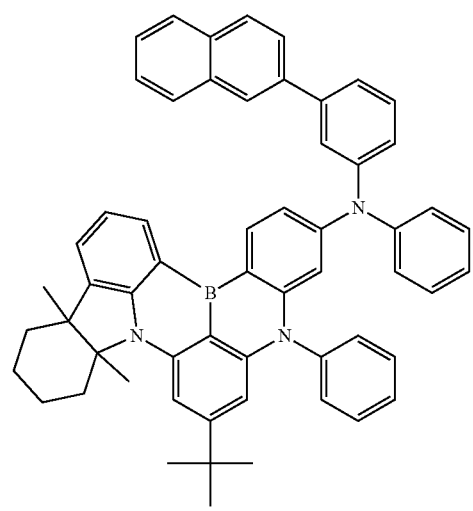
<Compound 68>
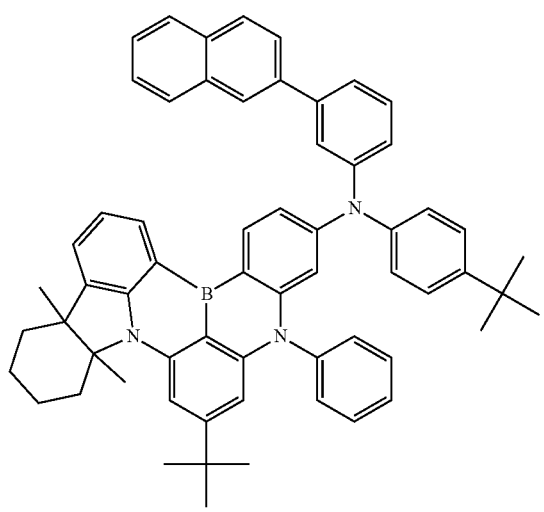
<Compound 69>
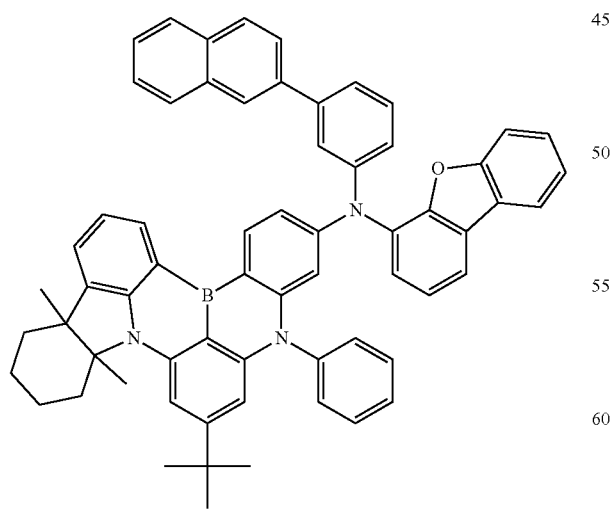
<Compound 70>
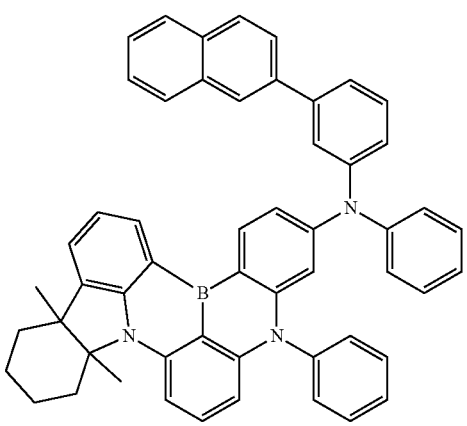
<Compound 71>
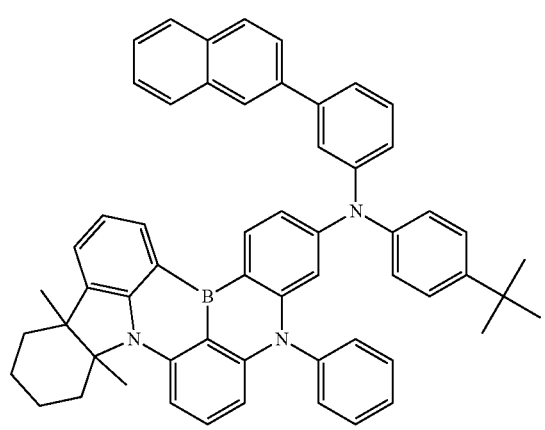
<Compound 72>
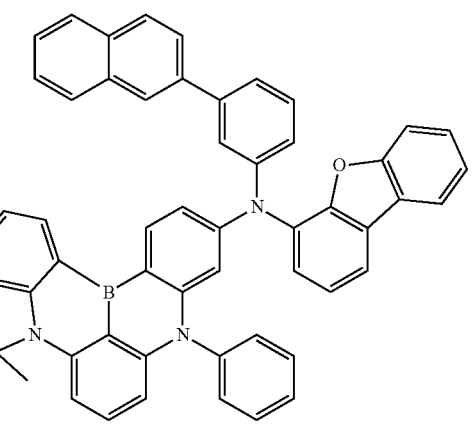

<Compound 73>
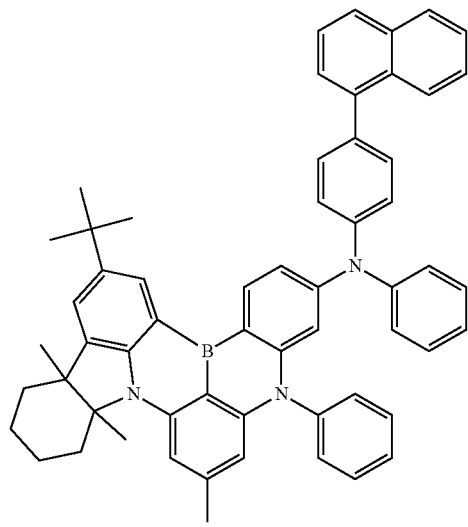
<Compound 74>
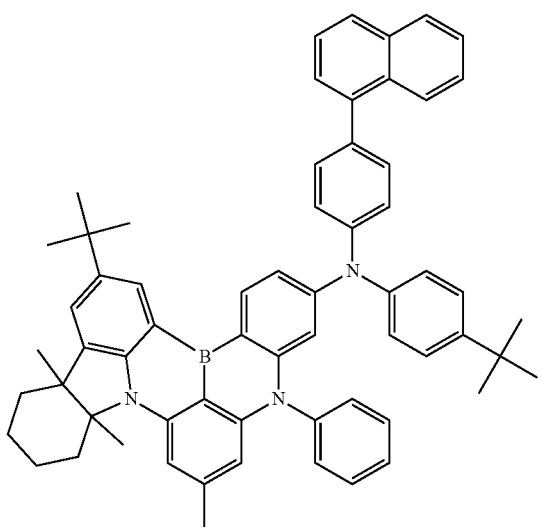
<Compound 75>
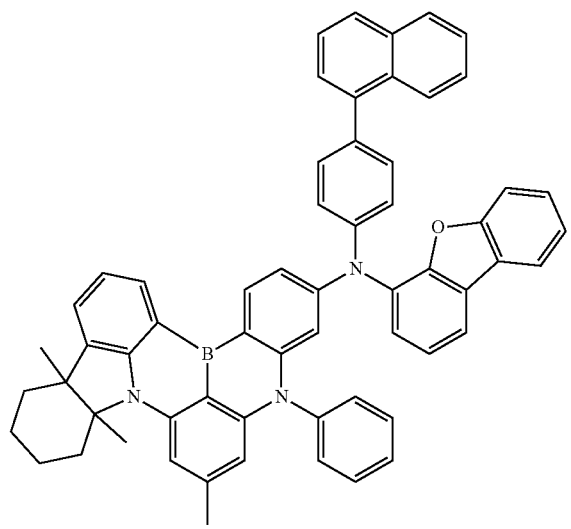
<Compound 76>
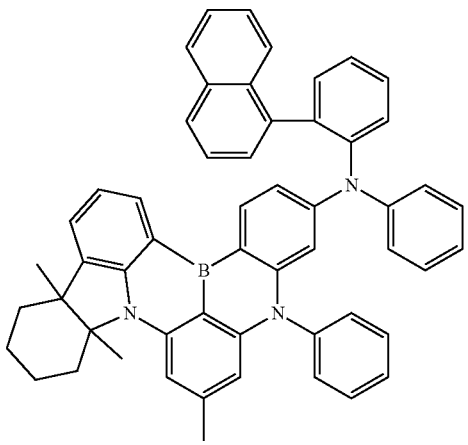
<Compound 77>
<Compound 78>
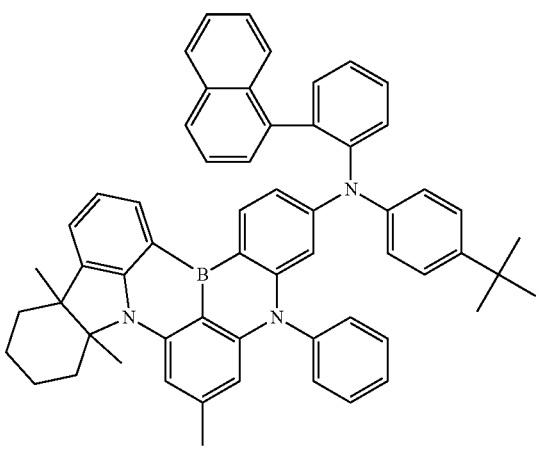

<Compound 79>
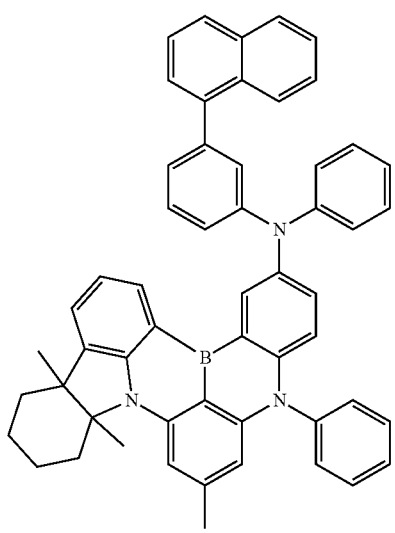
<Compound 80>
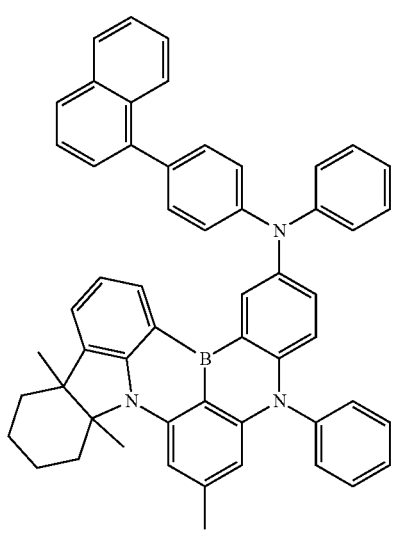
<Compound 81>
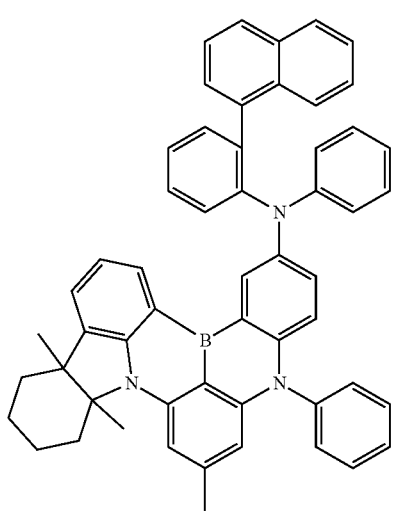
<Compound 82>
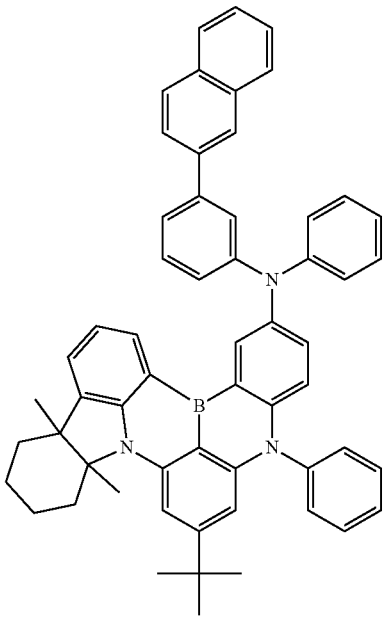
<Compound 83>
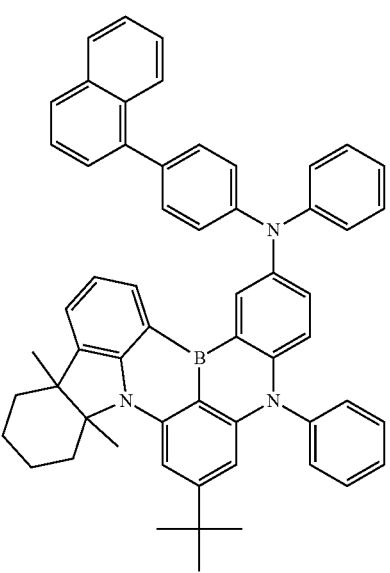

<Compound 84>
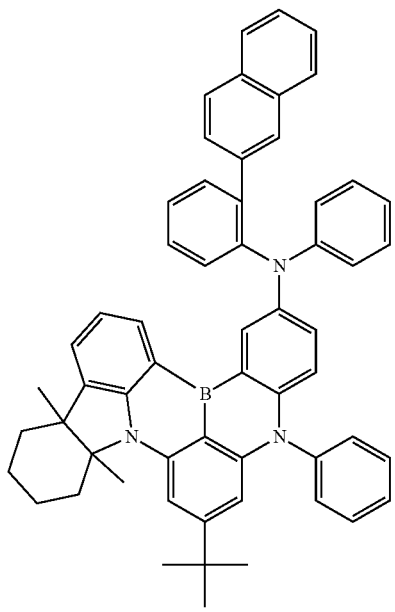
<Compound 85>
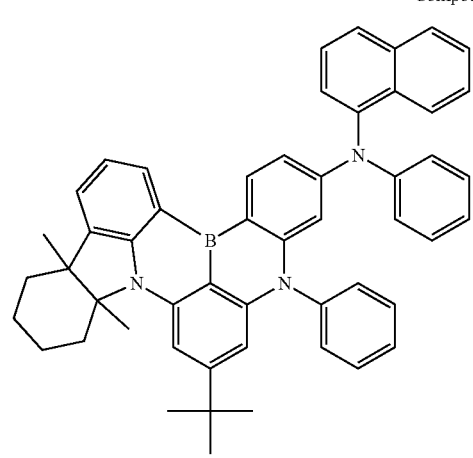
<Compound 86>
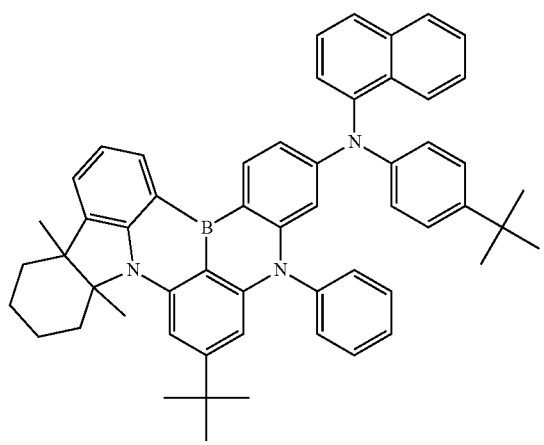
<Compound 87>
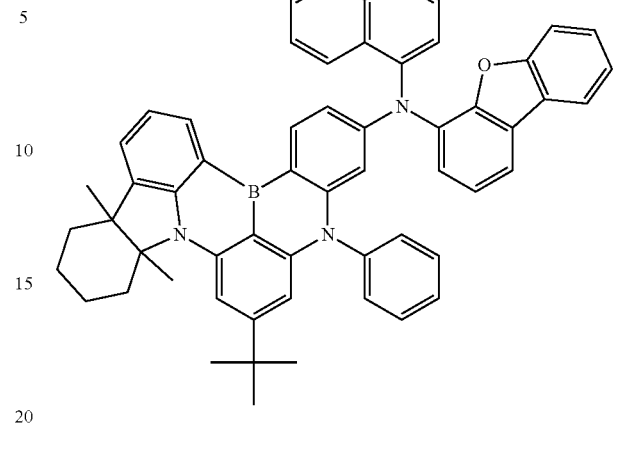
<Compound 88>
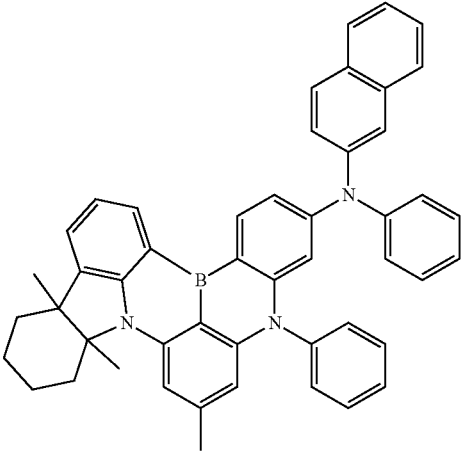
<Compound 89>
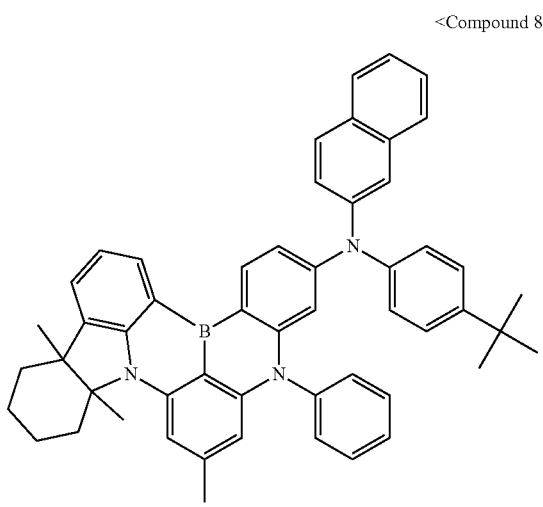

<Compound 90>
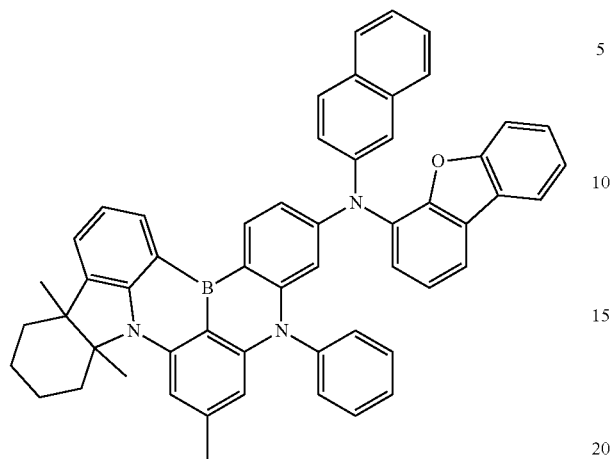
<Compound 91>
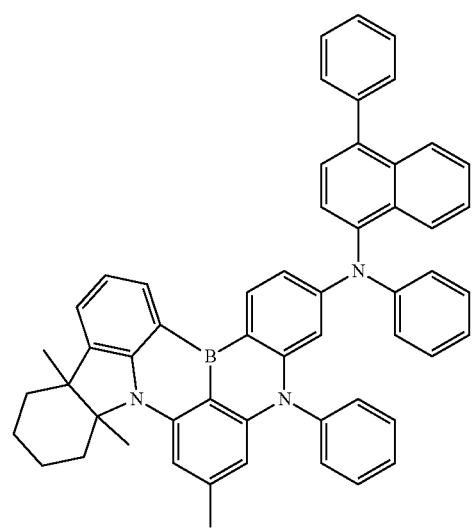
<Compound 92>
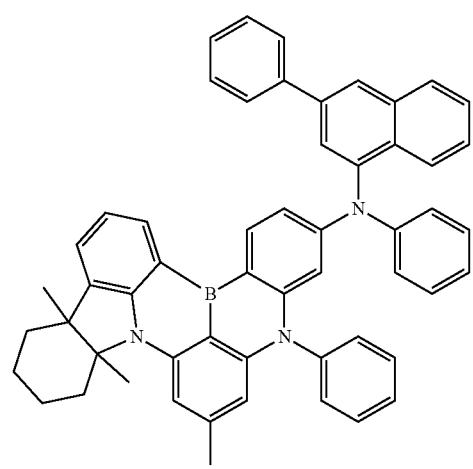
<Compound 93>
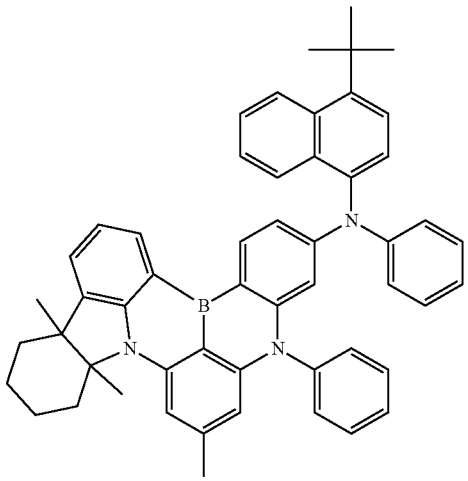
<Compound 94>
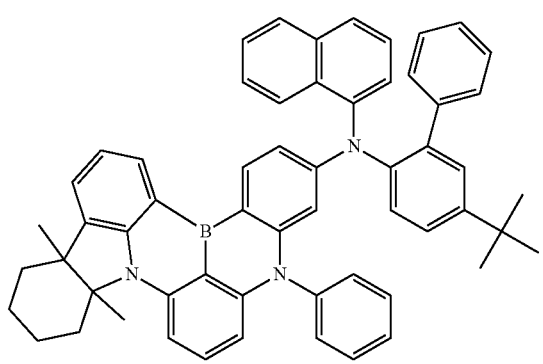
<Compound 95>
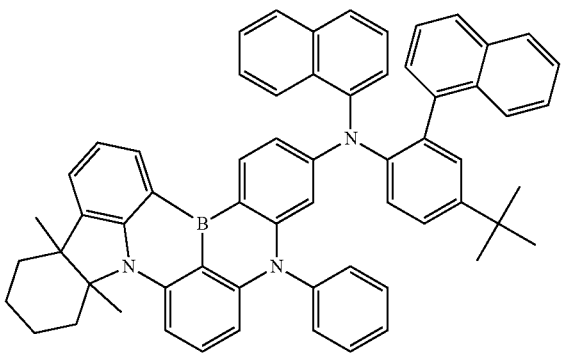
<Compound 99>
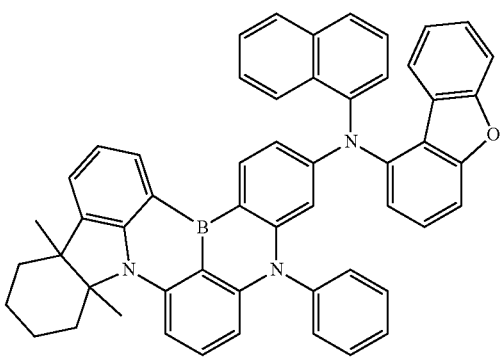

<Compound 100>
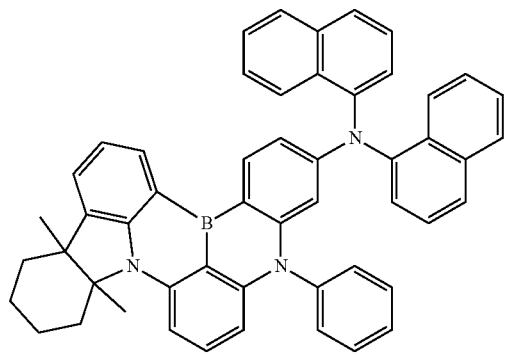
<Compound 101>
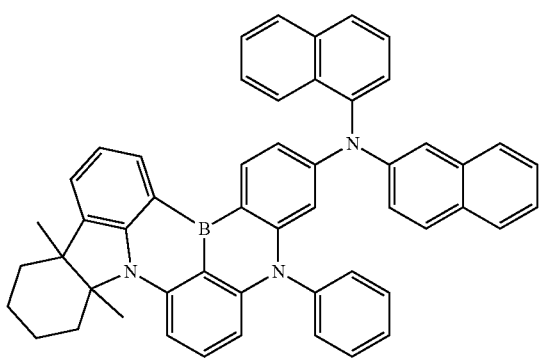
<Compound 102>
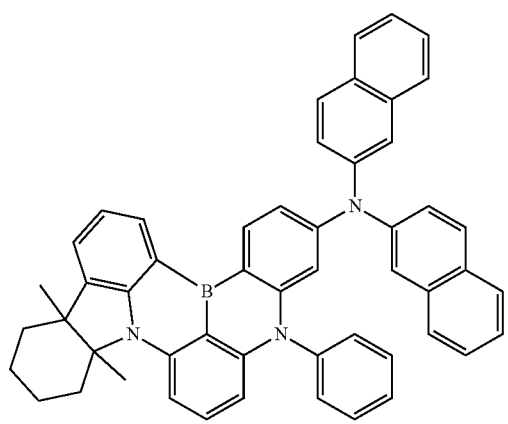
<Compound 103>
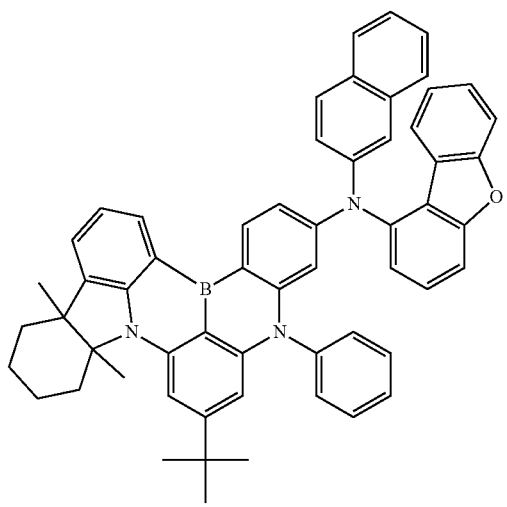
<Compound 104>
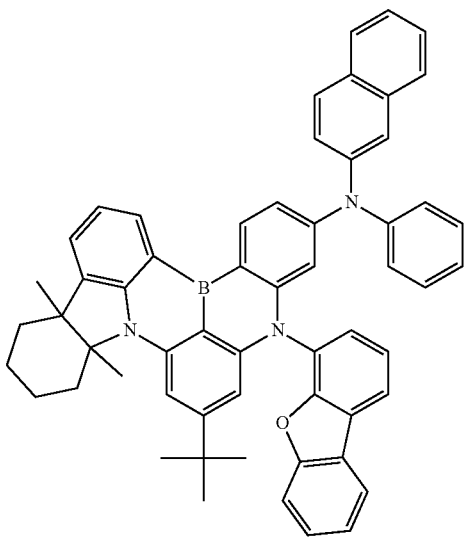
<Compound 105>
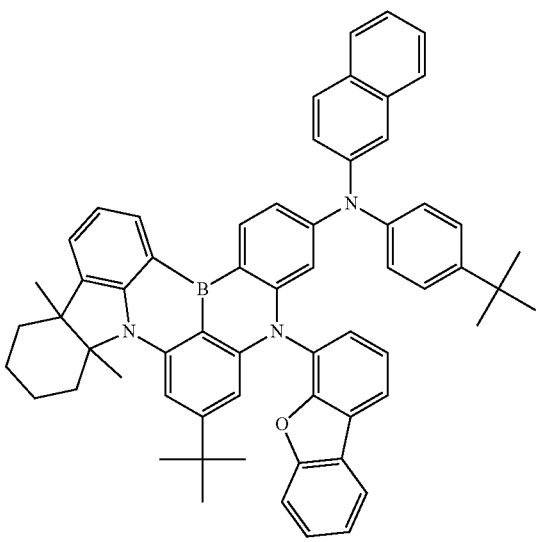

<Compound 106>
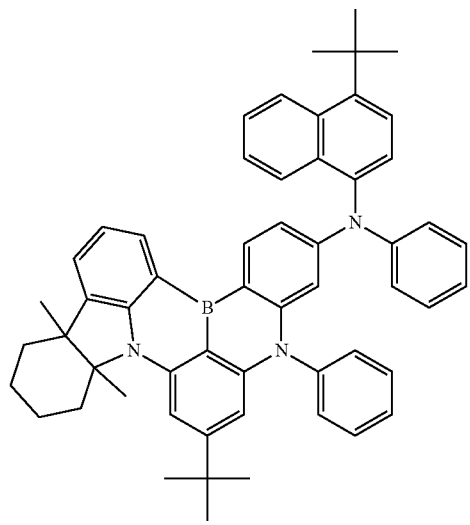
<Compound 107>
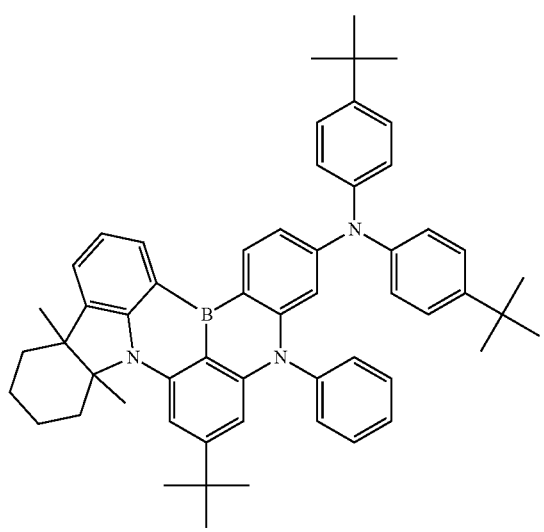
<Compound 108>
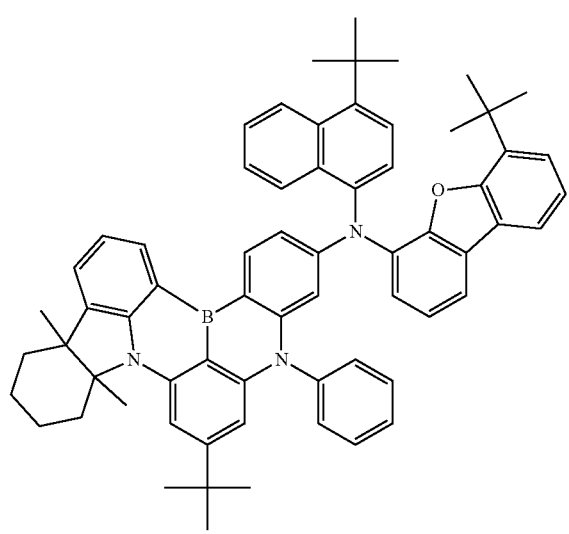
<Compound 109>
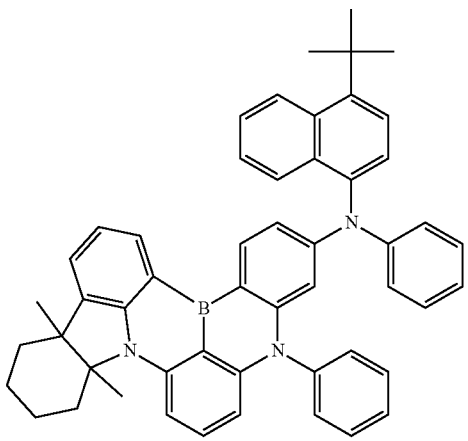
<Compound 110>
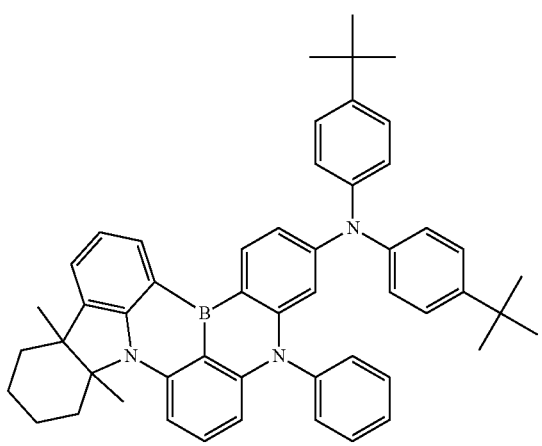
<Compound 111>
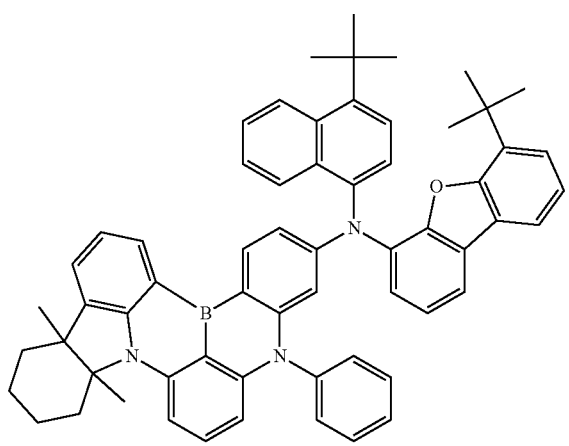

<Compound 112>
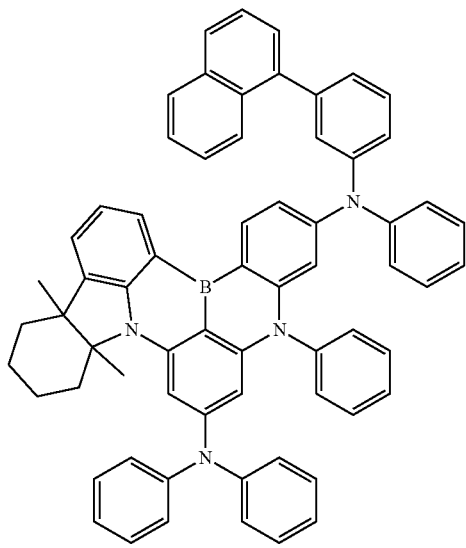
<Compound 113>
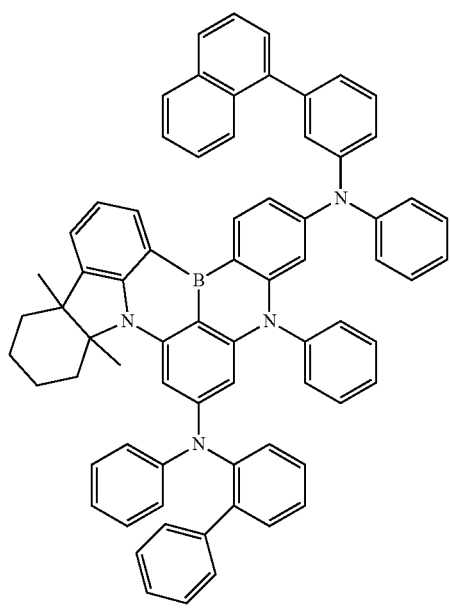
<Compound 114>
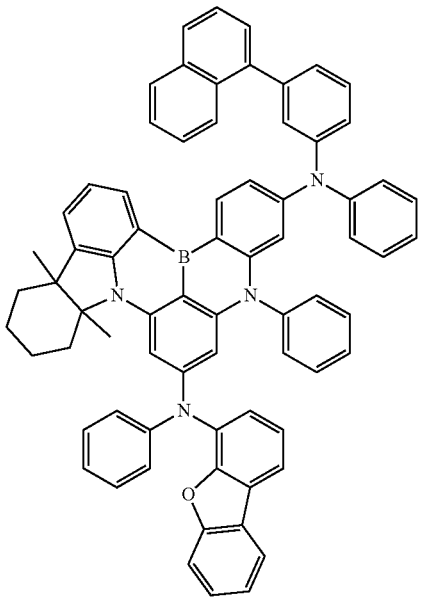
<Compound 115>
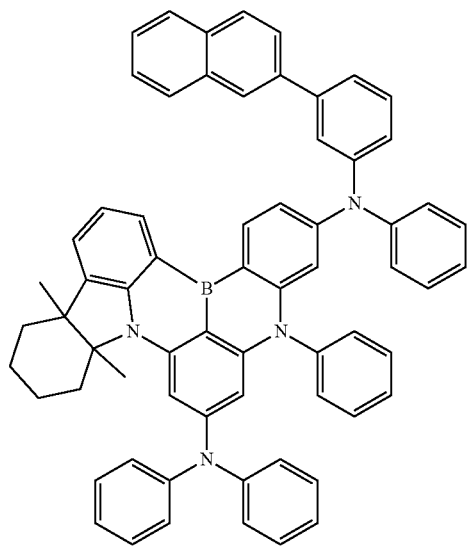

<Compound 116>
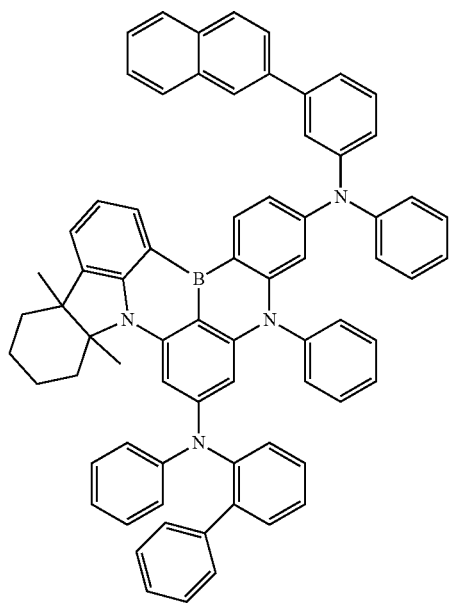
<Compound 117>
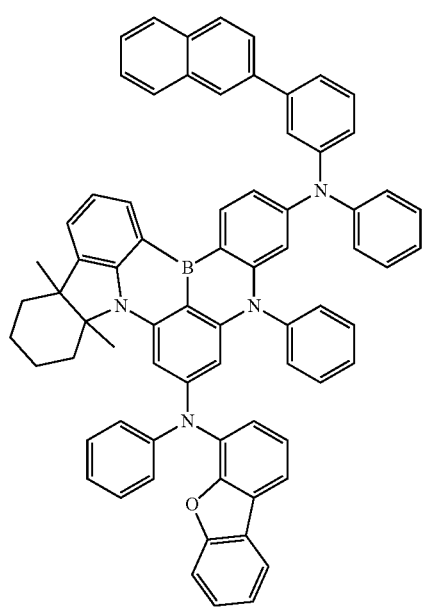
<Compound 118>
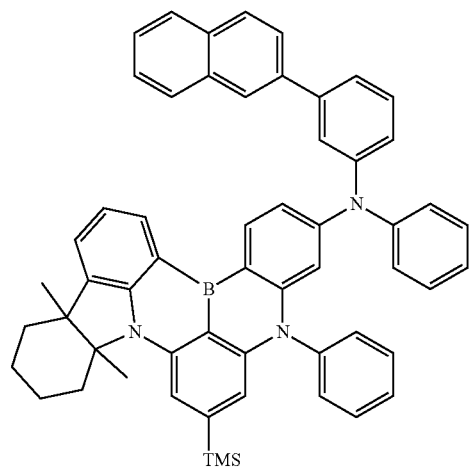
<Compound 119>
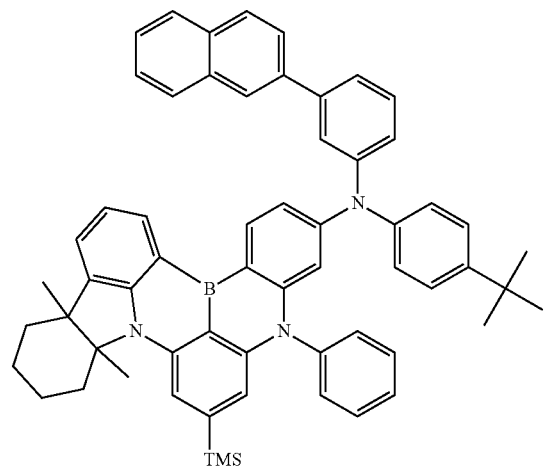
<Compound 120>
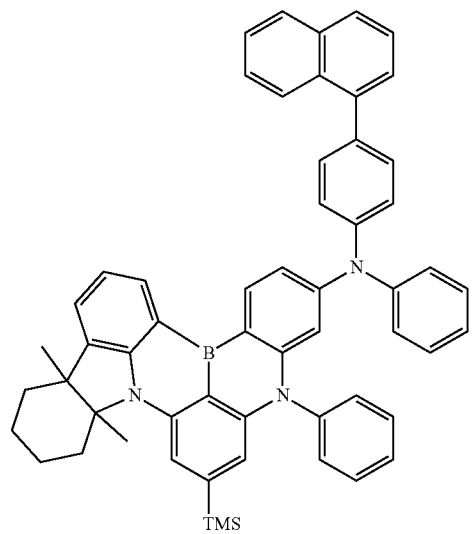

<Compound 121>
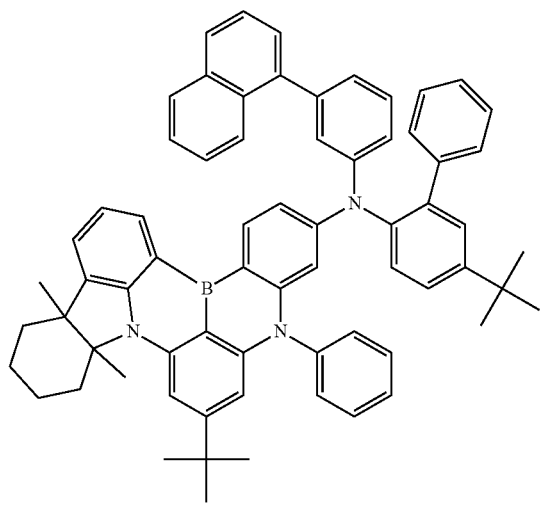
<Compound 122>
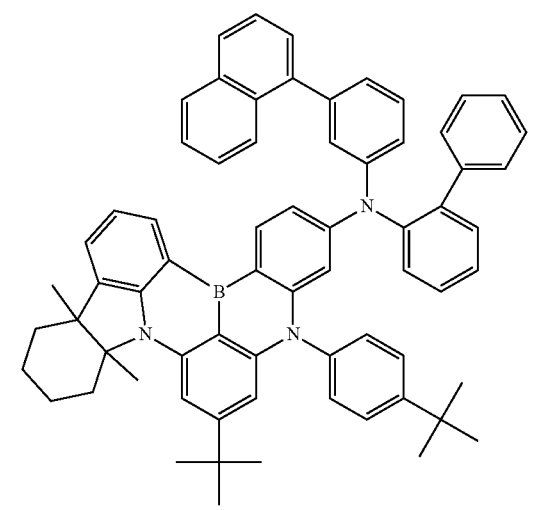
<Compound 123>
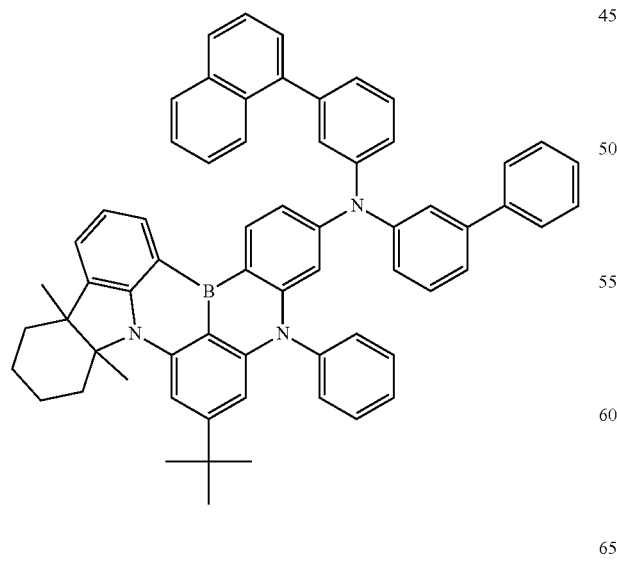
<Compound 124>
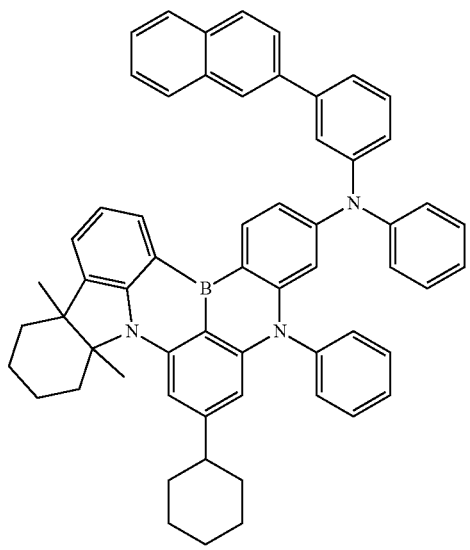
<Compound 125>
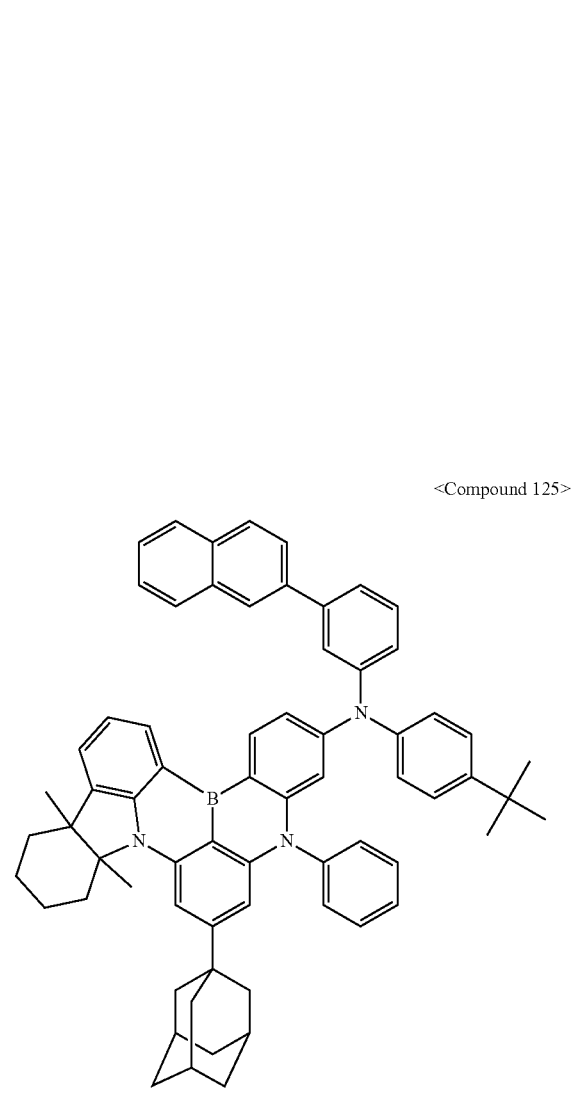

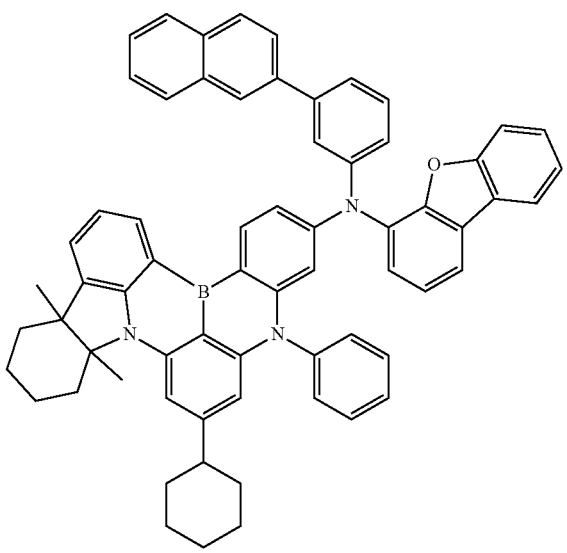
<Compound 126>

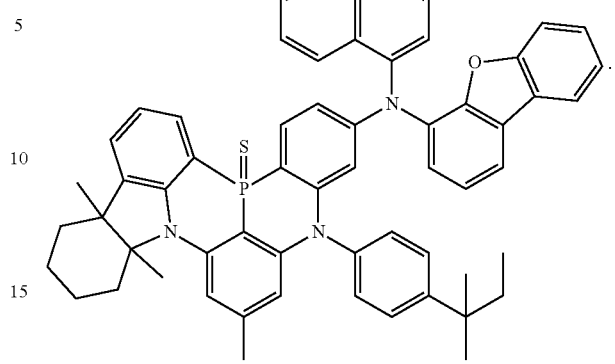
<Compound 129>

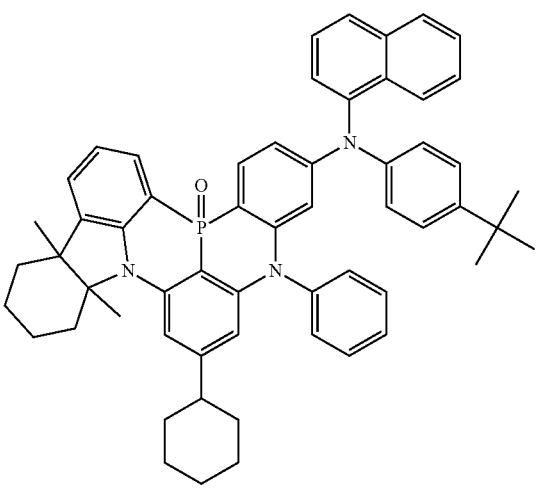
<Compound 127>

<Compound 128>

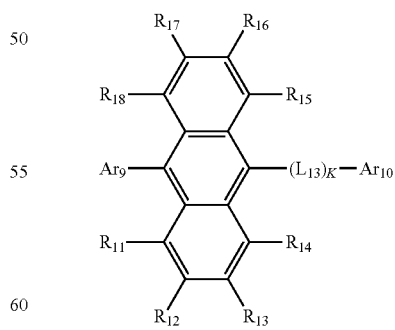

In particular some embodiments thereof, the present disclosure provides an organic light-emitting diode comprising: a first electrode; a second electrode facing the second electrode; and an organic layer interposed between the first electrode and the second electrode, wherein the organic layer includes a boron compound represented by Chemical Formula A.

Throughout the description of the present disclosure, the phrase "(an organic layer) includes at least one organic compound" may be construed to mean that "(an organic layer) may include a single organic compound species or two or more difference species of organic compounds falling within the scope of the present disclosure".

In this regard, the organic light-emitting diode according to the present disclosure may include at least one of a hole injection layer, a hole transport layer, a functional layer capable of both hole injection and hole transport, a light-emitting layer, an electron transport layer, an electron injection layer, and a capping layer.

In more particular embodiments of the present disclosure, the organic layer disposed between the first electrode and the second electrode includes a light-emitting layer composed of a host and a dopant, wherein the boron compound represented by Chemical Formula A serves as the dopant and an anthracene derivative represented by the following Chemical Formula D may be used as a host:

[Chemical Formula D]

wherein,
$R_{11}$ to $R_{18}$, which are the same or different, are each as defined for R in the boron compound above;
$Ar_9$ and $Ar_{10}$, which are the same or different, are each independently any one selected from a hydrogen atom, a deuterium atom, a substituted or unsubstituted alkyl of 1 to 30 carbon atoms, a substituted or unsubstituted aryl of 6 to 50 carbon atoms, a substituted or unsubstituted alkenyl of 2 to 30 carbon atoms, a substituted or unsubstituted alkynyl 2 to 20 carbon atoms, a substituted or unsubstituted cycloalkyl of 3 to 30 carbon atoms, a substituted or unsubstituted cycloalkenyl 5 to 30 carbon atoms, a substituted or unsubstituted heteroaryl of 2 to 50 carbon atoms, a substituted or unsubstituted heterocycloalkyl of 2 to 30 carbon atoms, a substituted or unsubstituted alkoxy of 1 to 30 carbon atoms, a substituted or unsubstituted aryloxy of 6 to 30 carbon atoms, a substituted or unsubstituted alkylthio of 1 to 30 carbon atoms, a substituted or unsubstituted arylthioxy of 6 to 30 carbon atoms, a substituted or unsubstituted alkylamine of 1 to 30 carbon atoms, a substituted or unsubstituted aryamine of 6 to 30 carbon atoms, a substituted or unsubstituted alkylsilyl of 1 to 30 carbon atoms, and a substituted or unsubstituted arylsilyl of 6 to 30 carbon atoms;

$L_{13}$, which functions as a linker, is a single bond or is selected from a substituted or unsubstituted arylene of 6 to 20 carbon atoms, and a substituted or unsubstituted heteroarylene of 2 to 20 carbon atoms; and k is an integer of 1 to 3, wherein when k is 2 or greater, the corresponding $L_{13}$'s are the same or different. Here, the term "substituted" in the expression "substituted or unsubstituted" used is as defined above In this case, $L_{13}$ may be a single bond or a substituted or unsubstituted arylene of 6 to 20 carbon atoms, and k may be 1 or 2, with the proviso that when k is 2, corresponding $L_{13}$'s may be the same or different.

For a more exemplary host, $Ar_9$ in Chemical Formula D may be a substituent represented by the following Chemical Formula D-1:

[Chemical Formula D-1]

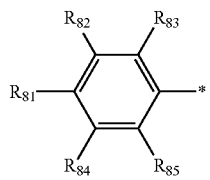

wherein, $R_{81}$ to $R_{85}$, which may be the same or different, are as defined for R above; and may each be linked to an adjacent one to form a saturated or unsaturated cyclic ring.

According to one embodiment, the anthracene derivative may be any one selected from the compounds represented by the following [Chemical Formula D1] to [Chemical Formula D48]:

<Chemical Formula D1>

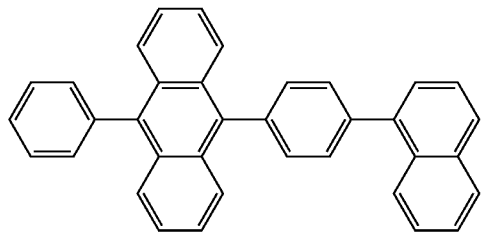

<Chemical Formula D2>

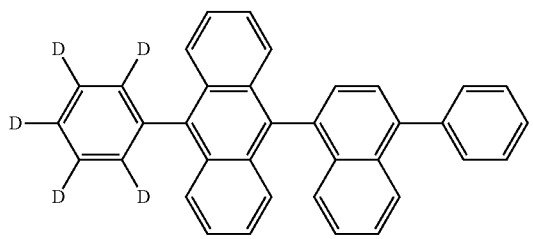

<Chemical Formula D3>

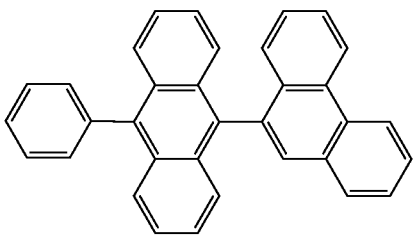

<Chemical Formula D4>

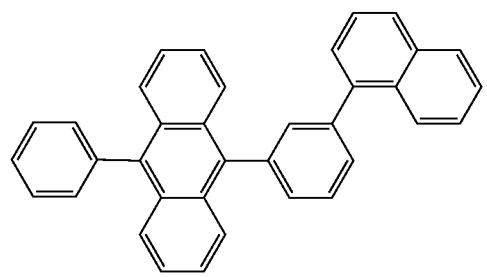

<Chemical Formula D5>

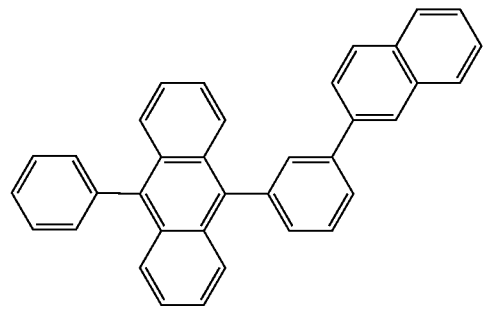

<Chemical Formula D 6>

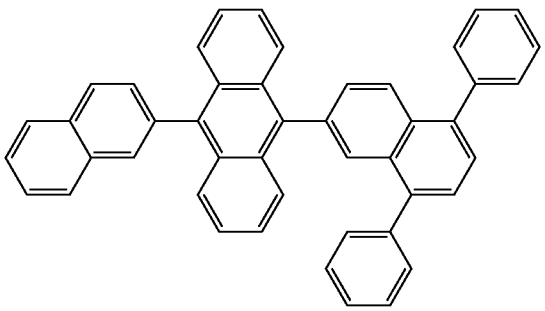

<Chemical Formula D7>
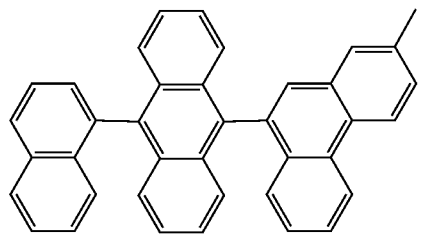
<Chemical Formula D8>
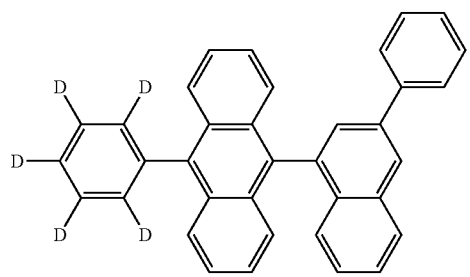
<Chemical Formula D9>
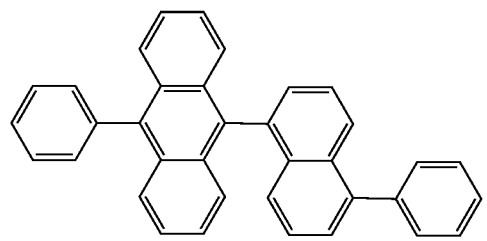
<Chemical Formula D10>
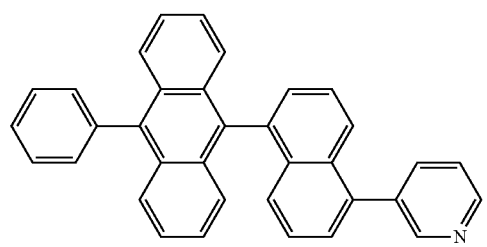
<Chemical Formula D11>
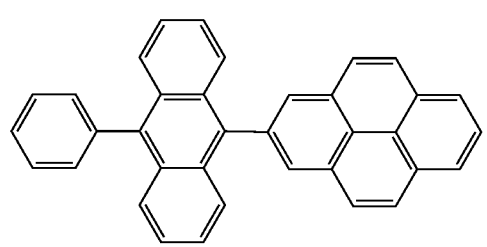
<Chemical Formula D12>
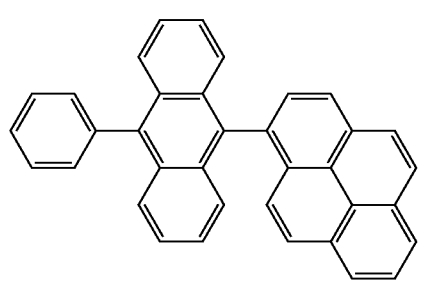
<Chemical Formula D13>
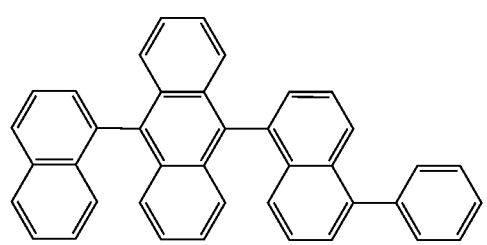
<Chemical Formula D14>
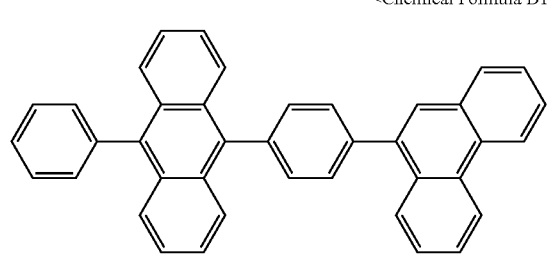
<Chemical Formula D15>
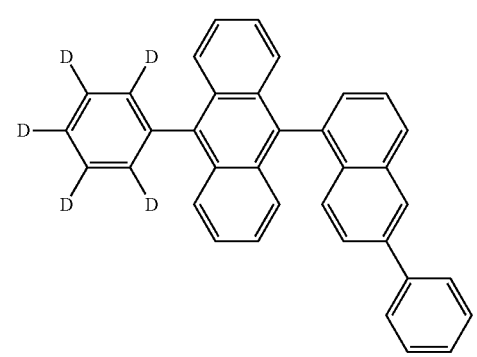
<Chemical Formula D16>
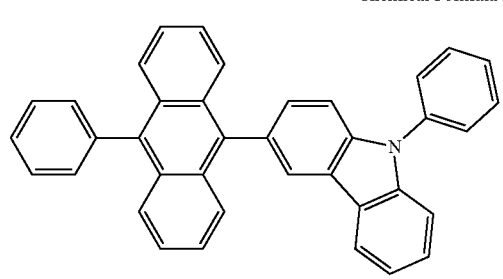
<Chemical Formula D17>
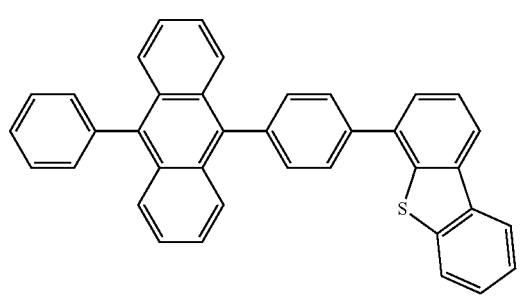

<Chemical Formula D18>
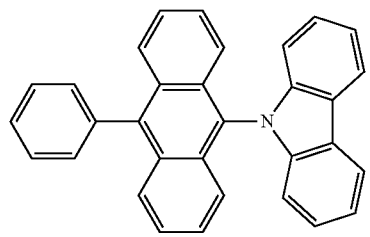
<Chemical Formula D19>
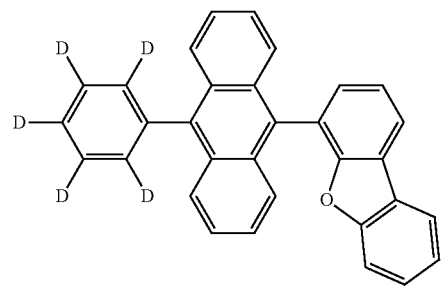
<Chemical Formula D20>
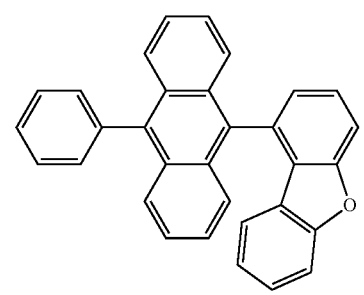
<Chemical Formula D21>
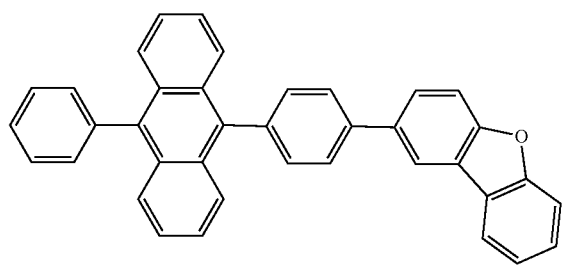
<Chemical Formula D22>
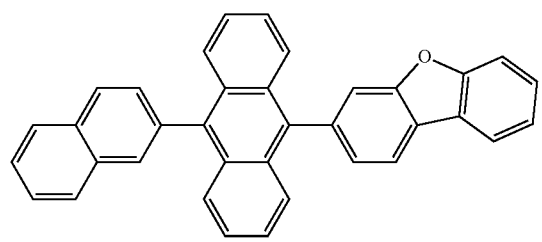
<Chemical Formula D23>
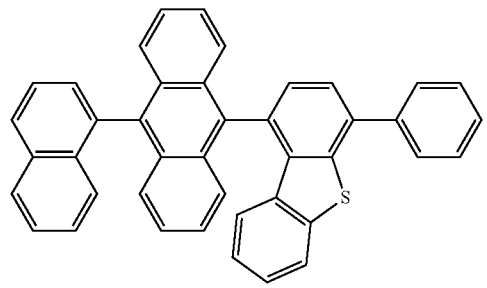
<Chemical Formula D24>
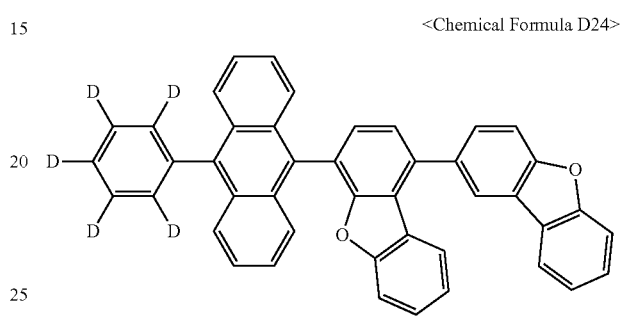
<Chemical Formula D25>
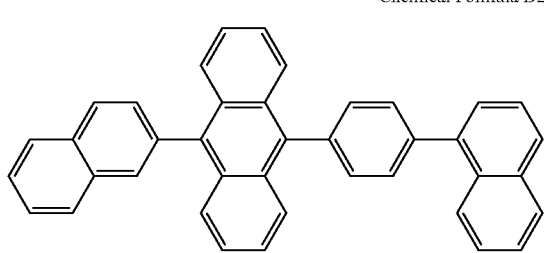
<Chemical Formula D26>
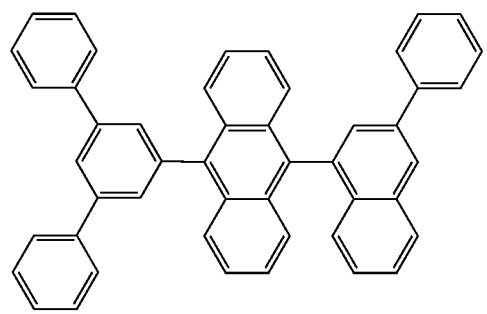
<Chemical Formula D27>
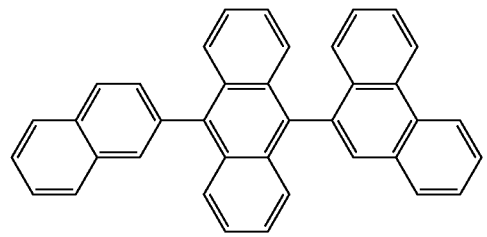

<Chemical Formula D28>
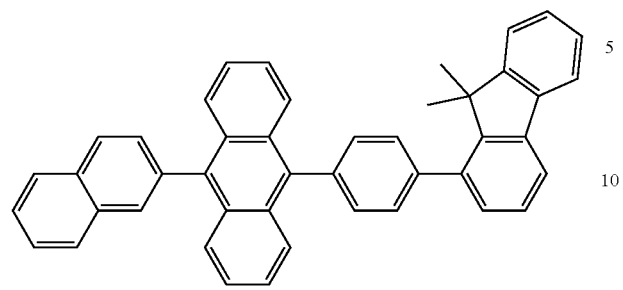
<Chemical Formula D29>
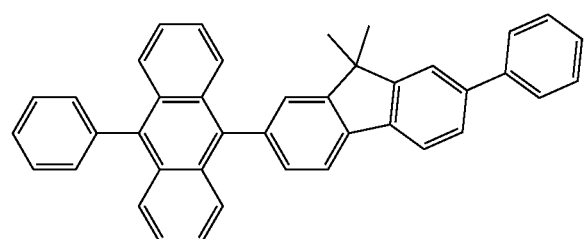
<Chemical Formula D30>
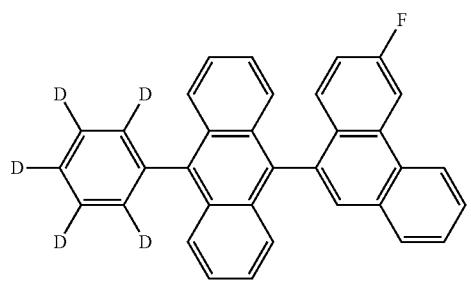
<Chemical Formula D31>
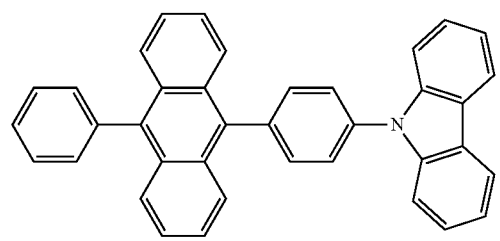
<Chemical Formula D32>
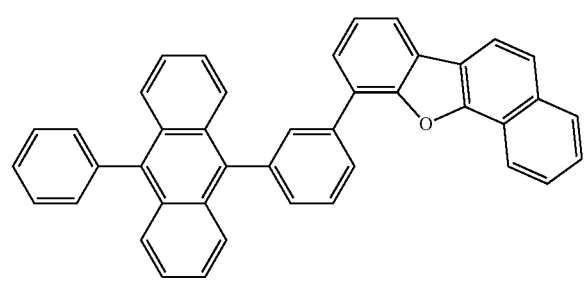
<Chemical Formula D33>
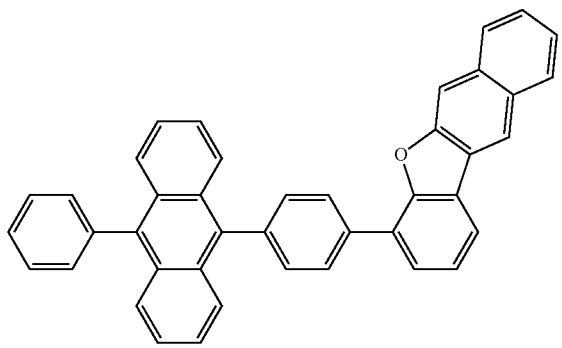
<Chemical Formula D34>
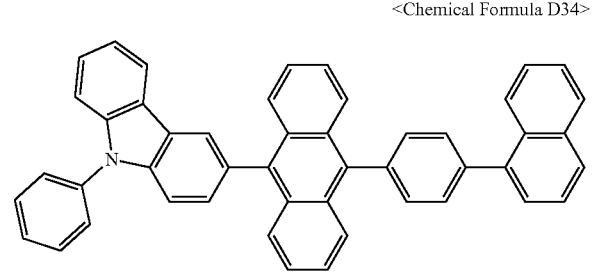
<Chemical Formula D35>
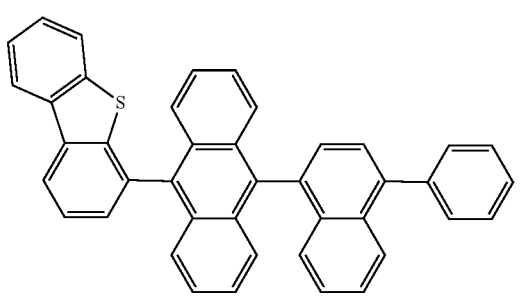
<Chemical Formula D36>
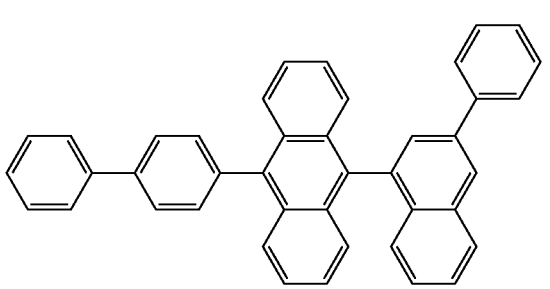
<Chemical Formula D37>
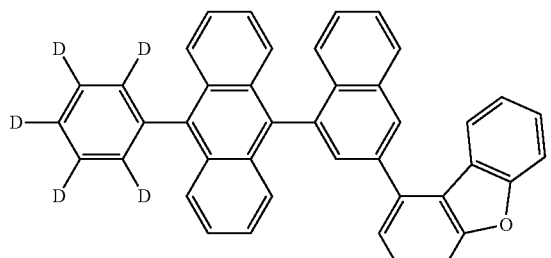

-continued
<Chemical Formula D38>
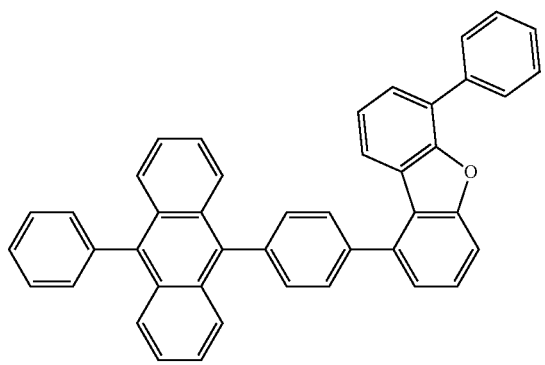
<Chemical Formula D39>
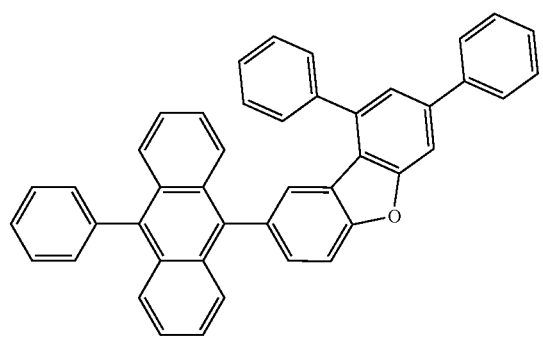
<Chemical Formula D40>
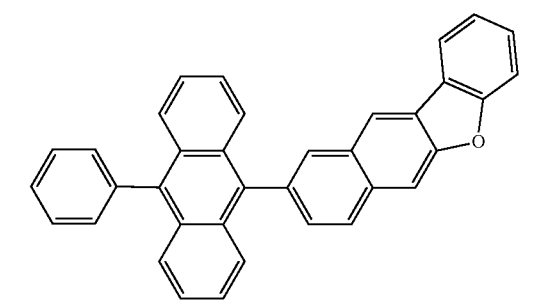
<Chemical Formula D41>
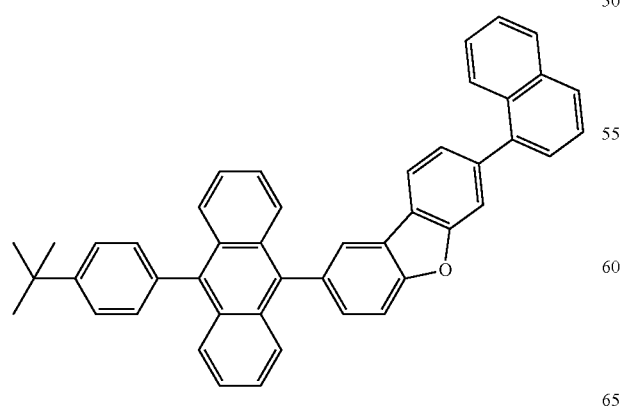
<Chemical Formula D42>
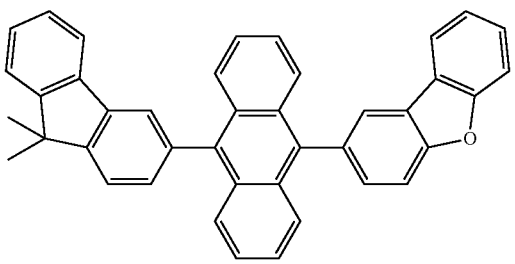
<Chemical Formula D43>
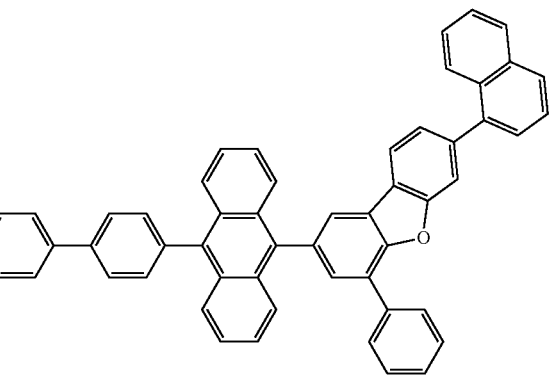
<Chemical Formula D44>
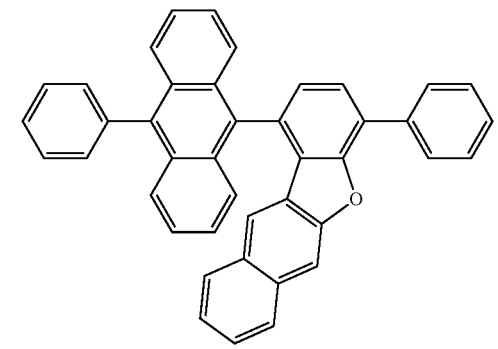
<Chemical Formula D45>

-continued

<Chemical Formula D46>

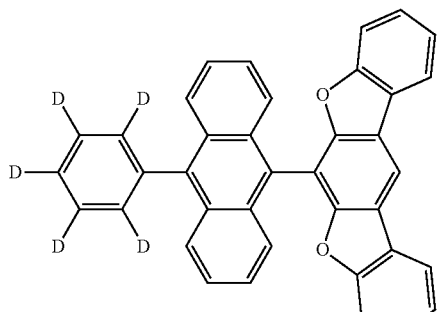

<Chemical Formula D47>

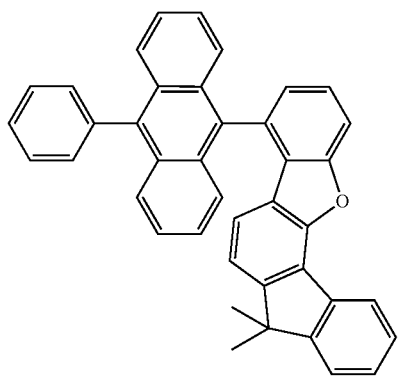

<Chemical Formula D48>

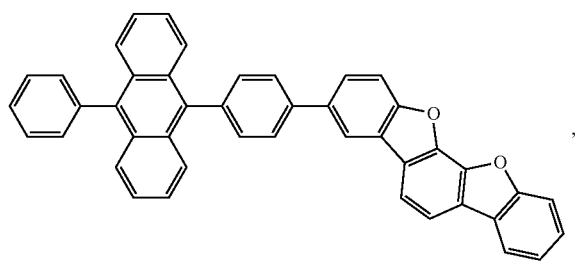

In a particular embodiment thereof, the present invention provides an organic light-emitting diode comprises: an anode as a first electrode; a cathode as a second electrode facing the first electrode; and an organic layer interposed between the anode and the cathode, wherein the organic layer comprises at least one of the boron compounds represented by Chemical Formula A as a dopant and at least one of the compounds represented by Chemical Formula D as a host. Having such structural characteristics, the organic light-emitting diode according to the present disclosure can be driven at a low voltage with high luminous efficiency.

The content of the dopant in the light-emitting layer may range from about 0.01 to 20 parts by weight, based on 100 parts by weight of the host, but is not limited thereto.

In addition to the above-mentioned dopants and hosts, the light-emitting layer may further include various hosts and dopant materials.

Below, the organic light-emitting diode of the present disclosure is explained with reference to the drawing.

FIGURE is a schematic cross-sectional view of the structure of an organic light-emitting diode according to an embodiment of the present disclosure.

As shown in FIGURE, the organic light-emitting diode according to an embodiment of the present disclosure comprises an anode 20, a hole transport layer 40, an organic light-emitting layer 50 containing a host and a dopant, an electron transport layer 60, and a cathode 80, wherein the anode and the cathode serve as a first electrode and a second electrode, respectively, with the interposition of the hole transport layer between the anode and the light-emitting layer, and the electron transport layer between the light-emitting layer and the cathode.

Furthermore, the organic light-emitting diode according to an embodiment of the present disclosure may comprise a hole injection layer 30 between the anode 20 and the hole transport layer 40, and an electron injection layer 70 between the electron transport layer 60 and the cathode 80.

Reference is made to FIGURE with regard to the organic light emitting diode of the present disclosure and the fabrication method therefor.

First, a substrate 10 is coated with an anode electrode material to form an anode 20. So long as it is used in a typical organic electroluminescence device, any substrate may be used as the substrate 10. Preferable is an organic substrate or transparent plastic substrate that exhibits excellent transparency, surface smoothness, ease of handling, and waterproofness. As the anode electrode material, indium tin oxide (ITO), indium zinc oxide (IZO), tin oxide ($SnO_2$), or zinc oxide (ZnO), which are transparent and superior in terms of conductivity, may be used.

A hole injection layer material is applied on the anode 20 by thermal deposition in a vacuum or by spin coating to form a hole injection layer 30. Subsequently, thermal deposition in a vacuum or by spin coating may also be conducted to form a hole transport layer 40 with a hole transport layer material on the hole injection layer 30.

So long as it is typically used in the art, any material may be selected for the hole injection layer without particular limitations thereto. Examples include, but are not limited to, 2-TNATA [4,4',4''-tris(2-naphthylphenyl-phenylamino)-triphenylamine], NPD [N,N'-di(1-naphthyl)-N,N'-diphenyl-benzidine)], TPD [N,N'-diphenyl-N,N'-bis(3-methylphenyl)-1,1'-biphenyl-4,4'-diamine], and DNTPD [N,N'-diphenyl-N,N'-bis-[4-(phenyl-m-tolyl-amino)-phenyl]-biphenyl-4,4'-diamine].

Any material that is typically used in the art may be selected for the hole transport layer without particular limitations thereto. Examples include, but are not limited to, N,N'-bis(3-methylphenyl)-N,N'-diphenyl-[1,1-biphenyl]-4,4'-diamine (TPD) and N,N'-di(naphthalen-1-yl)-N,N'-diphenylbenzidine (a-NPD).

In an embodiment of the present disclosure, an electron blocking layer may be additionally disposed on the hole transport layer. Functioning to prevent the electrons injected from the electron injection layer from entering the hole transport layer from the light-emitting layer, the electron blocking layer is adapted to increase the life span and luminous efficiency of the diode. The electron blocking layer may be formed of any of suitable materials or a combination thereof at a suitable position between the light emitting layer and the hole injection layer. Particularly, the electron blocking layer may be formed between the light emitting layer and the hole transport layer.

Next, the light-emitting layer 50 may be deposited on the hole transport layer 40 or the electron blocking layer by deposition in a vacuum or by spin coating.

Herein, the light-emitting layer may contain a host and a dopant and the materials are as described above.

In some embodiments of the present disclosure, the light-emitting layer particularly ranges in thickness from 50 to 2,000 Å.

Meanwhile, the electron transport layer 60 is applied on the light-emitting layer by deposition in a vacuum and spin coating.

A material for use in the electron transport layer functions to stably carry the electrons injected from the electron injection electrode (cathode), and may be an electron transport material known in the art. Examples of the electron transport material known in the art include quinoline derivatives, particularly, tris(8-quinolinolate)aluminum (Alq$_3$), Liq, TAZ, BAlq, beryllium bis(benzoquinolin-10-olate) (Bebq$_2$), Compound 201, Compound 202, BCP, and oxadiazole derivatives such as PBD, BMD, and BND, but are not limited thereto:

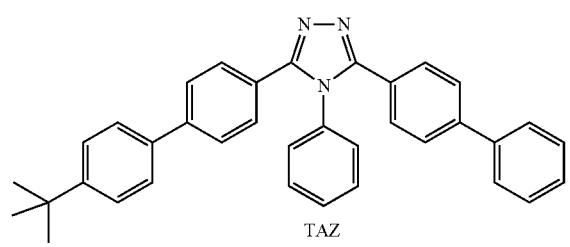

TAZ

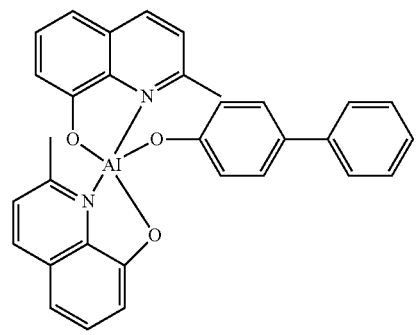

BAlq

<Compound 201>

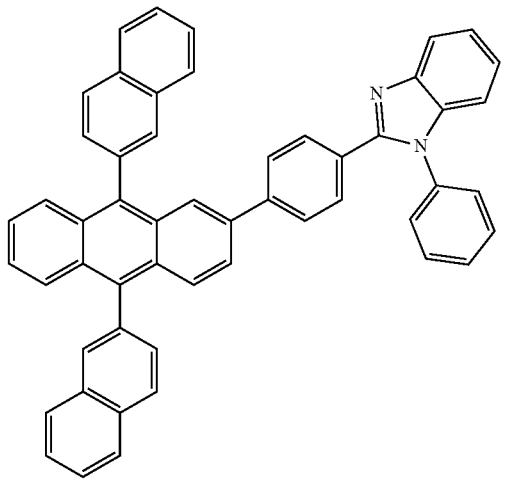

<Compound 202>

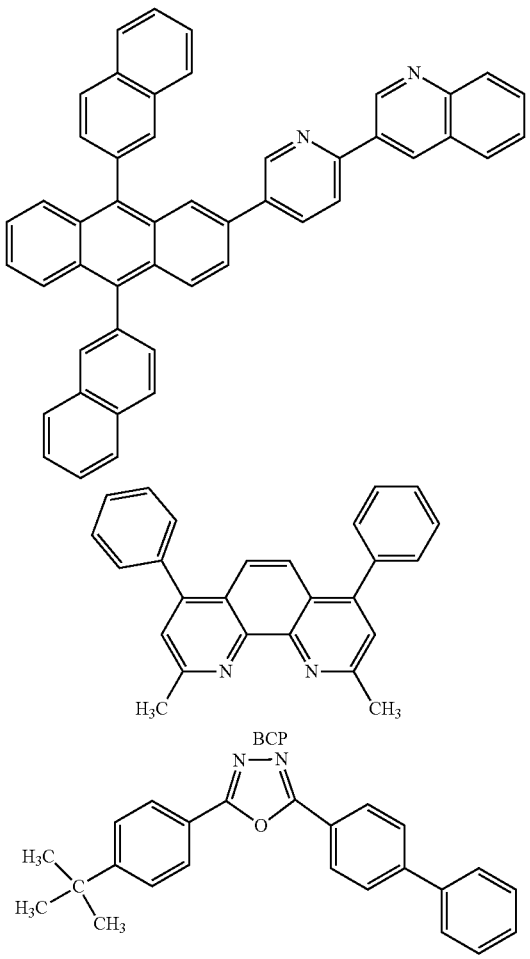

BCP

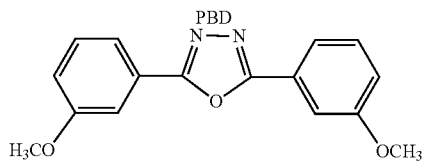

PBD

BMD

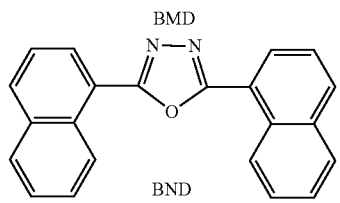

BND

In the organic light emitting diode of the present disclosure, an electron injection layer (EIL) that functions to facilitate electron injection from the cathode may be deposited on the electron transport layer. The material for the EIL is not particularly limited.

Any material that is conventionally used in the art can be available for the electron injection layer without particular limitations. Examples include CsF, NaF, LiF, Li$_2$O, and BaO. Deposition conditions for the electron injection layer may vary, depending on compounds used, but may be generally selected from condition scopes that are almost the same as for the formation of hole injection layers.

The electron injection layer may range in thickness from about 1 Å to about 100 Å, and particularly from about 3 Å to about 90 Å. Given the thickness range for the electron injection layer, the diode can exhibit satisfactory electron injection properties without actually elevating a driving voltage.

In order to facilitate electron injection, the cathode may be made of a material having a small work function, such as metal or metal alloy such as lithium (Li), magnesium (Mg), calcium (Ca), an alloy aluminum (Al) thereof, aluminum-lithium (Al—Li), magnesium-indium (Mg—In), and magnesium-silver (Mg—Ag). Alternatively, ITO or IZO may be employed to form a transparent cathode for an organic light-emitting diode.

Moreover, the organic light-emitting diode of the present disclosure may further comprise a light-emitting layer containing a blue, green, or red luminescent material that emits radiations in the wavelength range of 380 nm to 800 nm. That is, the light-emitting layer in the present disclosure has a multi-layer structure wherein the blue, green, or red luminescent material may be a fluorescent material or a phosphorescent material.

Furthermore, at least one selected from among the layers may be deposited using a single-molecule deposition process or a solution process.

Here, the deposition process is a process by which a material is vaporized in a vacuum or at a low pressure and deposited to form a layer, and the solution process is a method in which a material is dissolved in a solvent and applied for the formation of a thin film by means of inkjet printing, roll-to-roll coating, screen printing, spray coating, dip coating, spin coating, etc.

Also, the organic light-emitting diode of the present disclosure may be applied to a device selected from among flat display devices, flexible display devices, monochrome or grayscale flat illumination devices, and monochrome or grayscale flexible illumination devices.

A better understanding of the present disclosure may be obtained through the following examples which are set forth to illustrate, but are not to be construed as limiting the present invention.

EXAMPLES

Synthesis Example 1: Synthesis of Compound 1

Synthesis Example 1-(1): Synthesis of Intermediate 1-a

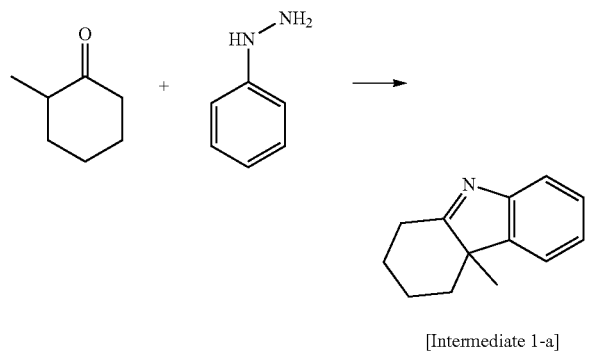

[Intermediate 1-a]

In a round-bottom flask, phenylhydrazine (100 g, 0.924 mol) and acetic acid (500 ml) were stirred and heated to 60° C. Slow addition of drops of 2-methyl cyclohexanone (103.6 g, 0.924 mol) were followed by stirring under reflux for 8 hours. After completion of the reaction, extraction was made using water and ethyl acetate and the extract was concentrated and isolated by column chromatography to afford [Intermediate 1-a] (130 g, yield 76%).

Synthesis Example 1-2. Synthesis of [Intermediate 1-b]

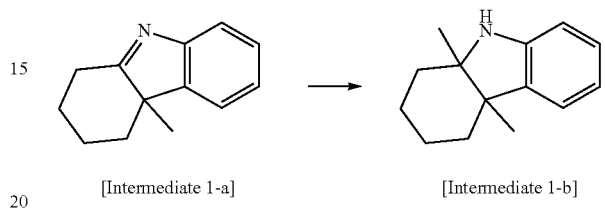

[Intermediate 1-a]        [Intermediate 1-b]

In a round-bottom flask, [Intermediate 1-a] (75 g, 405 mmol) was added to toluene (750 ml) and chilled to −10° C., followed by slowly adding drops of 1.6 M methyl lithium (380 ml, 608 mmol) and stirring at −10° C. for 3 hours. After completion of the reaction, extraction was made using water and ethyl acetate and the extract was concentrated and isolated by column chromatography to afford [Intermediate 1-b] (50.5 g, yield 62%)

Synthesis Example 1-3. Synthesis of [Intermediate 1-c]

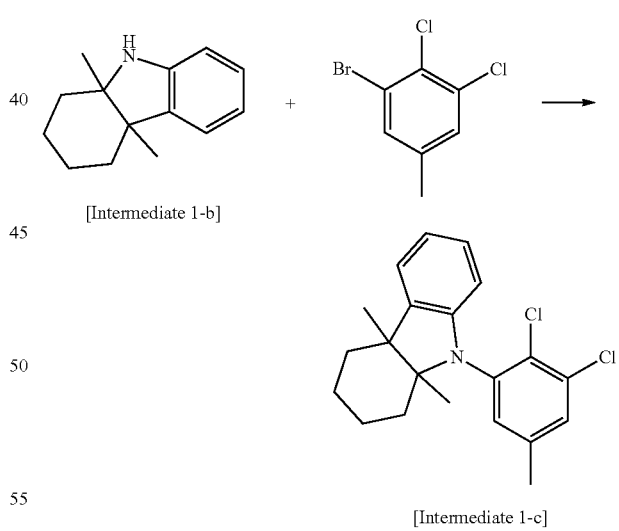

[Intermediate 1-b]

[Intermediate 1-c]

In a round-bottom flask, [Intermediate 1-b] (40 g, 199 mmol), 1-bromo-2,3-dichloro-5-methylbenzene (47.7 g, 251 mmol), trisdibenzylidene acetone dipalladium (7.3 g, 7.9 mmol), tri-tert-butyl phosphine (3.2 g, 15.9 mmol), sodium tert-butoxide (38.2 g, 397 mmol), and toluene (400 ml) were fluxed for 12 hours under a nitrogen atmosphere. After completion of the reaction, the organic layer was concentrated and isolated by column chromatography to afford [Intermediate 1-c]. (23 g, yield 32%)

Synthesis Example 1-4. Synthesis of [Intermediate 1-d]

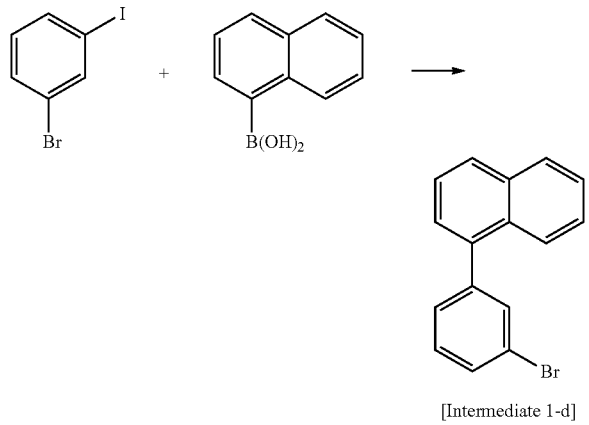

[Intermediate 1-d]

In a round bottom flask, 1-bromo-3-iodobenzene, naphthalene-1-ylboronic acid, tetrakis(triphenylphosphine) palladium (1.8 g, 1.6 mmol), potassium carbonate (17.6 g, 127 mmol), tetrahydrofuran (300 ml), toluene (300 ml), and water (120 ml) were fluxed for 24 hours under a nitrogen atmosphere. After completion of the reaction, the reaction mixture was cooled to room temperature and subjected to extraction. The organic layer thus obtained was concentrated in a vacuum and isolated by column chromatography to afford [Intermediate 1-d] (19 g, yield 70.3%).

Synthesis Example 1-5. Synthesis of [Intermediate 1-e]

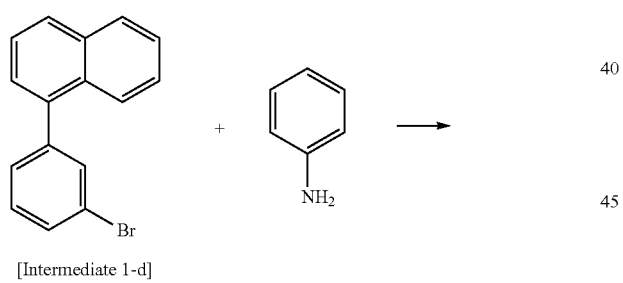

[Intermediate 1-d]

[Intermediate 1-e]

In a round-bottom flask, [Intermediate 1-d] (19 g, 67 mmol), aniline (6.2 g, 67 mmol), tris(dibenzylideneacetone)dipalladium (1.2 g, 1 mmol), sodium tert-butoxide (7.7 g, 81 mmol), bis(diphenylphosphino)-1,1'-binaphthyl (0.8 g, 1 mmol), and toluene (200 mL) were stirred together for 24 hour under reflux. After completion of the reaction, the organic layer was extracted, concentrated in a vacuum, and isolated by column chromatography to afford [Intermediate 1-e] (15.2 g, yield 77%).

Synthesis Example 1-6. Synthesis of [Intermediate 1-f]

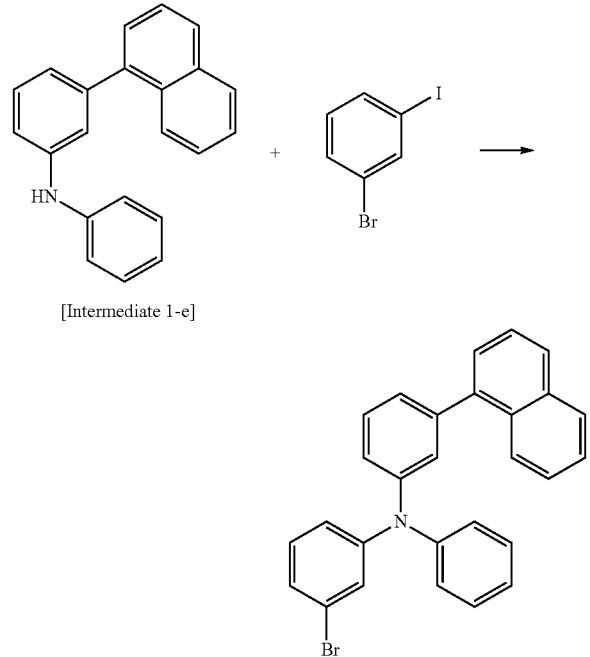

[Intermediate 1-e]

[Intermediate 1-f]

In a round-bottom flask, [Intermediate 1-e] (15.2 g, 51 mmol), 1-bromo-3-iodobenzene (18.9 g, 67 mmol), tris(dibenzylideneacetone)dipalladium (0.9 g, 1 mmol), sodium tert-butoxide (6.4 g, 67 mmol), bis(diphenylphosphino)-1,1'-binaphthyl (0.6 g, 1 mmol), and toluene (150 mL) were stirred for 24 hours under reflux. After completion of the reaction, the organic layer was extracted, concentrated in a vacuum, and isolated by column chromatography to afford [Intermediate 1-f] (14.9 g, yield 64%)

Synthesis Example 1-7. Synthesis of [Intermediate 1-g]

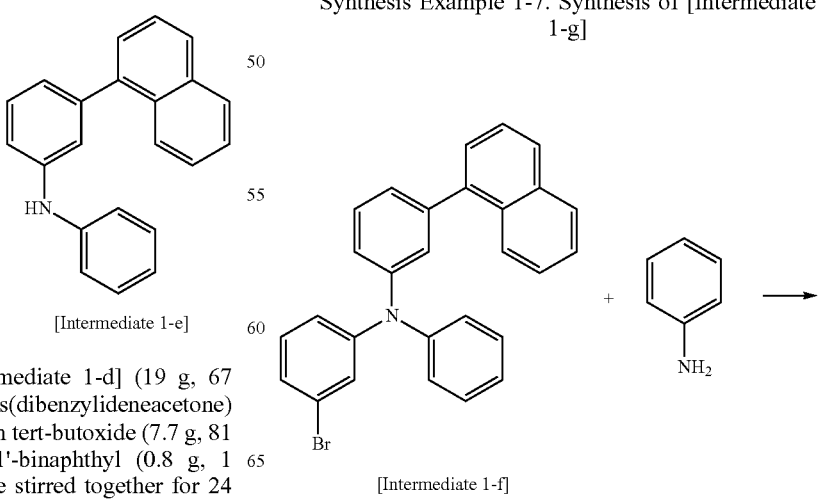

[Intermediate 1-f]

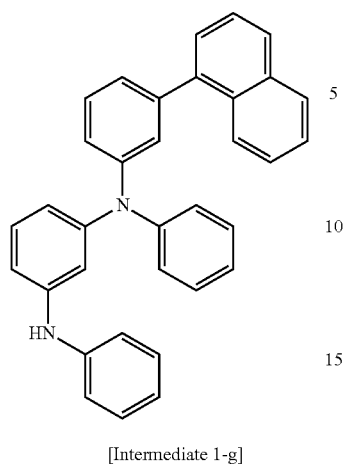

[Intermediate 1-g]

In a round-bottom flask, [Intermediate 1-f] (14.9 g, 33 mmol), aniline (3.1 g, 33 mmol), tris(dibenzylideneacetone)dipalladium (0.6 g, 0.7 mmol), sodium tert-butoxide (3.8 g, 40 mmol), bis(diphenylphosphino)-1,1'-binaphthyl (0.4 g, 0.7 mmol), and toluene (150 mL) were stirred for 20 hours under reflux. After completion of the reaction, the organic layer was extracted, concentrated in a vacuum, and isolated by column chromatography to afford [Intermediate 1-g] (11.4 g, yield 75%).

Synthesis Example 1-8. Synthesis of [Intermediate 1-h]

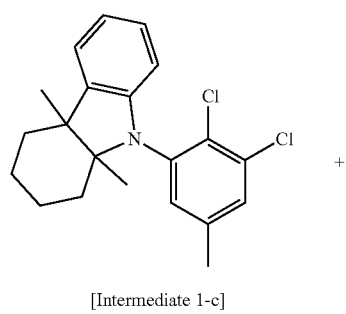

[Intermediate 1-c]

+

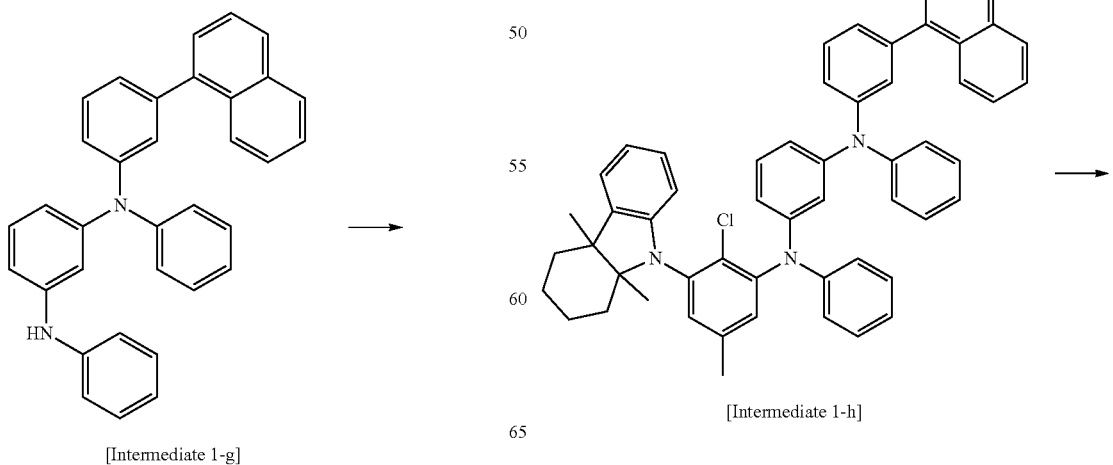

[Intermediate 1-g]

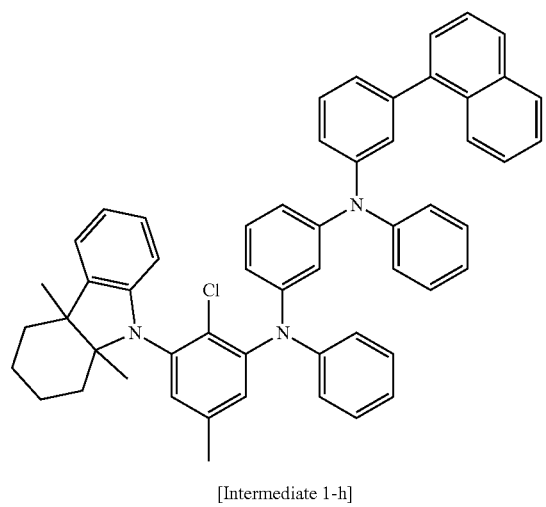

[Intermediate 1-h]

In a round-bottom flask, [Intermediate 1-c] (8.9 g, 25 mmol), [Intermediate 1-g] 11.4 g (25 mmol), tris(dibenzylideneacetone)dipalladium (0.5 g, 0.5 mmol), sodium tert-butoxide (3.6 g, 37 mmol), tri-tert-butylphosphine (0.1 g, 0.5 mmol), and toluene (120 mL) were stirred for 6 hours under reflux. After completion of the reaction, the organic layer was extracted, concentrated in a vacuum, and isolated by column chromatography. Recrystallization in dichloromethane and methanol afforded [Intermediate 1-h] (12.7 g, yield 65%).

Synthesis Example 1-9. Synthesis of [Compound 1]

[Intermediate 1-h]

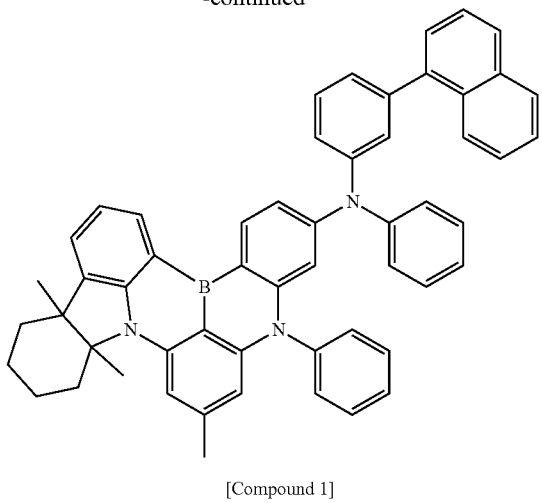

[Compound 1]

In a reactor, [Intermediate 1-h] (12.7 g, 16 mmol) and tert-butylbenzene (89 ml) were put under a nitrogen atmosphere. At −78° C., 1.6 M tert-butyl lithium (20.2 mL, 32 mmol) was dropwise added, followed by stirring at 60° C. for 2 hours. Boron tribromide (8.1 ml, 32 mmol) was dropwise added again at −78° C., followed by stirring at room temperature for 1 hour. N, N-diiso propylethylamine (4.2 g, 32 mmol) was dropwise added at 0° C., followed by stirring at 120° C. for 3 hours. After completion of the reaction, an aqueous solution of sodium acetate was added at room temperature and then stirred. The organic layer was extracted with ethylacetate, concentrated in a vacuum, and isolated by column chromatography to afford [Compound 1] (1.3 g, yield 10.6%)

Synthesis Example 2: Synthesis of Compound 2

The same procedure as in Synthesis Example 1-5 was carried out, with the exception of using 4-tert-butylaniline instead of aniline, to afford Compound 2. (yield 13%)

Synthesis Example 3: Synthesis of Compound 12

The same procedure as in Synthesis Example 1-7 was carried out, with the exception of using 4-amino-dibenzofuran instead of aniline, to afford Compound 12. (yield 7%)

Synthesis Example 4: Synthesis of Compound 40

The same procedure as in Synthesis Example 1-3 was carried out, with the exception of using 1-bromo-2,3-dichlorobenzene instead of 1-bromo-2,3-dichloro-5-methylbenzene, to afford Compound 40. (yield 12%)

Synthesis Example 5: Synthesis of Compound 49

The same procedure as in Synthesis Example 1-4 was carried out, with the exception of using 2-naphthalene boronic acid instead of 1-naphthalene boronic acid, to afford Compound 49. (yield 10%)

Synthesis Example 6: Synthesis of Compound 50

The same procedures as in Synthesis Examples 1-4 and 1-5 were carried out, with the exception of using 2-naphthalene boronic acid and 4-tert-butylanilin instead of 1-naphthalene boronic acid of Synthesis Example 1-4 and aniline of Synthesis Example 1-5, respectively, to afford Compound 50.

Synthesis Example 7: Synthesis of Compound 58

The same procedures as in Synthesis Examples 1-1 and 1-4 were carried out, with the exception of using 4-tert-butylphenylhydrazine and 2-naphthalene boronic acid instead of phenylhydrazine of Synthesis Example 1-1 and 1-naphthalene boronic acid of Synthesis Example 1-4, respectively, to afford Compound 58.

Synthesis Example 8: Synthesis of Compound 70

The same procedures as in Synthesis Examples 1-3 and 1-4 were carried out, with the exception of using 1-bromo-2,3-dichlorobenzene and 2-naphthalene boronic acid instead of 1-bromo-2,3-dichloro-5-methylbensene of Synthesis Example 1-3 and 1-naphthalene boronic acid of Synthesis Example 1-4, respectively, to afford Compound 70.

Synthesis Example 9: Synthesis of Compound 85

The same procedures as in Synthesis Examples 1-3 and 1-5 were carried out, with the exception of using 1-bromo-2,3-dichloro-5-tert-butylbenzene and 1-bromonaphthalene instead of 1-bromo-2,3-dichloro-5-methylbenzene of Synthesis Example 1-3 and [Intermediate 1-d] of Synthesis Example 1-5, respectively, to afford Compound 85.

Synthesis Example 10: Synthesis of Compound 90

The same procedure as in Synthesis Example 1-5 was carried out, with the exception of using 2-bromonaphthalene and 4-amino-dibenzofuran instead of [Intermediate 1-d] and aniline, respectively, to afford Compound 90.

Examples 1 to 10: Fabrication of Organic Light-Emitting Diodes

An ITO glass substrate was patterned to have a translucent area of 2 mm×2 mm and cleansed. The ITO glass was mounted in a vacuum chamber that was then set to have a base pressure of $1\times10^{-7}$ torr. On the ITO glass substrate, films were sequentially formed of DNTPD (700 Å) and [Chemical Formula H] (300 Å).

Subsequently, a light-emitting layer (250 Å) was formed of a combination of the host (BH1) described below and the boron compound (3 wt %) of the present disclosure. Then, [Chemical Formula E-1] and [Chemical Formula E-2] was deposited at a weight ratio of 1:1 to form an electron transport layer (300 Å) on which an electron injection layer of [Chemical Formula E-1] (5 Å) was formed and then covered with an Al layer (1000 Å) to fabricate an organic light-emitting diode.

The organic light-emitting diodes thus obtained were measured at 0.4 mA for luminescence properties.

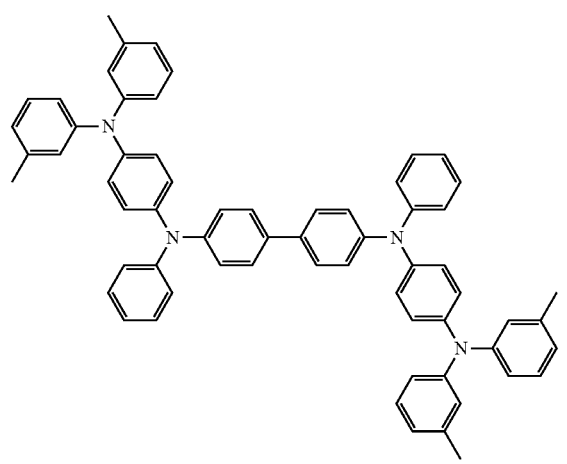

[DNTPD]

[Chemical Formula H]

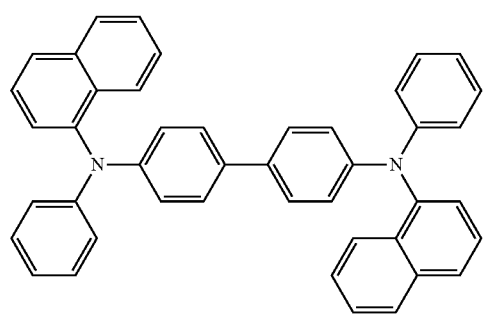

[Chemical Formula E-1]

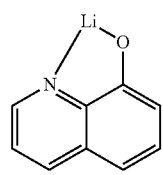

[Chemical Formula E-2]

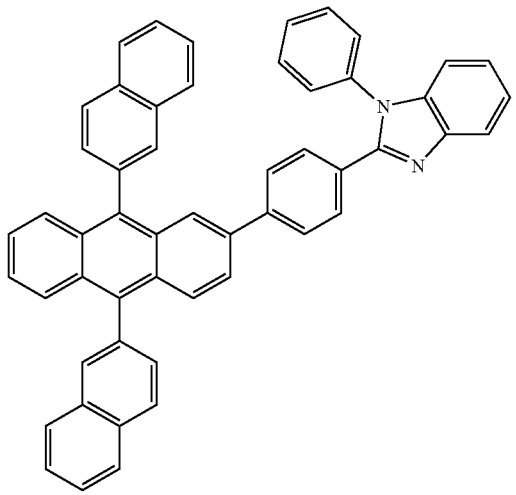

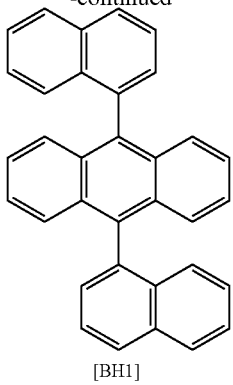

[BH1]

Comparative Examples 1 and 2

Organic light emitting diodes were fabricated in the same manner as in the Examples 1, with the exception of using [BD1] and [BD2] as dopants instead of the compounds according to the present disclosure. The luminescence of the organic light-emitting diodes thus obtained was measured at 0.4 mA. Structures of compounds [BD1] and [BD2] are as follows:

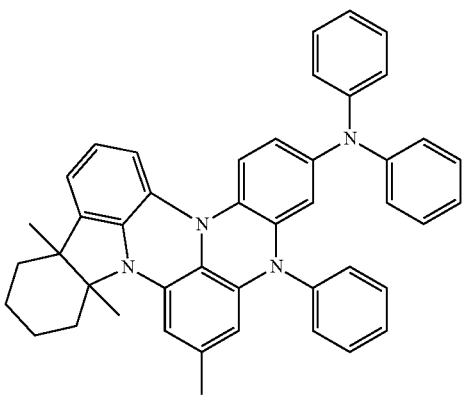

[BD2]

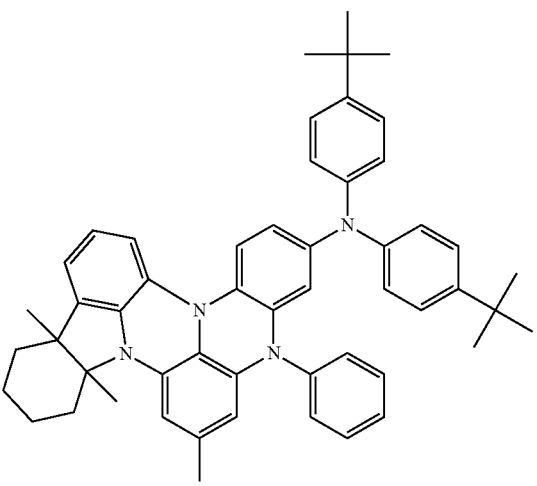

[BD2]

The organic light emitting diodes fabricated in Examples 1 to and Comparative Examples 1 and 2 were measured for driving voltage, external quantum efficiency and life span, and the results are summarized in Table 1, below.

TABLE 1

| Example # | Dopant | Current Density (mA/cm$^2$) | Volt. (V) | External Quantum Efficiency | T90 (hr) |
|---|---|---|---|---|---|
| 1 | Cpd. 1 | 10 | 4.0 | 9.3 | 292 |
| 2 | Cpd. 2 | 10 | 4.0 | 9.4 | 302 |
| 3 | Cpd. 12 | 10 | 3.9 | 9.6 | 293 |
| 4 | Cpd. 40 | 10 | 4.0 | 9.2 | 330 |
| 5 | Cpd. 49 | 10 | 3.9 | 9.4 | 302 |
| 6 | Cpd. 50 | 10 | 4.0 | 9.3 | 297 |
| 7 | Cpd. 58 | 10 | 4.0 | 9.8 | 265 |
| 8 | Cpd. 70 | 10 | 4.0 | 9.4 | 340 |
| 9 | Cpd. 85 | 10 | 4.0 | 9.5 | 335 |
| 10 | Cpd. 90 | 10 | 3.9 | 9.4 | 322 |
| C. 1 | BD1 | 10 | 4.0 | 8.8 | 195 |
| C. 2 | BD2 | 10 | 4.0 | 8.9 | 210 |

As is understood from data of Table 1 for Examples 1 to 10, the boron compounds according to the present disclosure allow longevity and high quantum efficiency compared to Comparative Examples 1 and 2, thus finding high availability for organic light-emitting diodes.

INDUSTRIAL APPLICABILITY

As a dopant material in an organic light-emitting diode, the novel boron compound according to the present disclosure exhibits longer lifespan and higher efficiency, compared to conventional materials and guarantee the organic light-emitting diode improved properties. Accordingly, the compound is highly industrially available in the field of organic light-emitting diodes and relevant fields.

The invention claimed is:

1. A boron compound represented by the following Chemical Formula A:

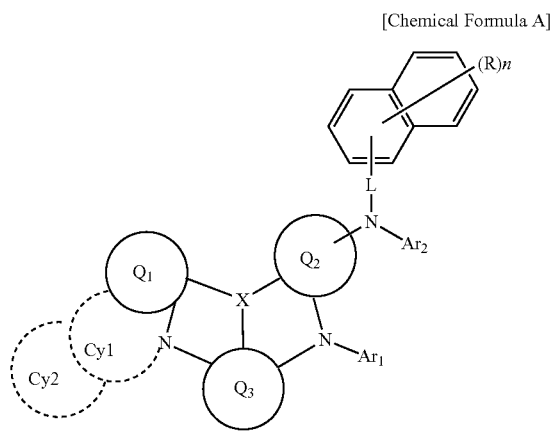

[Chemical Formula A]

wherein, $Q_1$ to $Q_3$, which are same or different, are each independently a substituted or unsubstituted aromatic hydrocarbon ring of 6 to 50 carbon atoms, or a substituted or unsubstituted heteroaromatic ring of 2 to 50 carbon atoms, X is a boron atom (B), $Ar_1$ and $Ar_2$, which are same or different, are each independently any one selected from a substituted or unsubstituted aryl of 6 to 18 carbon atoms, and a substituted or unsubstituted heteroaryl of 2 to 18 carbon atoms, R is any one selected from a hydrogen atom, a deuterium atom, a substituted or unsubstituted, linear, branched, or cyclic alkyl of 1 to 30 carbon atoms, a substituted or unsubstituted, linear, branched, or cyclic halogenated alkyl of 1 to 30 carbon atoms, a substituted or unsubstituted aryl of 6 to 50 carbon atoms, a substituted or unsubstituted heteroaryl of 2 to 50 carbon atoms, a substituted or unsubstituted alkylsilyl of 1 to 30 carbon atoms, a substituted or unsubstituted arylsilyl of 6 to 30 carbon atoms, a nitro, a cyano, and a halogen, $Ar_1$ may be connected to the $Q_2$ ring moiety or $Q_3$ ring moiety to form an additional mono- or polycyclic aliphatic or aromatic ring, n is an integer of 1 to 7 wherein when n is two or greater, the corresponding R's are same or different, L, which functions as a linker, is any one selected from a single bond, a substituted or unsubstituted arylene of 6 to 30 carbon atoms, and a substituted or unsubstituted heteroarylene of 1 to 30 carbon atoms, Cy1 is connected to each of the nitrogen (N) atom and the aromatic carbon atom in the $Q_1$ ring to form a condensed ring, and the ring formed by Cy1 is a substituted or unsubstituted alkylene group of 1 to 10 carbon atoms except for the nitrogen (N) atom, the aromatic carbon atom in the $Q_1$ ring to which the nitrogen (N) atom is bonded, and the aromatic carbon atom in the $Q_1$ ring to which Cy1 is bonded, and Cy2 is added to Cy1 to form a saturated hydrocarbon ring, and the ring formed by Cy2 is a substituted or unsubstituted alkylene group of 1 to 10 carbon atoms except for the carbon atoms from Cy1, wherein, the term "substituted" in the expression "substituted or unsubstituted" used for the compound of Chemical Formula A means having at least one substituent selected from the group consisting of a deuterium atom, a cyano, a halogen, a nitro, a linear, branched, or cyclic alkyl of 1 to 24 carbon atoms, a linear, branched, or cyclic halogenated alkyl of 1 to 24 carbon atoms, an aryl of 6 to 24 carbon atoms, an arylalkyl of 7 to 24 carbon atoms, an alkylaryl of 7 to 24 carbon atoms, a heteroaryl of 2 to 24 carbon atoms, a heteroarylalkyl of 2 to 24 carbon atoms, an alkoxy of 1 to 24 carbon atoms, an alkylamino of 1 to 24 carbon atoms, a diarylamino of 12 to 24 carbon atoms, a diheteroarylamino of 2 to 24 carbon atoms, an aryl(heteroaryl)amino of 7 to 24 carbon atoms, an alkylsilyl of 1 to 24 carbon atoms, and an arylsilyl of 6 to 24 carbon atoms.

2. The boron compound of claim 1, wherein the linker L is a single bond or a substituted or unsubstituted arylene of 6 to 18 carbon atoms.

3. The boron compound of claim 1, wherein $Ar_1$ is a substituent represented by the following Structural Formula A:

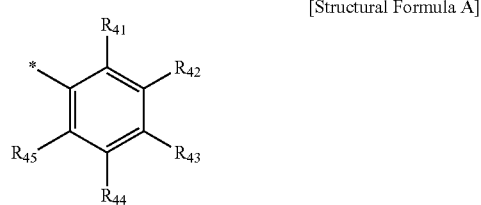

[Structural Formula A]

wherein

"-*" denotes a bonding site at which $Ar_1$ bonds to the nitrogen (N) atom, and $R_{41}$ to $R_{45}$, which are same or different, are each independently any one selected from a hydrogen atom, a deuterium atom, a substituted or unsubstituted linear, branched, or cyclic alkyl of 1 to 24 carbon atoms, a substituted or unsubstituted aryl of 6 to 24 carbon atoms, a substituted or unsubstituted heteroaryl of 2 to 24 carbon atoms, a substituted or unsubstituted alkoxy of 1 to 24 carbon atoms, a substituted or unsubstituted alkylamine of 1 to 24 carbon atoms, a substituted or unsubstituted akylsilyl of 1 to 24 carbon atoms, a substituted or unsubstituted arylsilyl of 6 to 24 carbon atoms, a nitro, a cyano, and a halogen, and a linkage can be formed between any adjacent two of $R_{41}$ to $R_{45}$ or between any one of $R_{41}$ to $R_{45}$ and $Q_2$ or $Q_3$ to form an additional mono- or polycyclic aliphatic or aromatic ring.

4. The boron compound of claim 1, wherein $Q_1$ to $Q_3$, which are same or different, are each independently a substituted or unsubstituted aromatic hydrocarbon of 6 to 30 carbon atoms.

5. The boron compound of claim 4, wherein the aromatic hydrocarbon ring of $Q_2$ in Chemical Formula A is a ring represented by Structural Formula B or C, below:

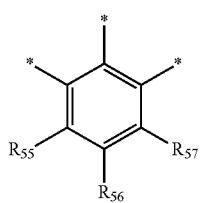

[Structural Formula B]

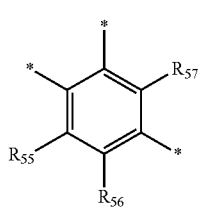

[Structural Formula C]

wherein "-*" denotes bonding sites at which the corresponding carbons in the aromatic ring of $Q_2$ bond to X, the nitrogen atom (N) in the linker —$N(Ar_1)$—, and the nitrogen atom (N) linked to the linker L, respectively, and $R_{55}$ to $R_{57}$, which are same or different, are each independently any one selected from a hydrogen atom, a deuterium atom, a substituted or unsubstituted linear, branched, or cyclic alkyl of 1 to 24 carbon atoms, a substituted or unsubstituted aryl of 6 to 24 carbon atoms, a substituted or unsubstituted heteroaryl of 2 to 24 carbon atoms, a substituted or unsubstituted alkoxy of 1 to 24 carbon atoms, a substituted or unsubstituted alkylamine of 1 to 24 carbon atoms, a substituted or unsubstituted akylsilyl of 1 to 24 carbon atoms, a substituted or unsubstituted arylsilyl of 6 to 24 carbon atoms, a cyano, and a halogen, and any adjacent two of $R_{55}$ to $R_{57}$ can be linked to each to each other to form an additional mono- or polycyclic aliphatic or aromatic ring.

6. The boron compound of claim 4, wherein $Q_1$ and $Q_3$ ring moieties are same or different and are each independently a ring represented by the following Structural Formula D:

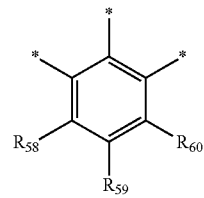

[Structural Formula D]

wherein the "-*" denotes bonding sites at which the corresponding carbons in the aromatic ring of $Q_1$ bond to X, the nitrogen atom (N), and a carbon atom in the Cy1 ring moiety, respectively or at which the corresponding carbons in the aromatic ring of $Q_3$ bond to X and the two nitrogen atoms (N), respectively, and $R_{58}$ to $R_{60}$, which are same or different, are each independently any one selected from a hydrogen atom, a deuterium atom, a substituted or unsubstituted linear, branched, or cyclic alkyl of 1 to 24 carbon atoms, a substituted or unsubstituted aryl of 6 to 24 carbon atoms, a substituted or unsubstituted heteroaryl of 2 to 24 carbon atoms, a substituted or unsubstituted akylsilyl of 1 to 24 carbon atoms, a substituted or unsubstituted arylsilyl of 6 to 24 carbon atoms, a cyano, and a halogen, and any adjacent two of $R_{58}$ to $R_{60}$ can be linked to each to each other to form an additional mono- or polycyclic aliphatic or aromatic ring.

7. The boron compound of claim 1, wherein Cy1 partially includes members of the ring accounted for by Cy2 in Chemical Formula A and is a linker represented by Structural Formula E:

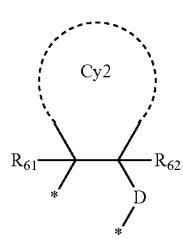

[Structural Formula E]

wherein "-*" denotes a bonding site to a carbon within the aromatic ring of $Q_1$, or to the nitrogen atom, D is a single bond, or —$C(R_{63})(R_{64})$— or —$C(R_{65})(R_{66})$—$C(R_{67})(R_{68})$—, $R_{61}$ to $R_{68}$, which are same or different, are each independently selected from a hydrogen atom, a deuterium atom, a halogen, a substituted or unsubstituted linear, branched, or cyclic alkyl of 1 to 24 carbon atoms, a substituted or unsubstituted aryl of 6 to 20 carbon atoms, a substituted or unsubstituted heteroaryl of 2 to 20 carbon atoms, a substituted or unsubstituted alkylsilyl of 1 to 20 carbon atoms, and a substituted or unsubstituted arylsilyl of 6 to 20 carbon atoms, and Cy2 is as defined above, wherein the term 'substituted in the expression substituted or unsubstituted used is as defined in claim 1.

8. The boron compound of claim 1, wherein the ring formed by Cy1, Cy2, the nitrogen atom, and $Q_1$ in Chemical Formula A is a ring represented by the following Structural Formula F:

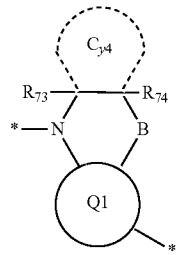

[Structural Formula F]

wherein "-*" denotes a bonding site to a carbon atom within the aromatic ring of $Q_3$ or to X,
D is a single bond or —C($R_{75}$)($R_{76}$)— or —C($R_{75}$)($R_{76}$)—C($R_{77}$)($R_{78}$)—,
$R_{73}$ to $R_{78}$, which are same or different, are each independently selected from a hydrogen atom, a deuterium atom, a halogen, a substituted or unsubstituted linear, branched, or cyclic alkyl of 1 to 20 carbon atoms, a substituted or unsubstituted aryl of 6 to 20 carbon atoms, a substituted or unsubstituted heteroaryl of 2 to 20 carbon atoms, a substituted or unsubstituted alkylsilyl of 1 to 20 carbon atoms, and a substituted or unsubstituted arylsilyl of 6 to 20 carbon atoms, and
$Cy_4$ is a substituted or unsubstituted alkylene of 2 to 5 carbon atoms, with a methylene (—$CH_2$—) given for each end, wherein the ring accounted for by Cy4 is fused to a ring including the nitrogen and the linker B and the term substituted in the expression substituted or unsubstituted used is as defined in claim 1.

9. The boron compound of claim 1, wherein the linker L is a single bond or any one selected from the following Structural Formulas 22 to 30:

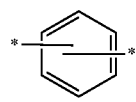

[Structural Formula 22]

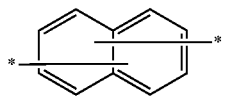

[Structural Formula 23]

[Structural Formula 24]

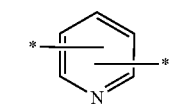

[Structural Formula 25]

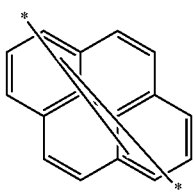

[Structural Formula 26]

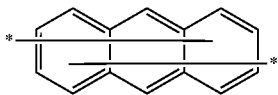

[Structural Formula 27]

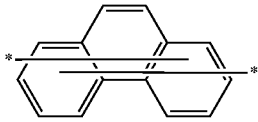

[Structural Formula 28]

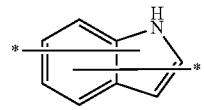

[Structural Formula 29]

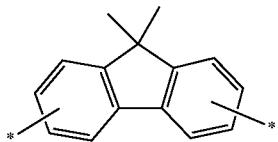

[Structural Formula 30]

wherein hydrogen or deuterium are positioned on each one of the carbon atoms of the aromatic ring in the linker except for the two carbon atoms which link to the compound of Chemical Formula A.

10. The boron compound of claim 1, wherein the boron compound is any one selected from the following <Compound 1> to <Compound 125>:

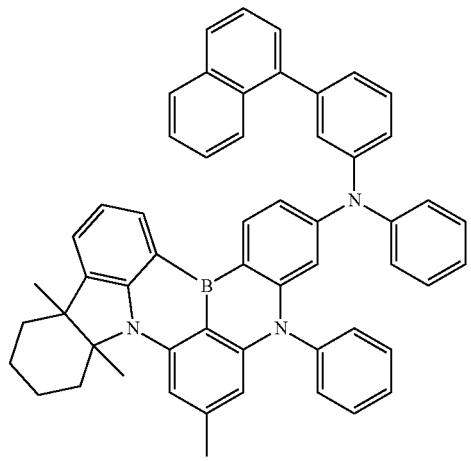

<Compound 1>

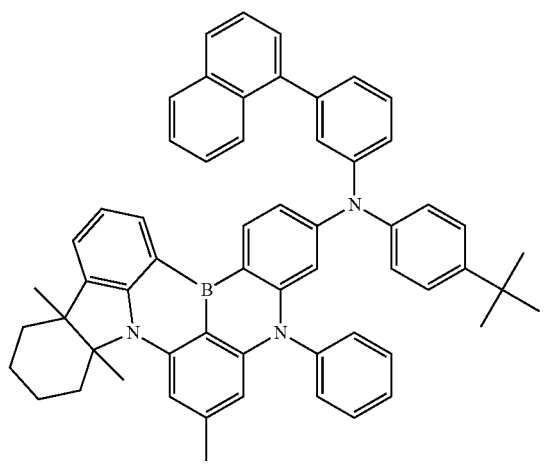

<Compound8>
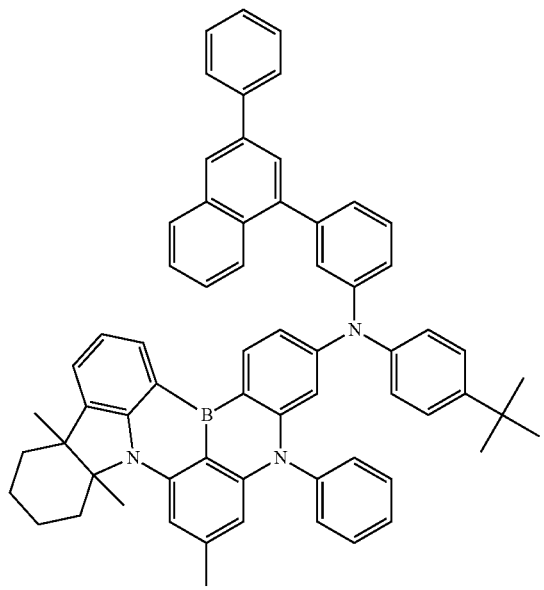
<Compound9>
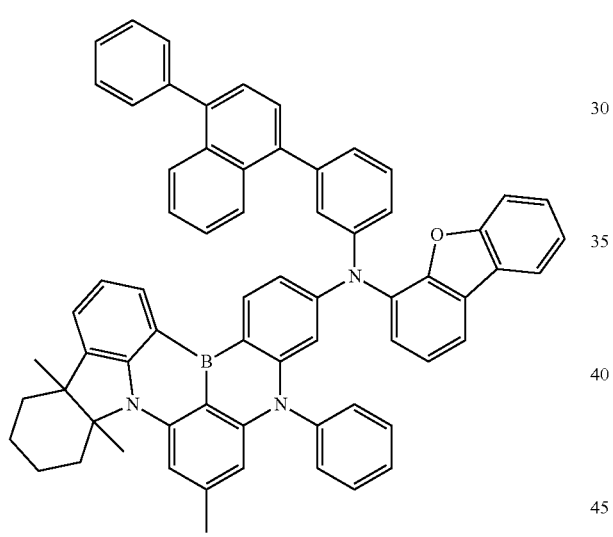
<Compound 10>
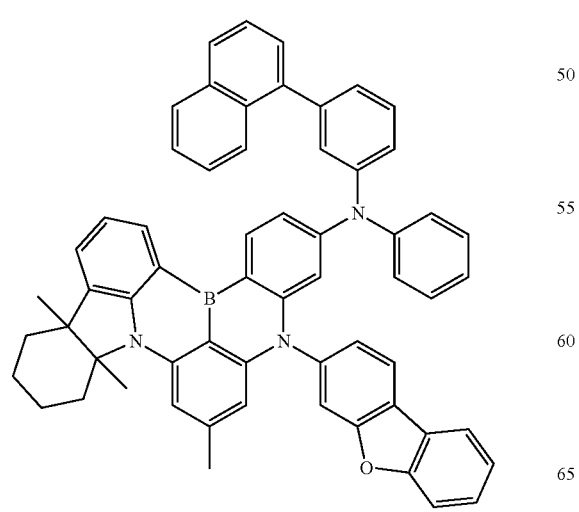
<Compound11>
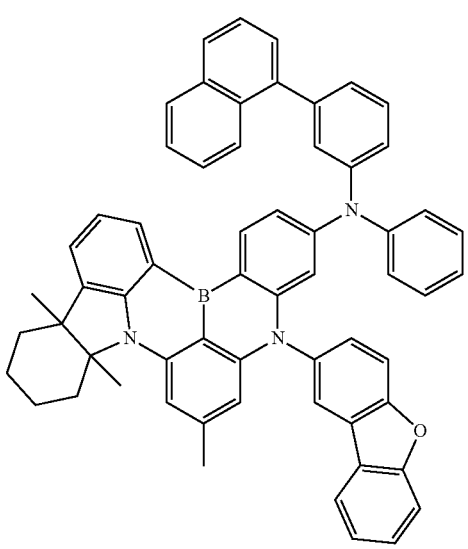
<Compound12>
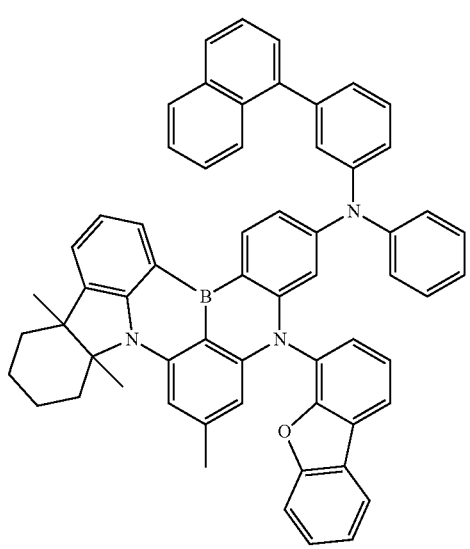
<Compound 13>
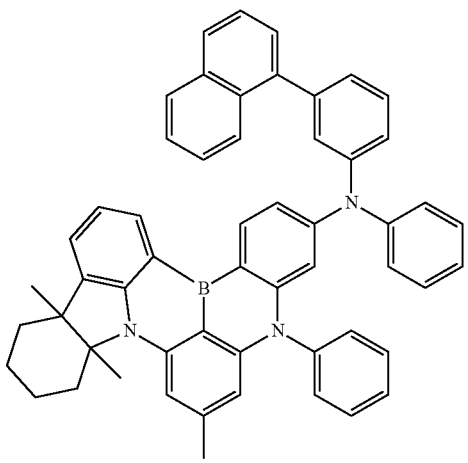

<Compound14>
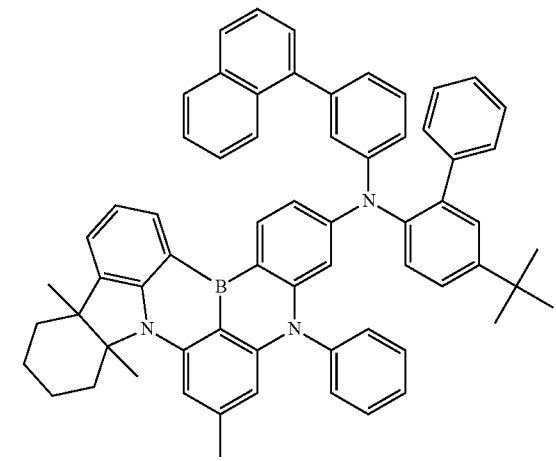
<Compound15>
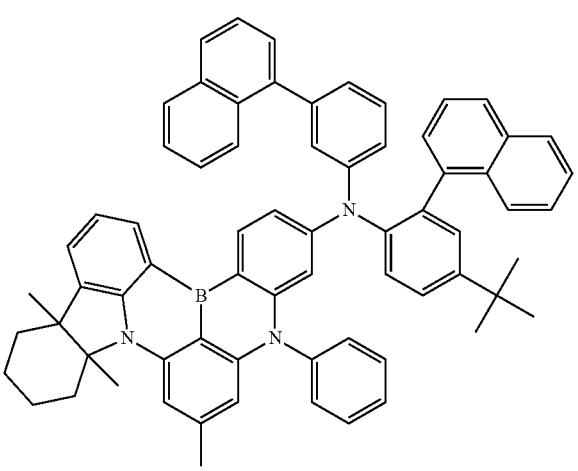
<Compound 17>
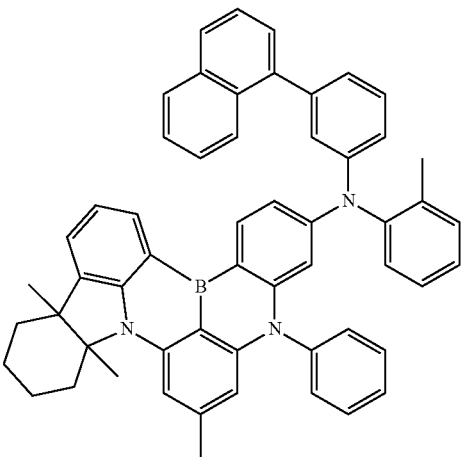
<Compound18>
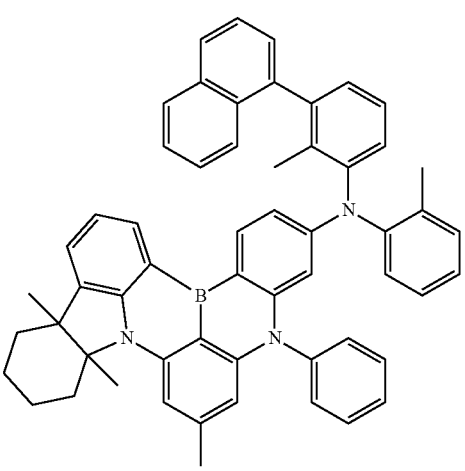
<Compound 16>
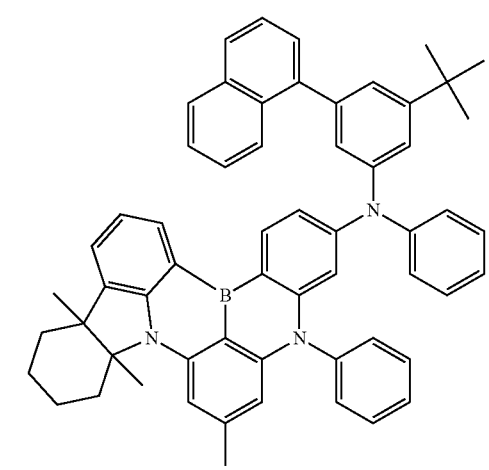
<Compound 19>
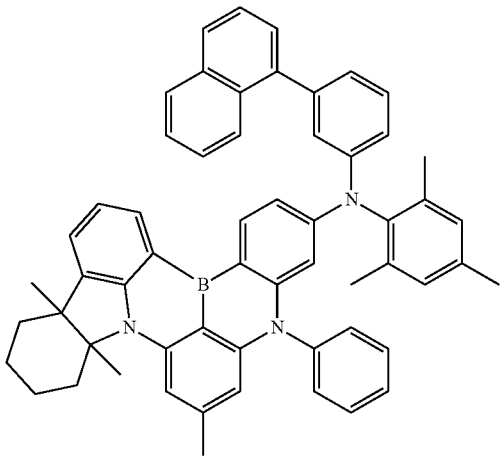

<Compound20>
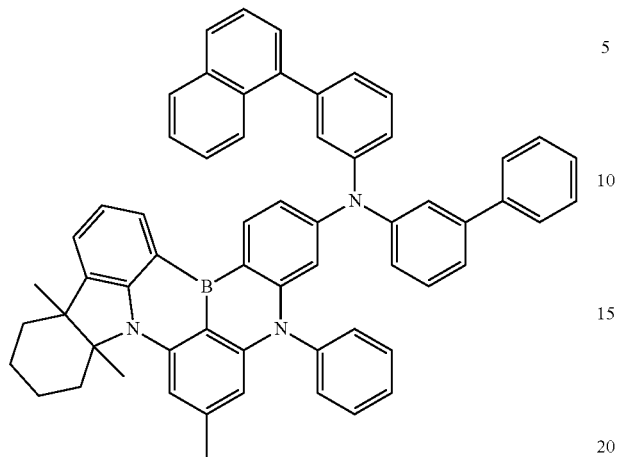
<Compound21>
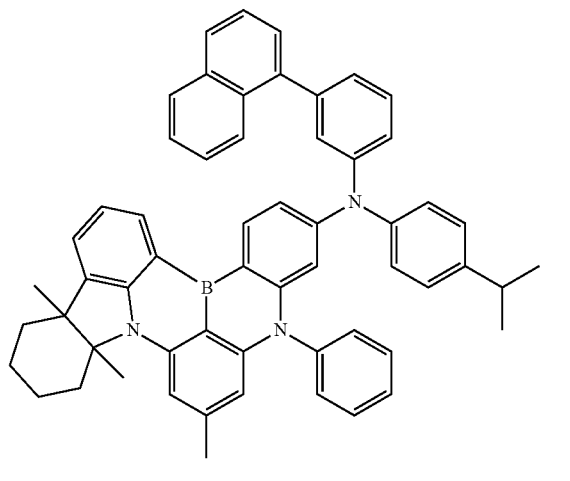
<Compound 22>
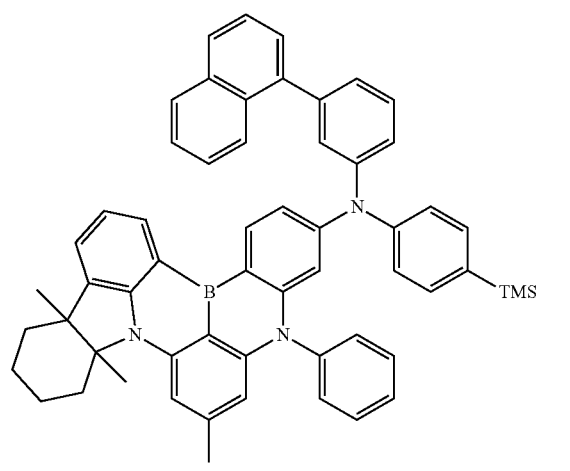
<Compound23>
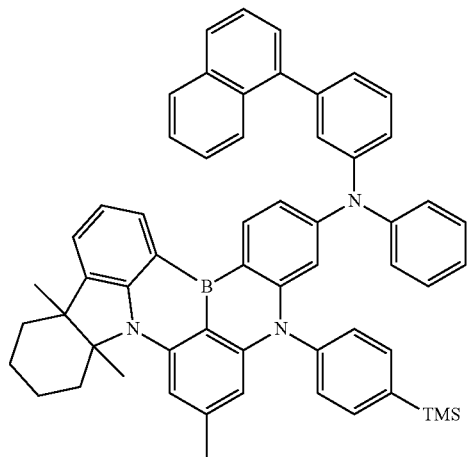
<Compound24>
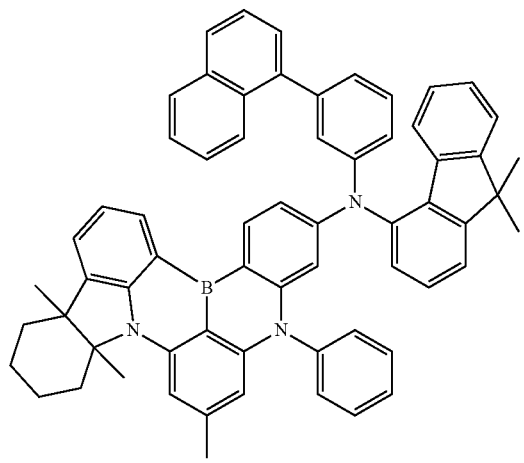
<Compound 25>
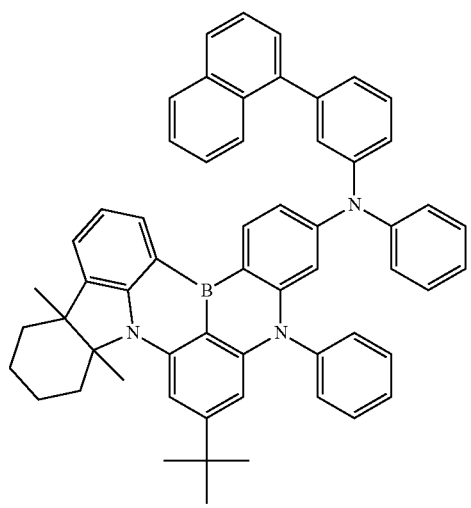

<Compound26>
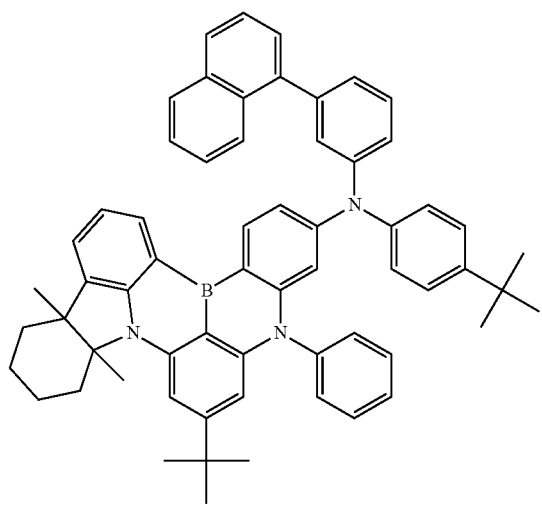
<Compound27>
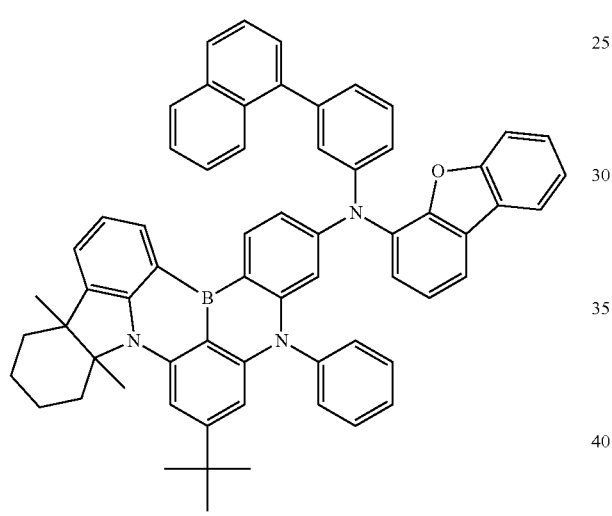
<Compound 28>
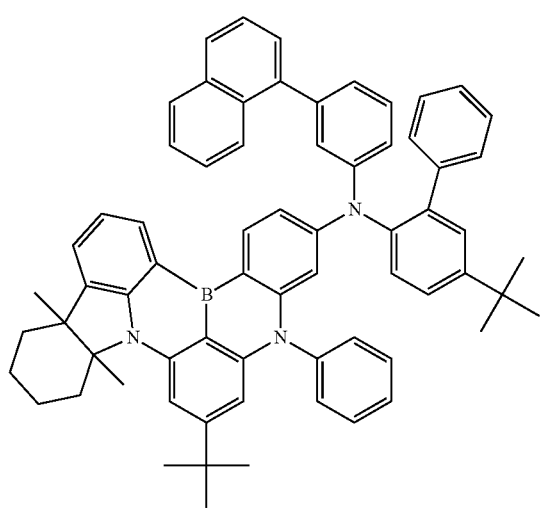
<Compound29>
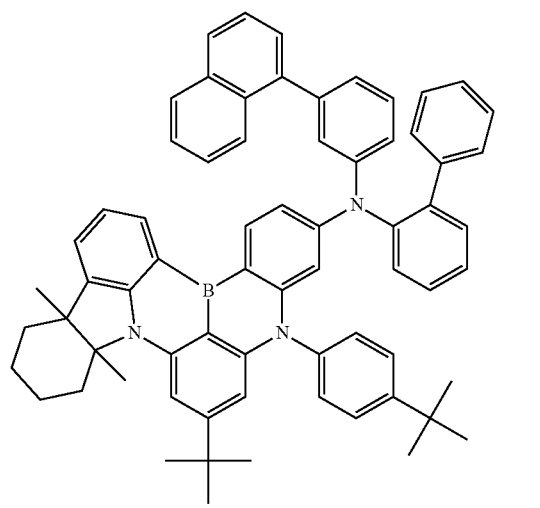
<Compound30>
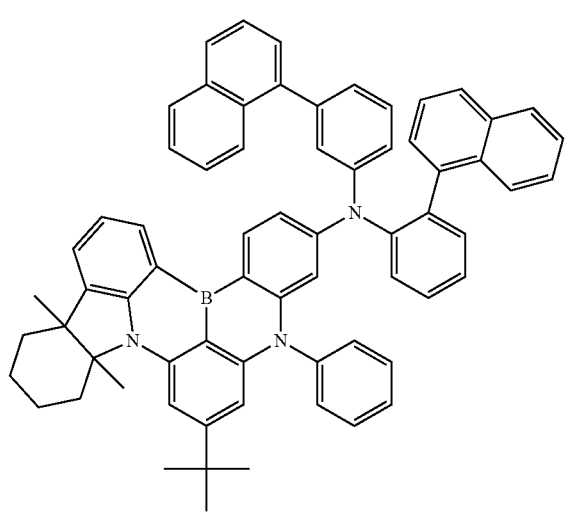
<Compound 31>
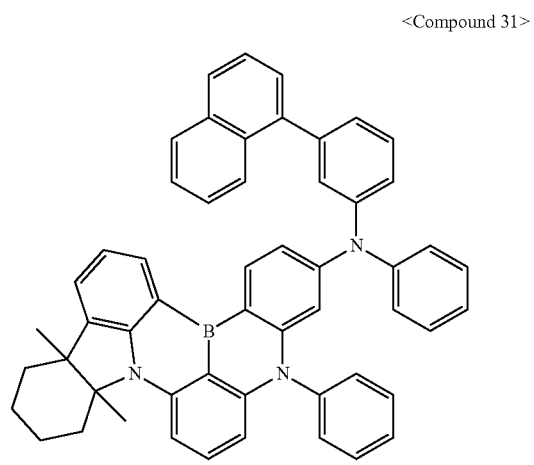

<Compound32>
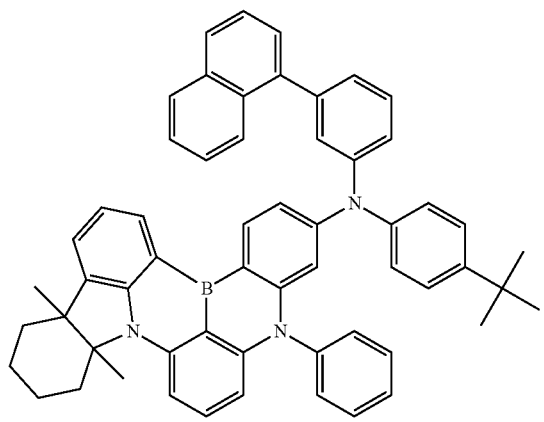
<Compound33>
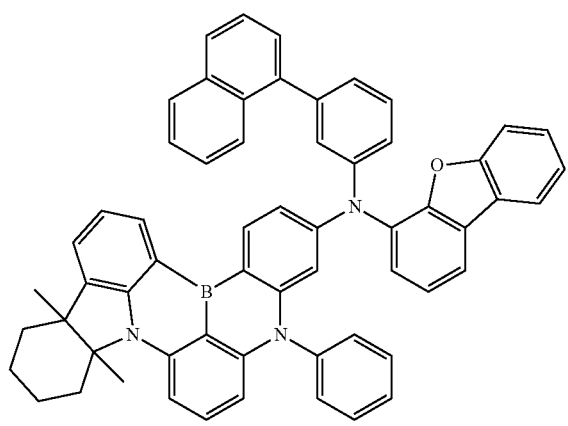
<Compound 34>
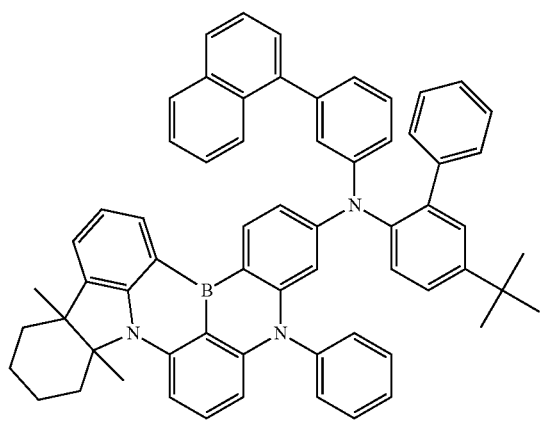
<Compound35>
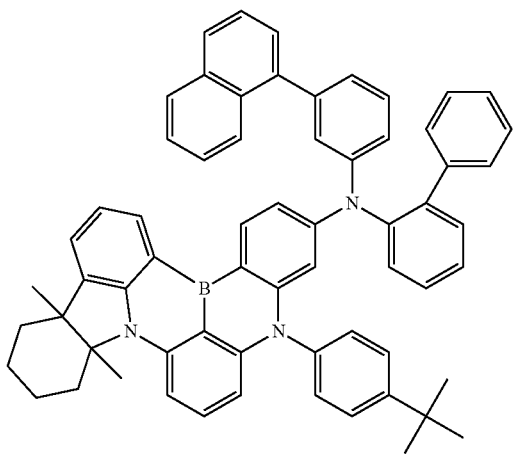
<Compound36>
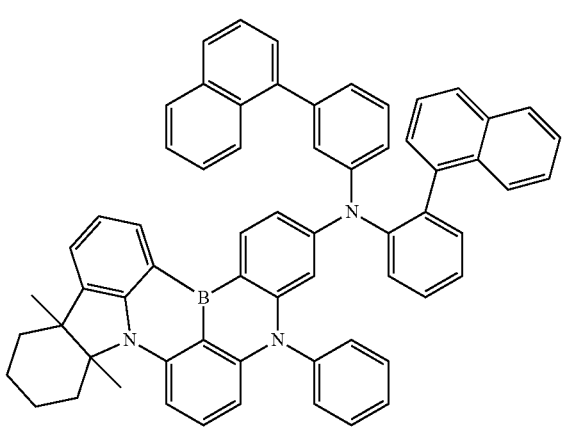
<Compound 37>
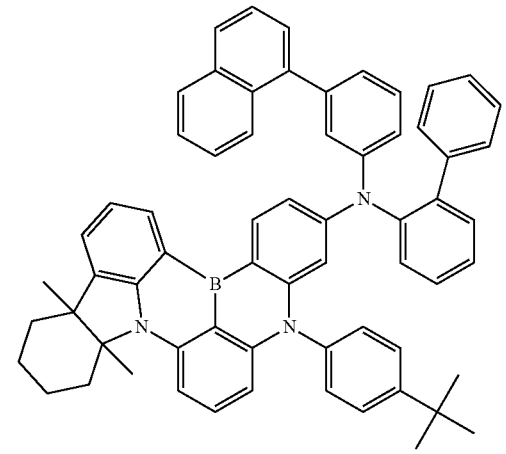

<Compound38>
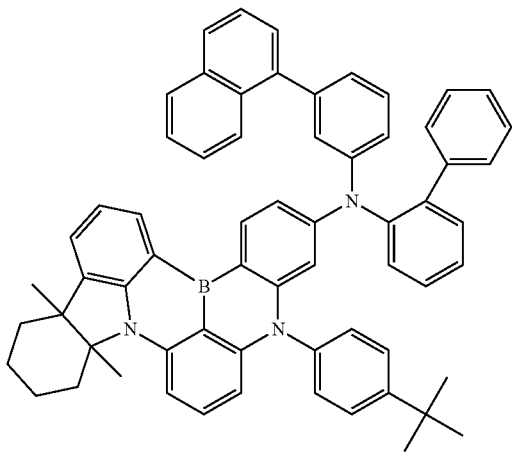
<Compound39>
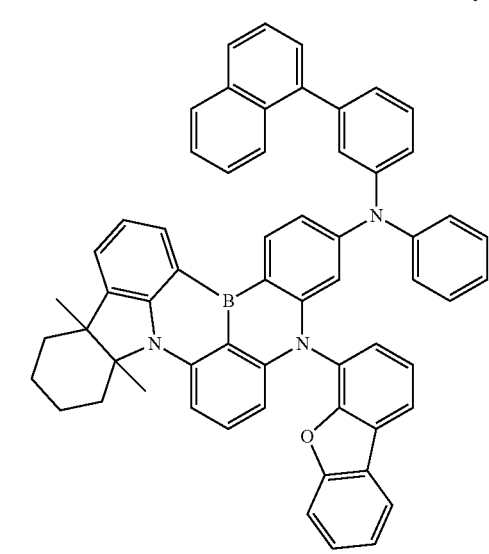
<Compound 40>
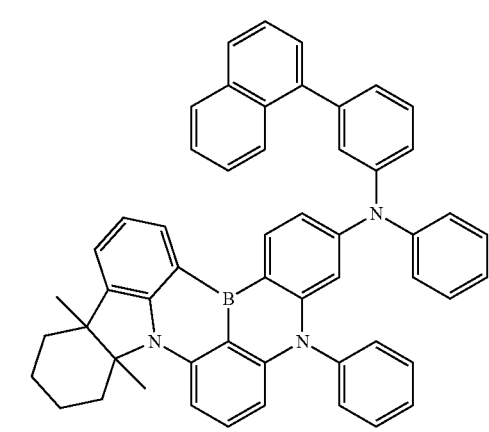
<Compound41>
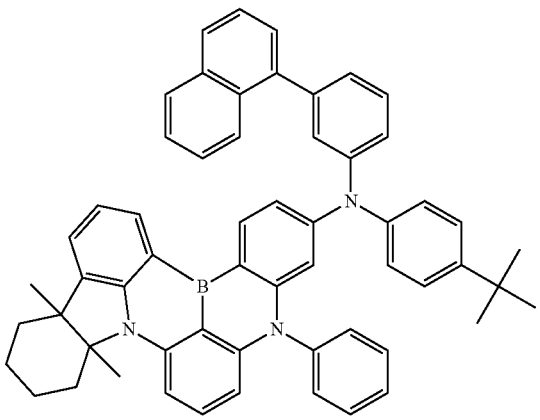
<Compound42>
<Compound 43>
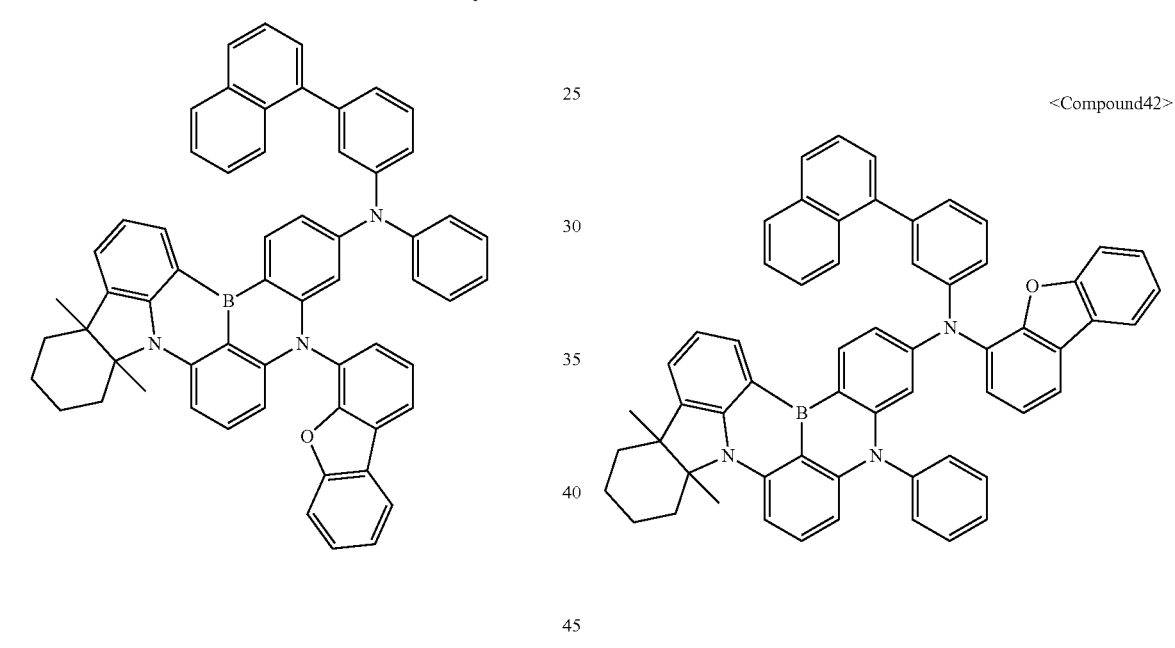
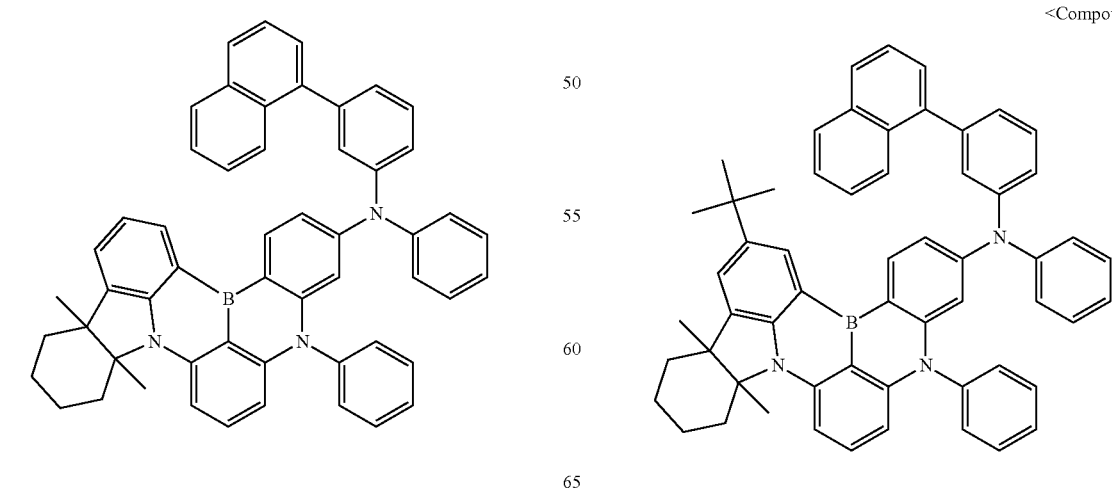

101
-continued
<Compound44>
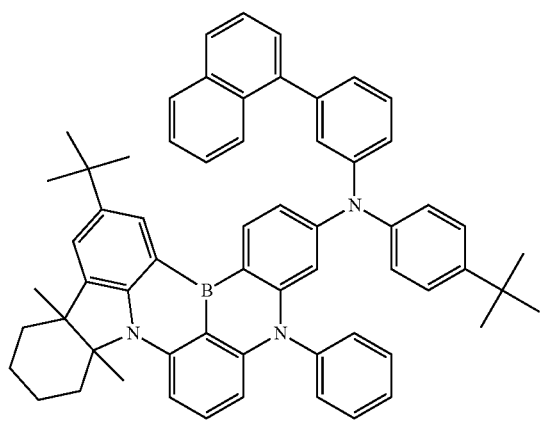
<Compound45>
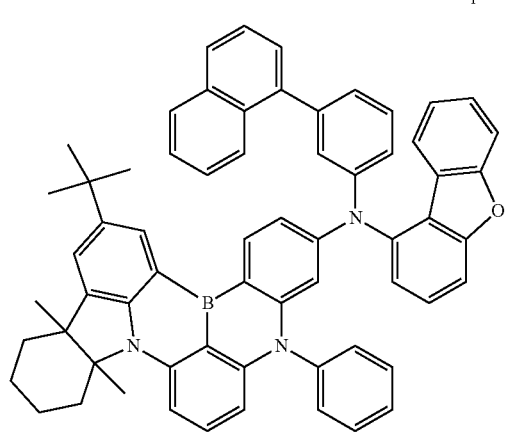
<Compound 46>
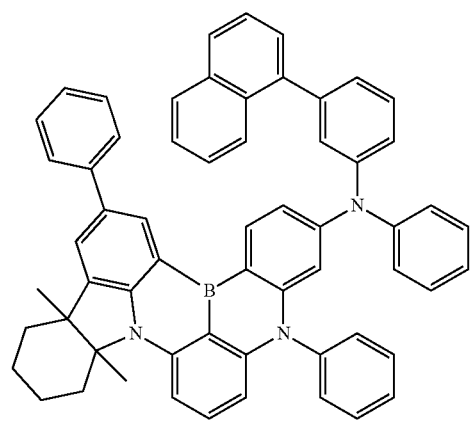
102
-continued
<Compound47>
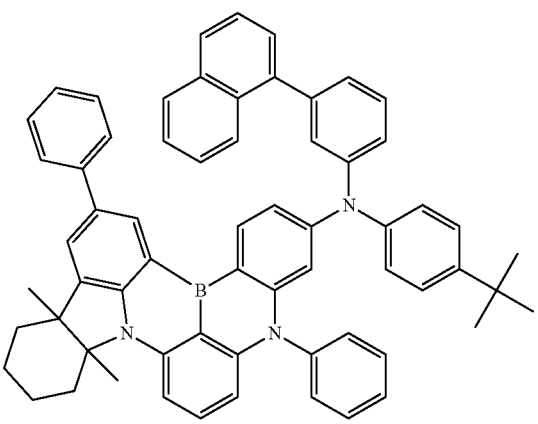
<Compound48>
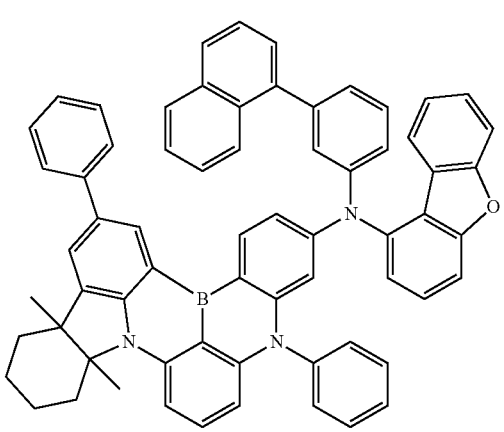
<Compound 49>
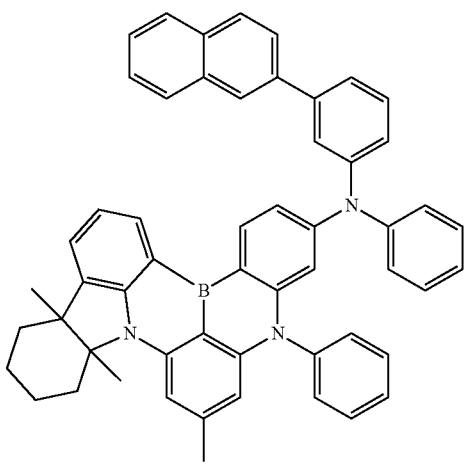

<Compound50>
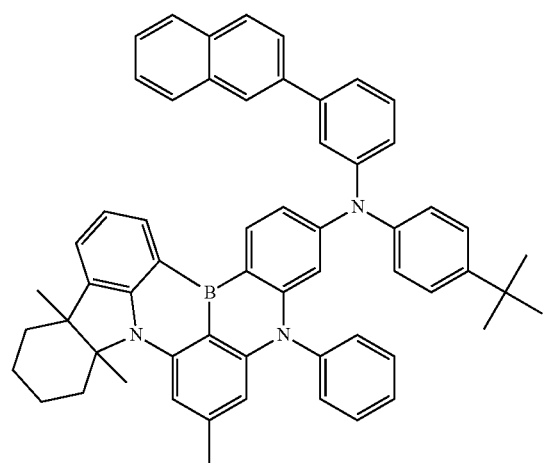
<Compound51>
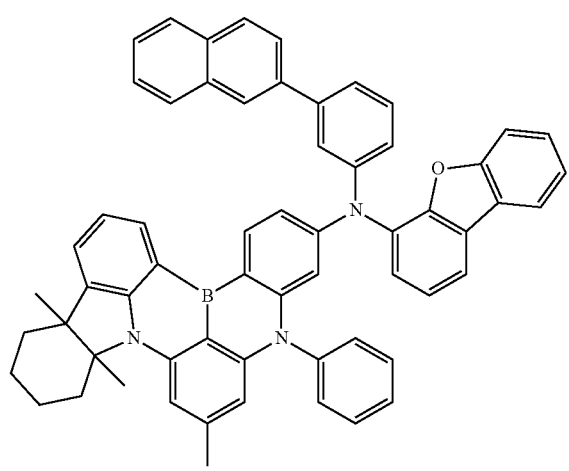
<Compound 52>
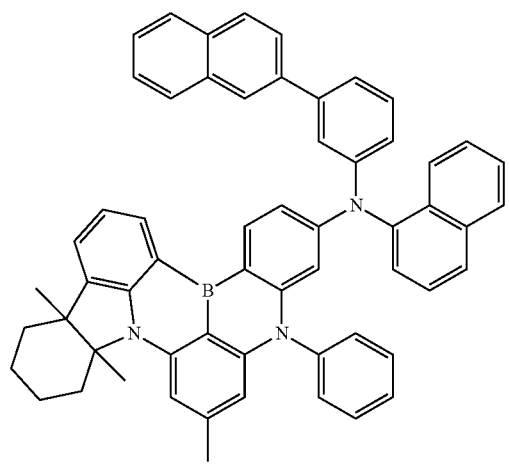
<Compound53>
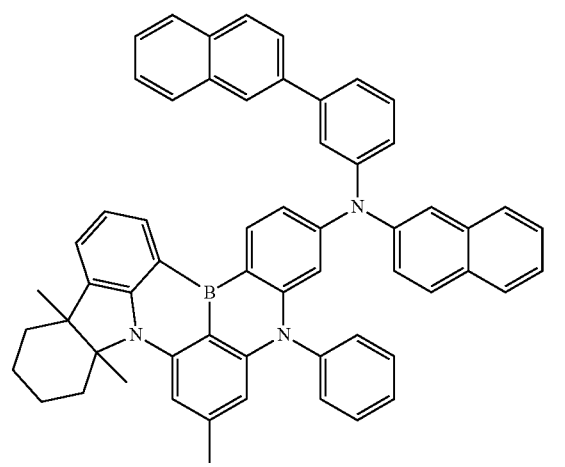
<Compound54>
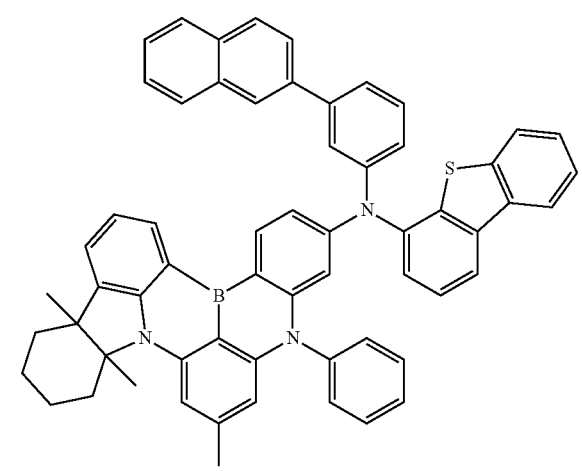
<Compound 55>
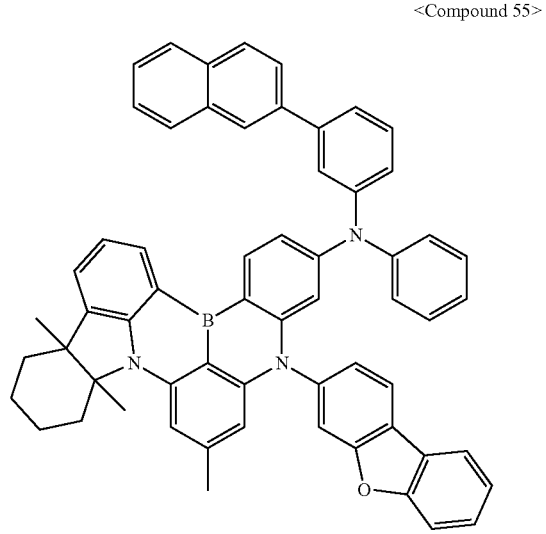

<Compound56>
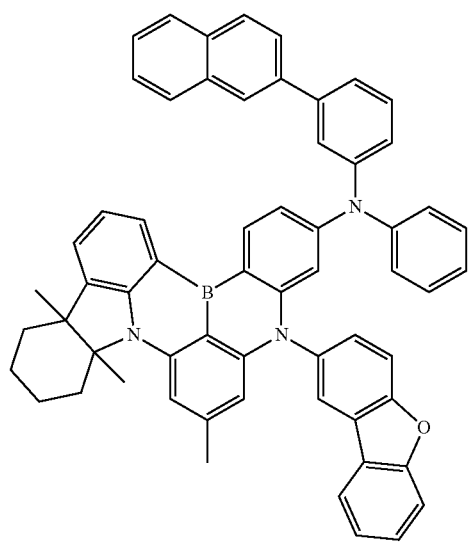
<Compound57>
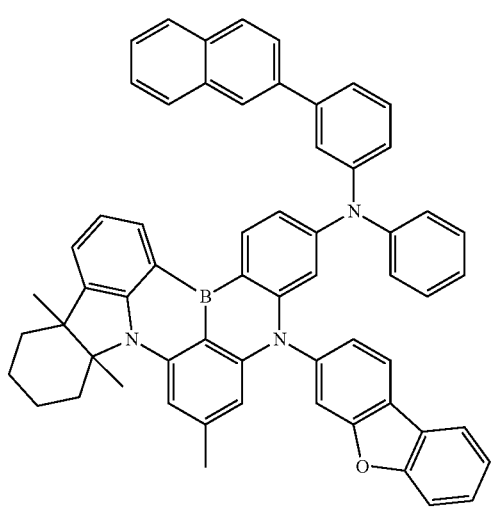
<Compound 58>
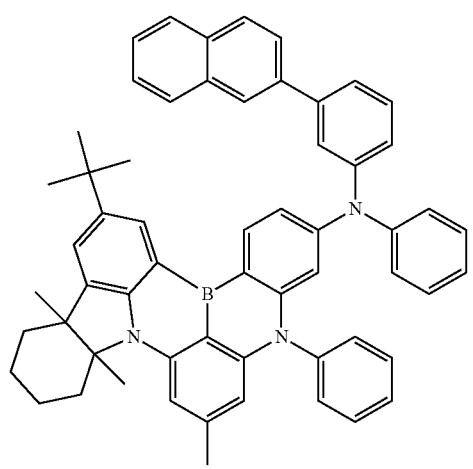
<Compound59>
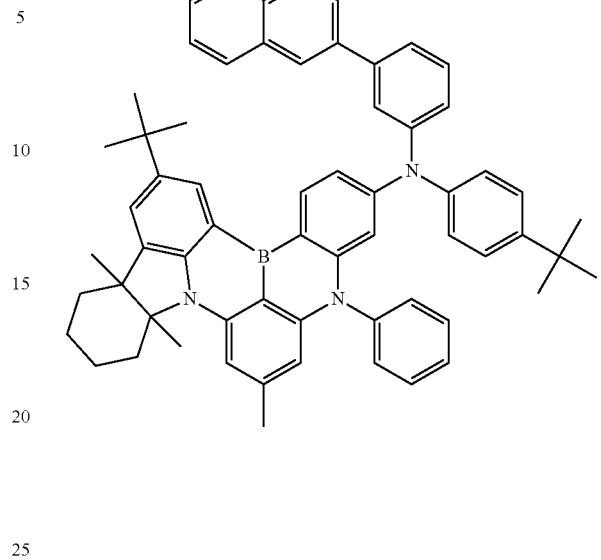
<Compound60>
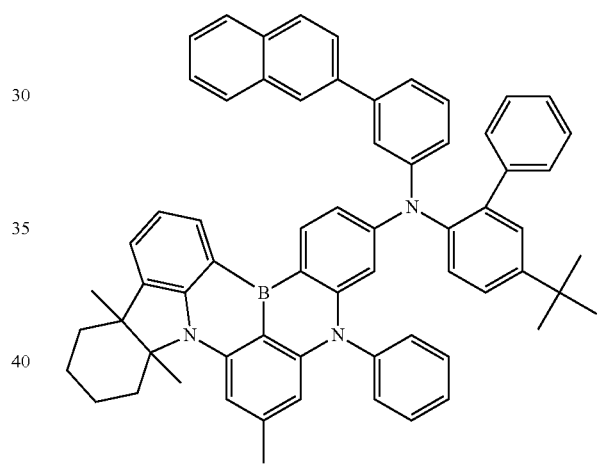
<Compound 61>
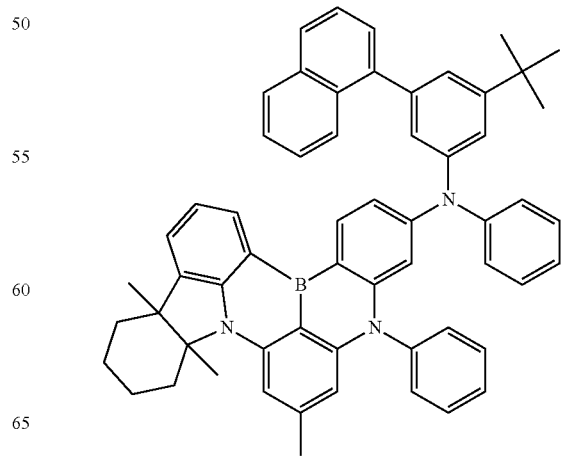

<Compound62>
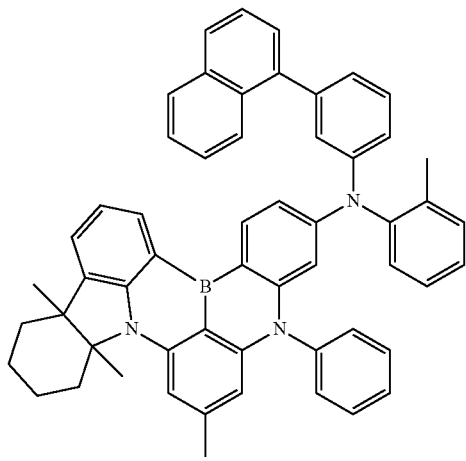
<Compound63>
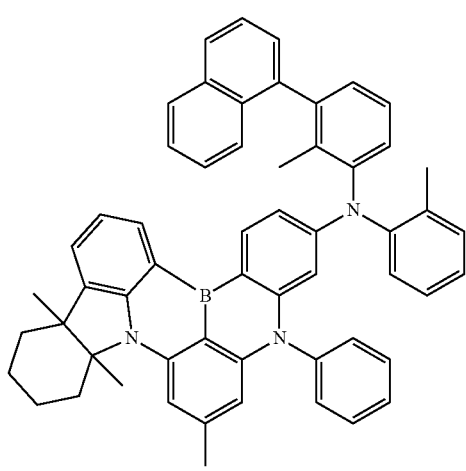
<Compound 64>
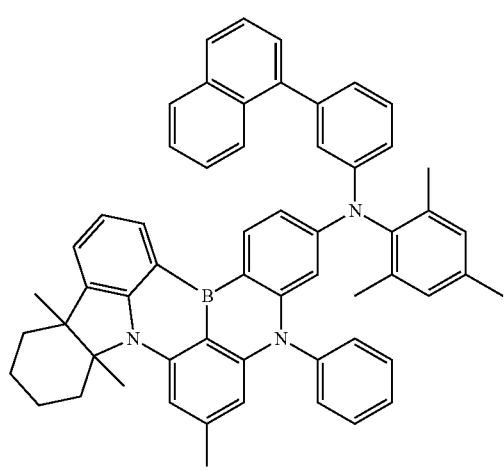
<Compound65>
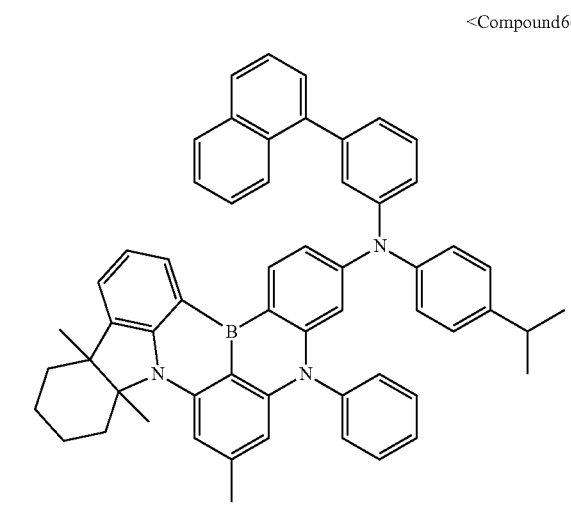
<Compound66>
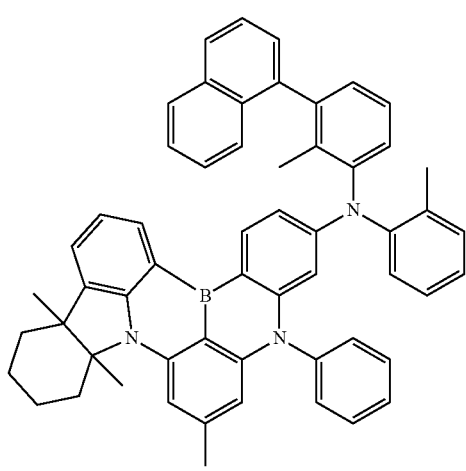
<Compound 67>
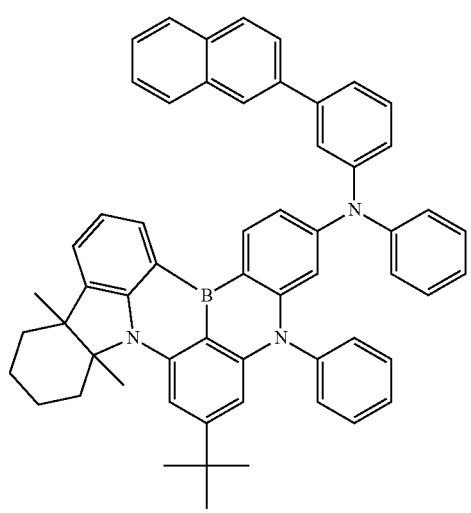

<Compound68>
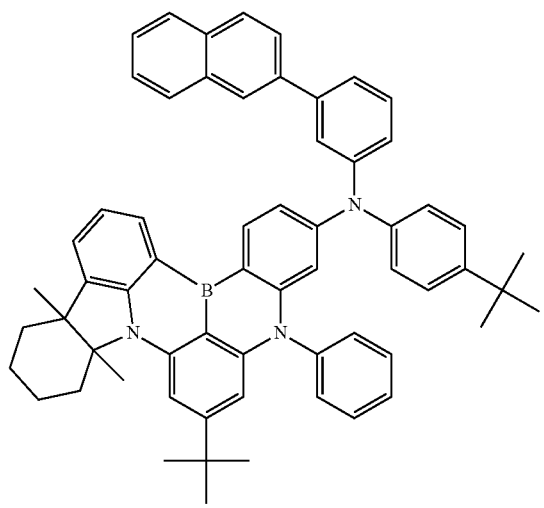
<Compound69>
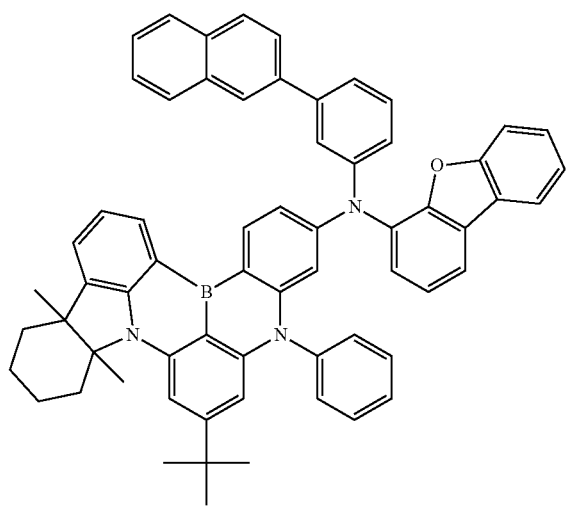
<Compound 70>
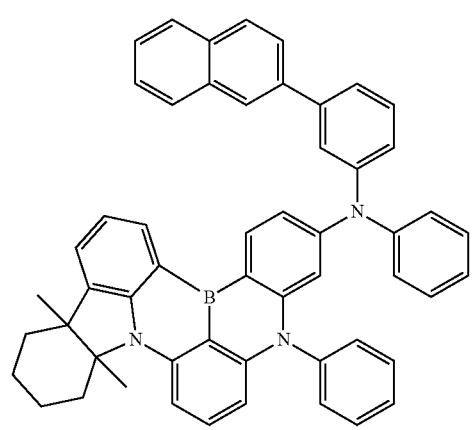
<Compound71>
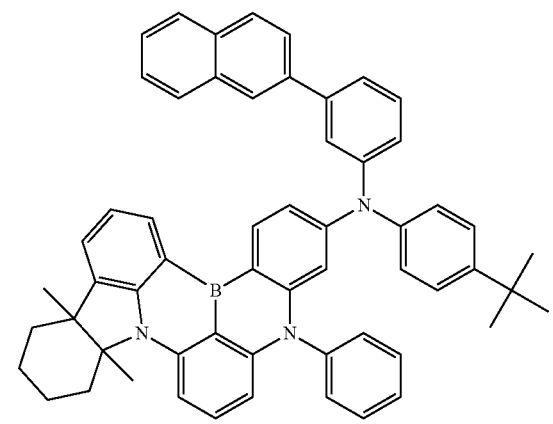
<Compound72>
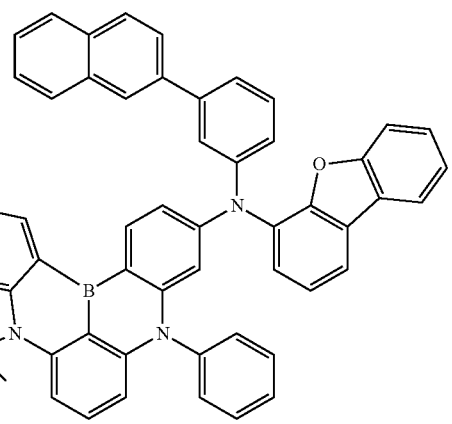
<Compound 73>
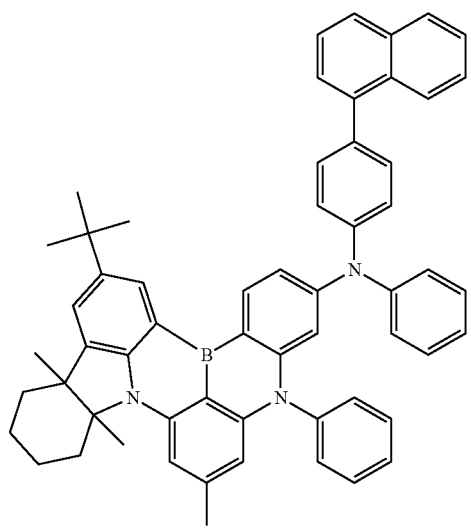

<Compound74>
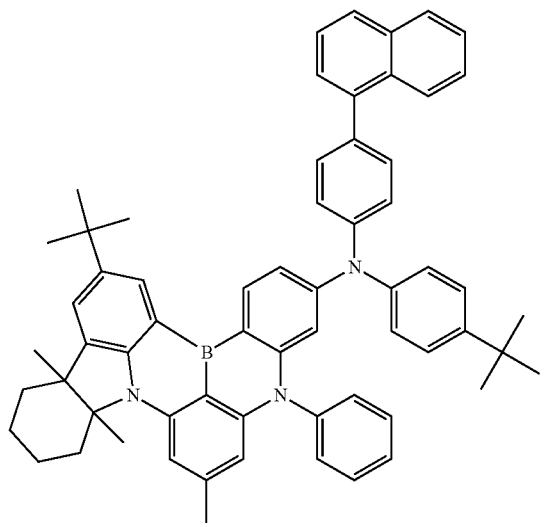
<Compound75>
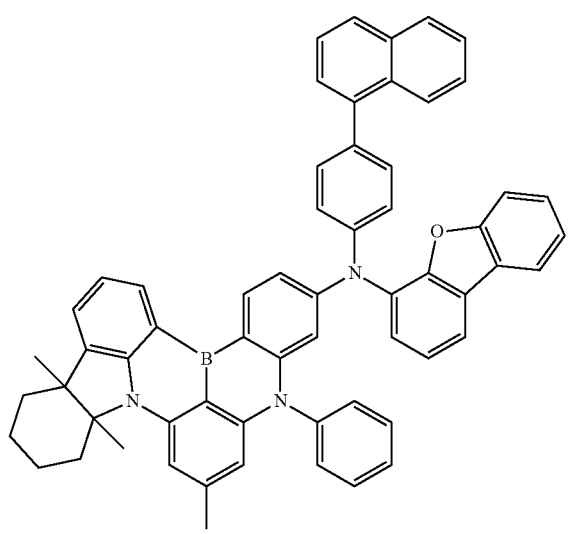
<Compound 76>
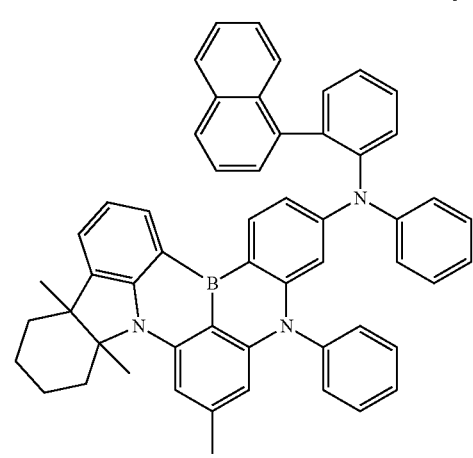
<Compound77>
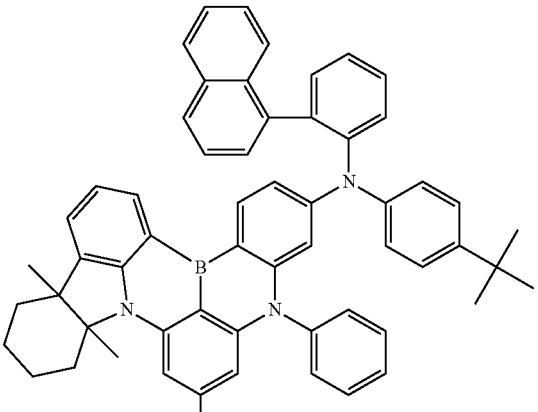
<Compound78>
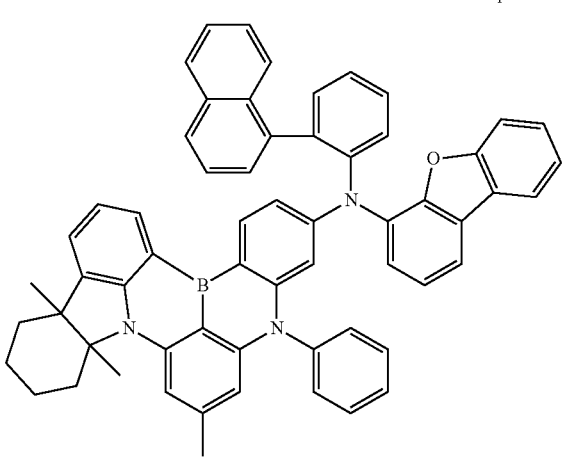
<Compound 79>
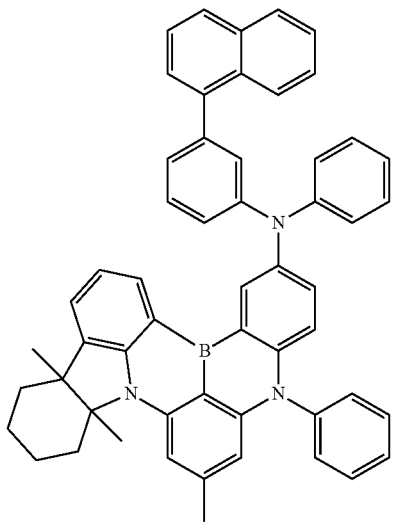

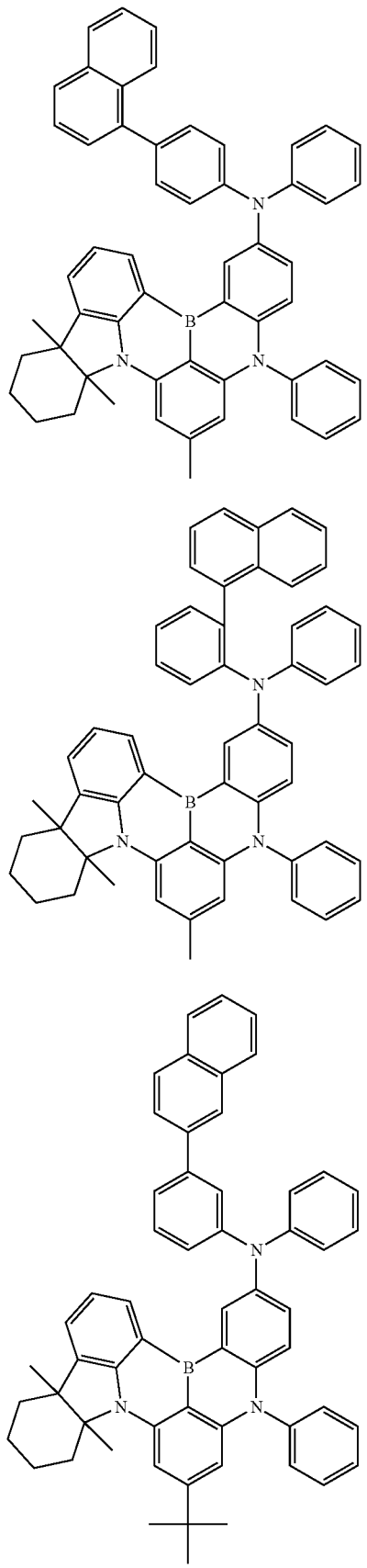
<Compound80>
<Compound81>
<Compound 82>
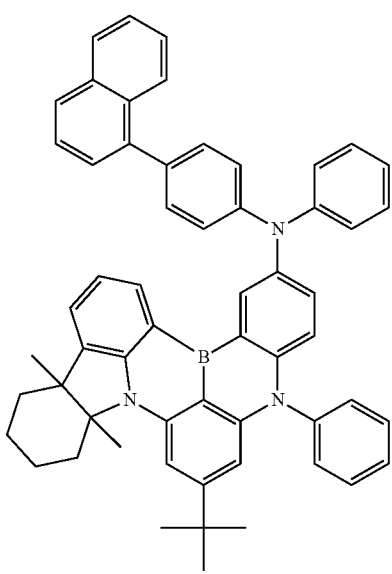
<Compound83>
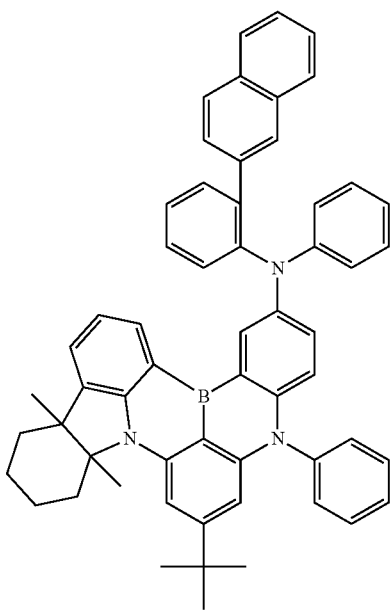
<Compound84>
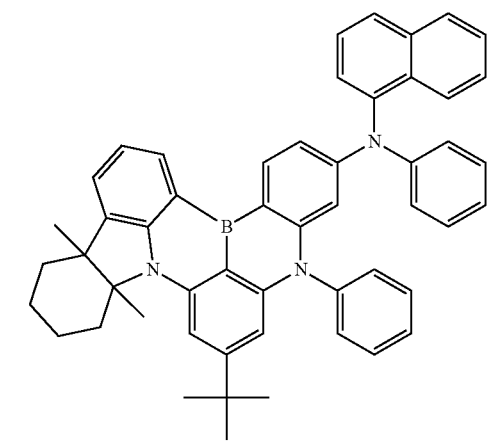
<Compound 85>

<Compound86>
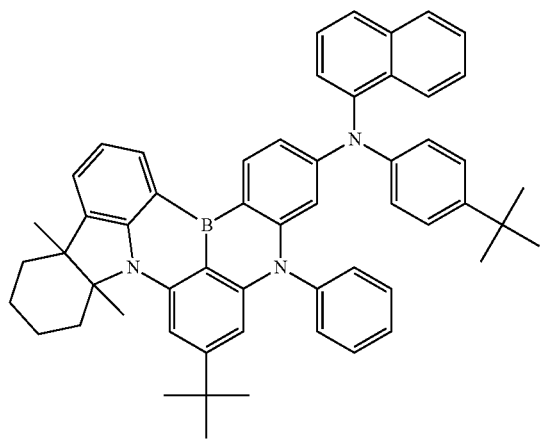
<Compound87>
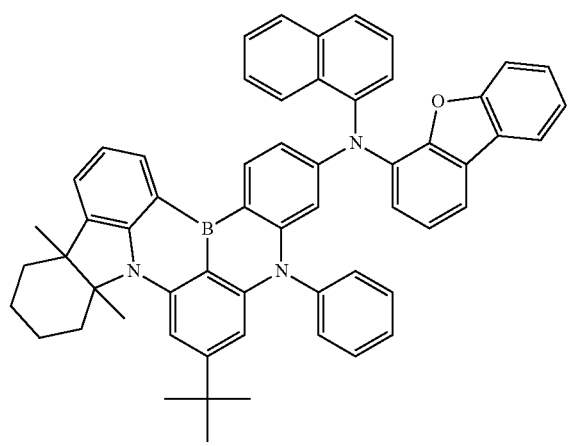
<Compound 88>
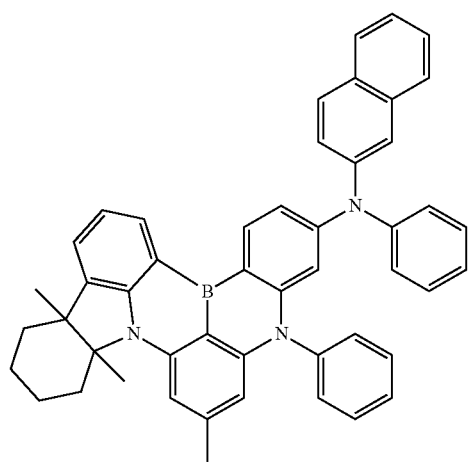
<Compound89>
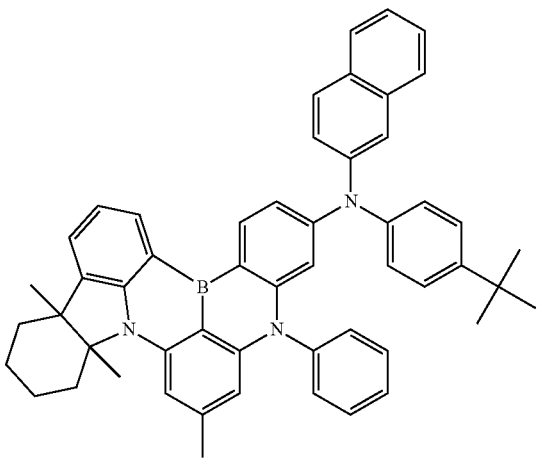
<Compound90>
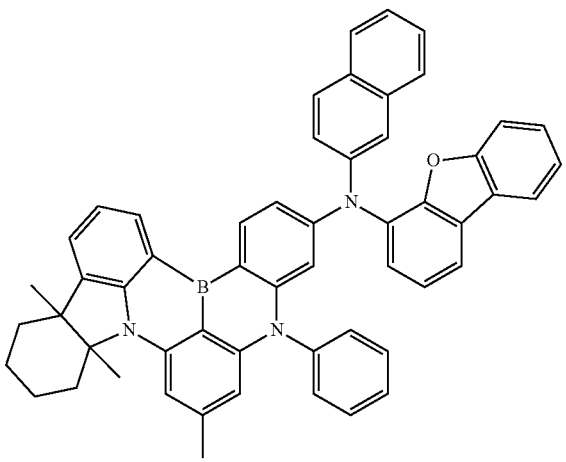
<Compound91>
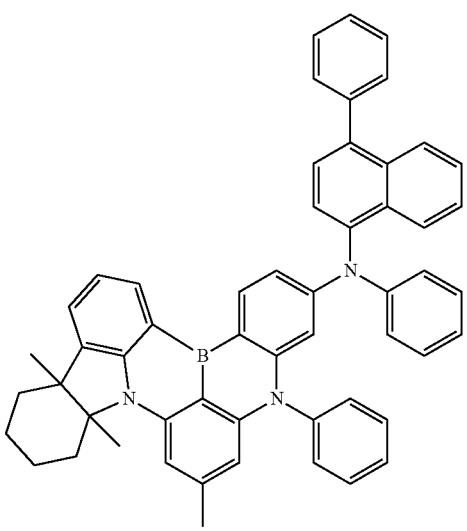

-continued
<Compound92>
<Compound93>
<Compound94>
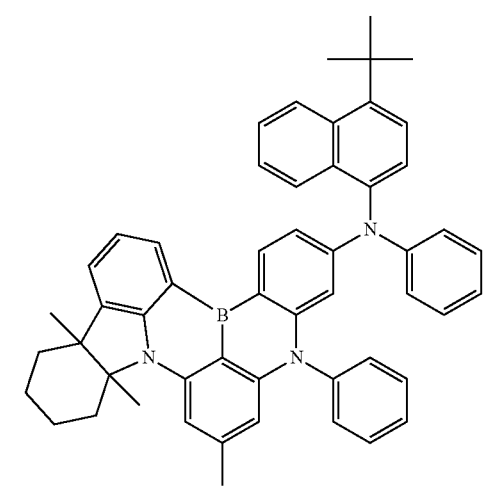
<Compound95>
<Compound99>
<Compound100>
<Compound101>
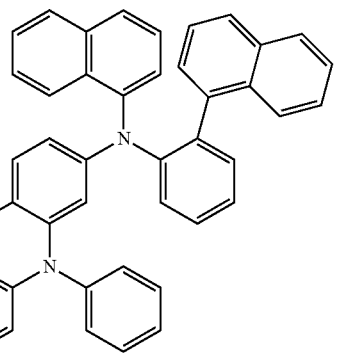
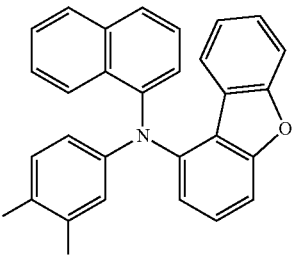
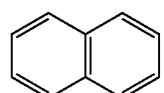

<Compound102>
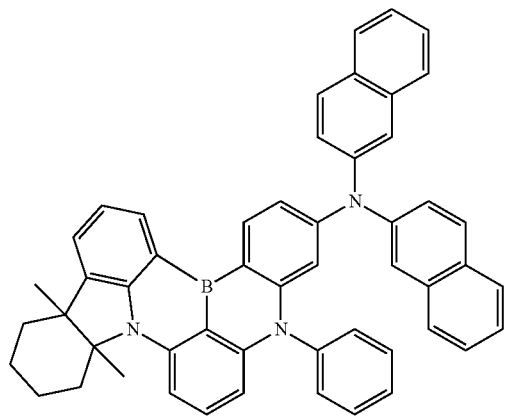
<Compound103>
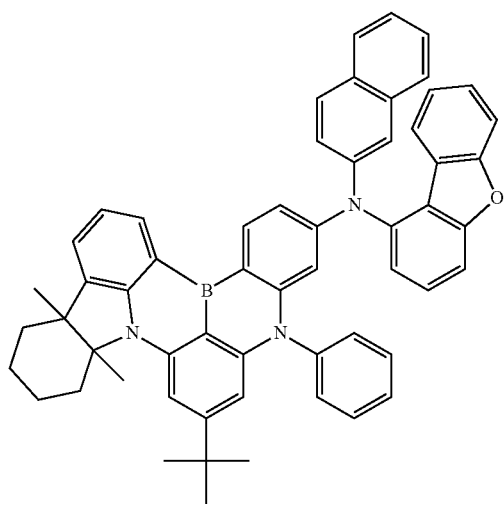
<Compound104>
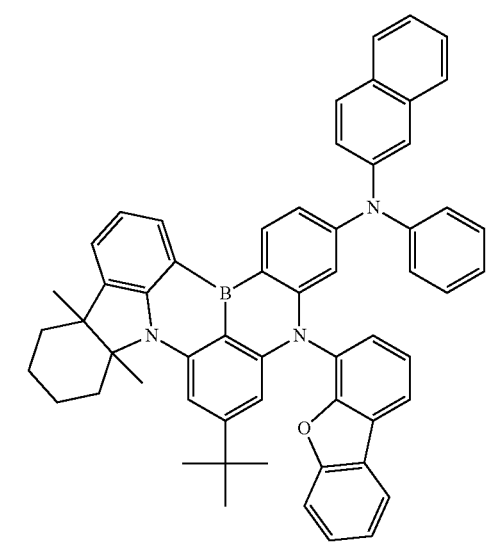
<Compound105>
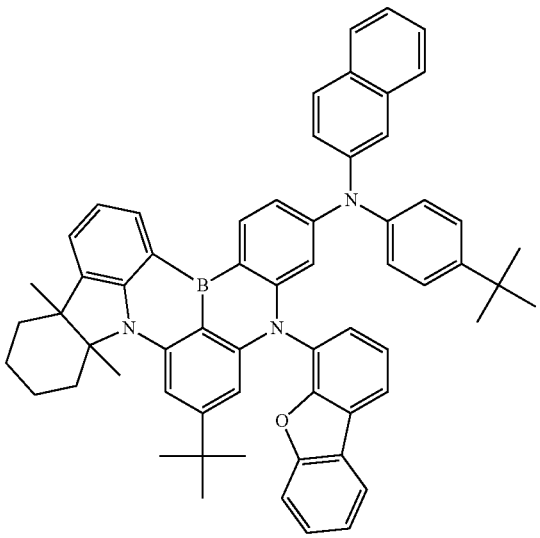
<Compound106>
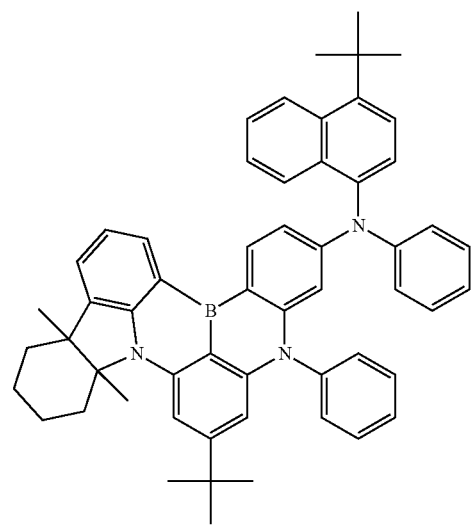
<Compound107>
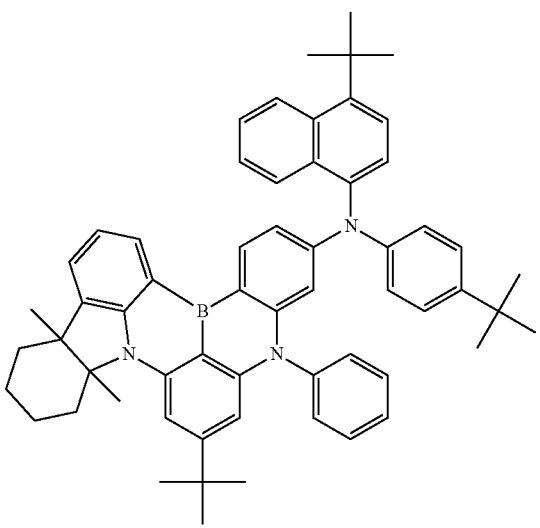

<Compound108>
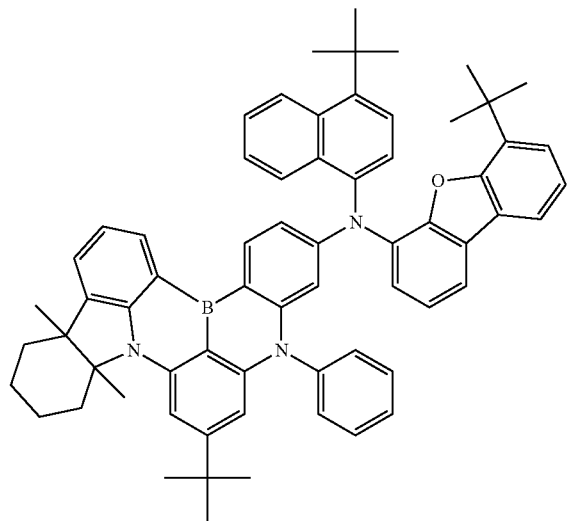
<Compound109>
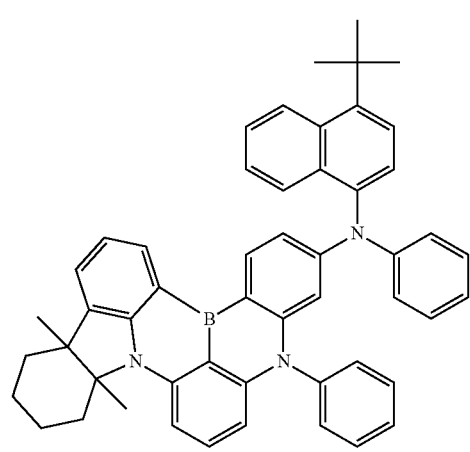
<Compound110>
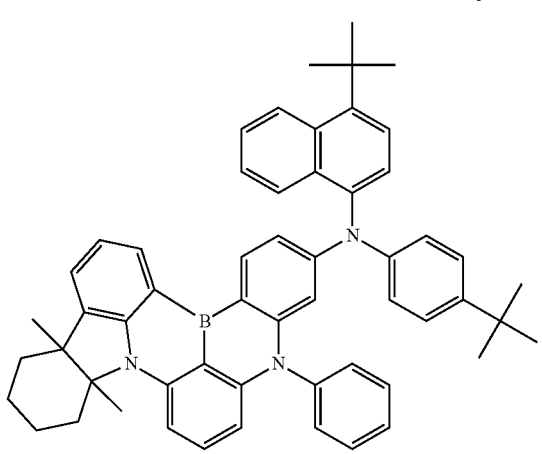
<Compound111>
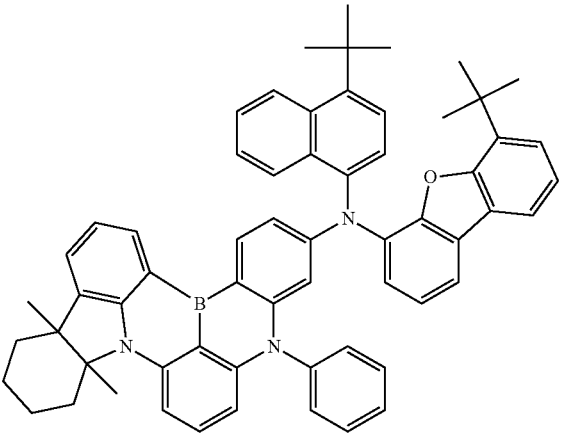
<Compound112>
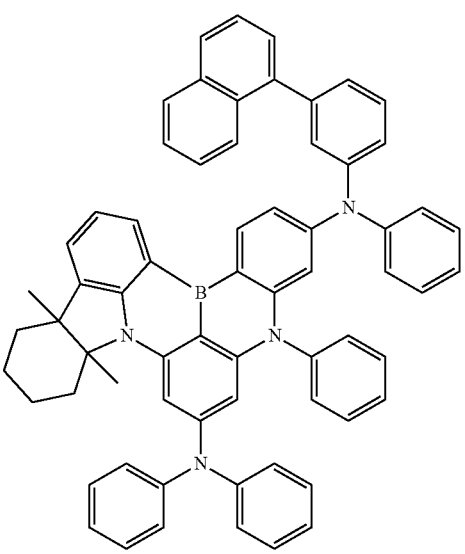
<Compound113>
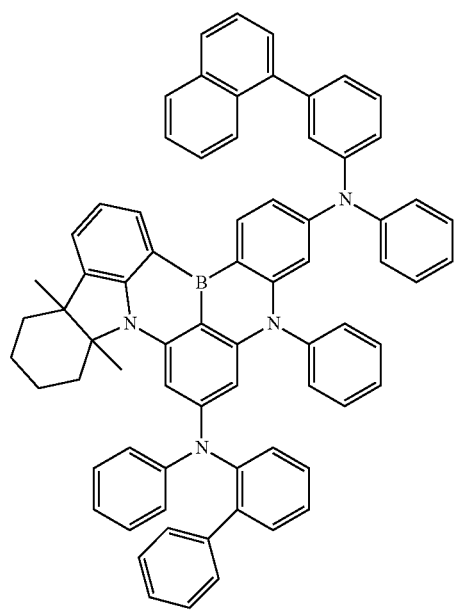

<Compound114>
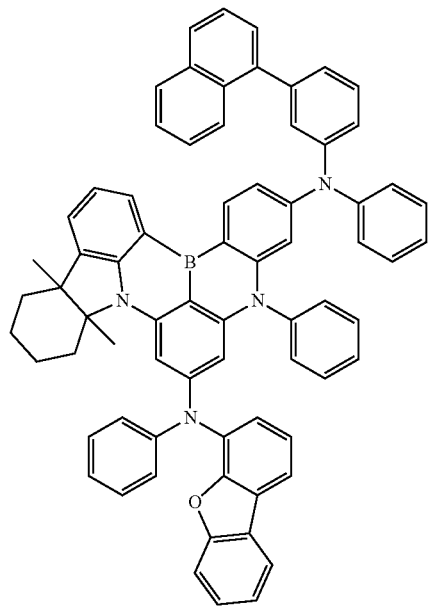
<Compound115>
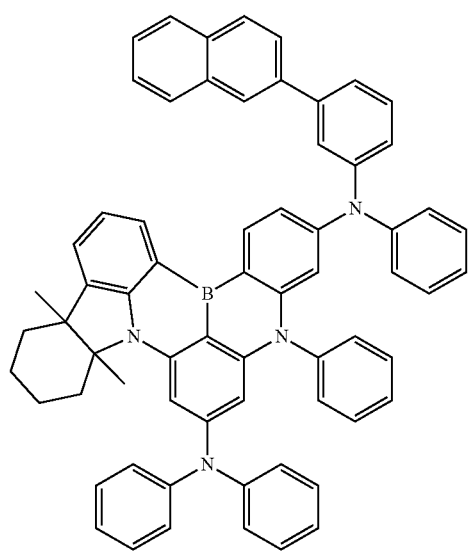
<Compound116>
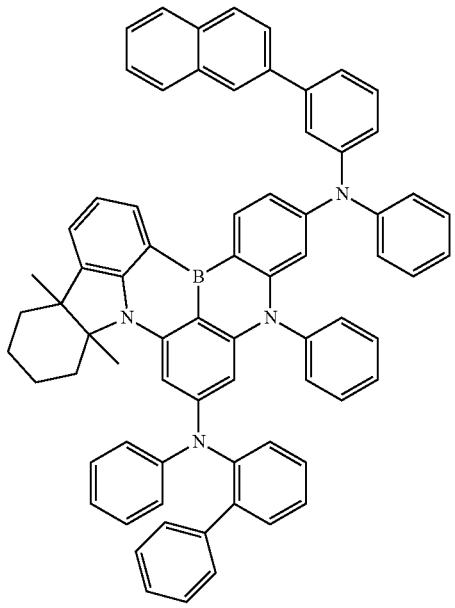
<Compound117>
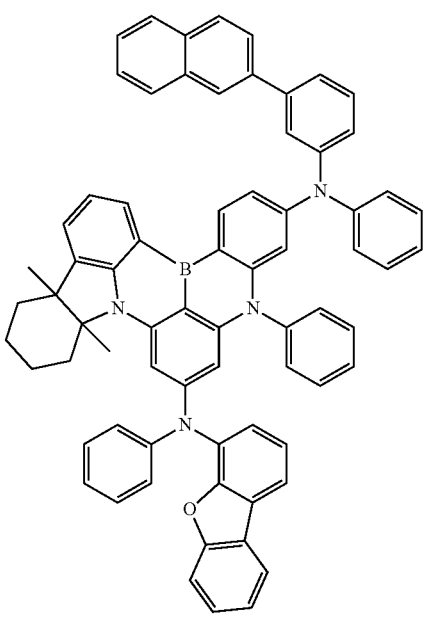

<Compound118>
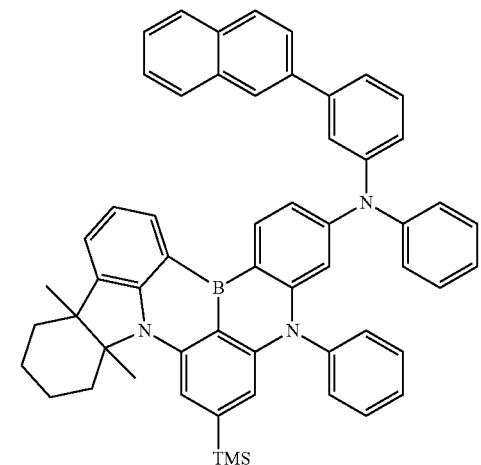
<Compound119>
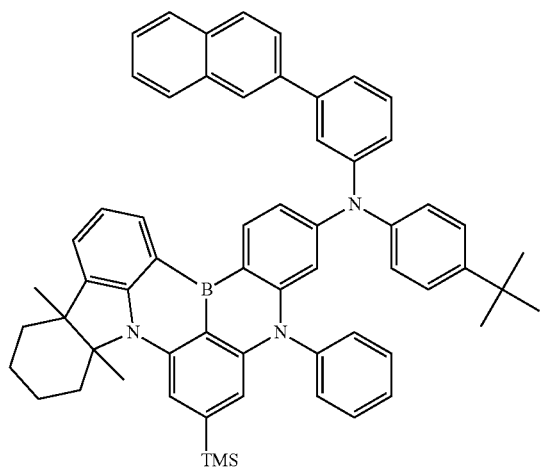
<Compound120>
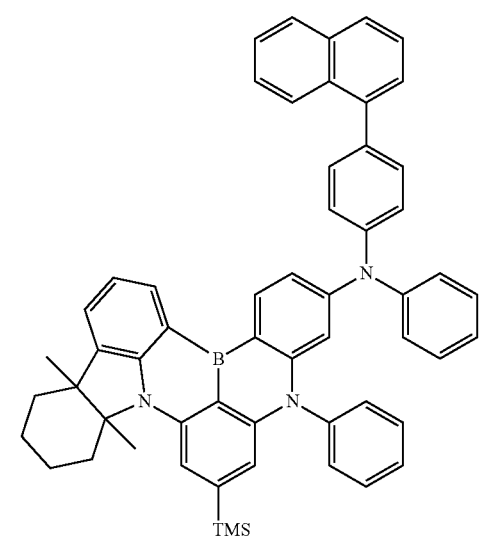
<Compound121>
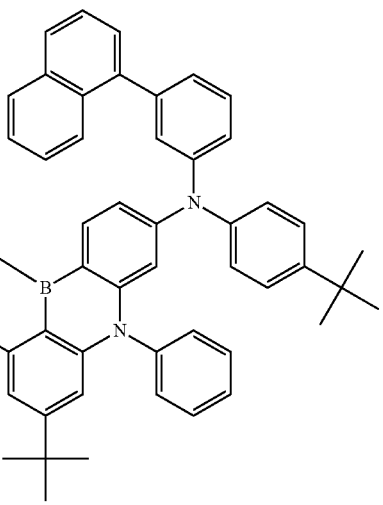
<Compound122>
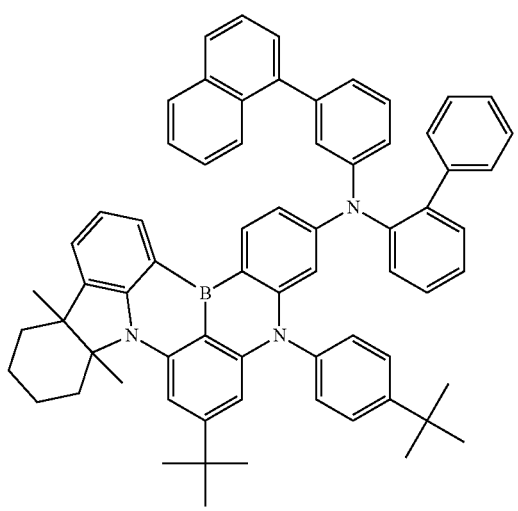
<Compound123>
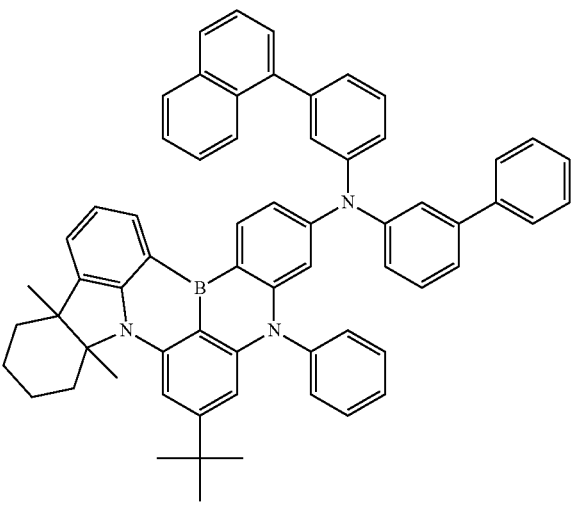

127

-continued

<Compound 124>

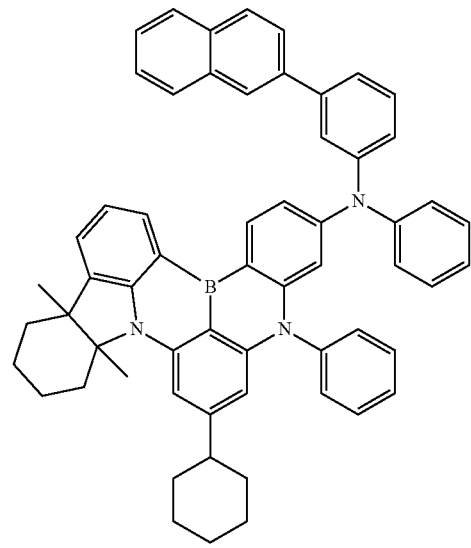

<Compound 125>

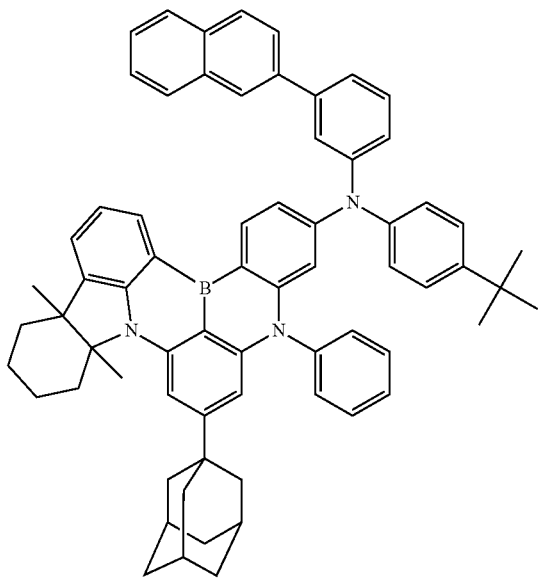

11. An organic light-emitting diode, comprising:
a first electrode;
a second electrode facing the first electrode; and
an organic layer interposed between the first electrode and the second electrode, wherein the organic layer includes a boron compound of claim 1.

12. The organic light-emitting diode of claim 11, wherein the organic layer comprises at least one of a hole injection layer, a hole transport layer, a functional layer capable of both hole injection and hole transport, an electron blocking layer, a light-emitting layer, an electron transport layer, an electron injection layer, and a capping layer.

13. The organic light-emitting diode of claim 11, wherein the organic layer disposed between the first electrode and the second electrode includes a light-emitting layer composed of a host and a dopant, the boron compound represented by Chemical Formula A serving as the dopant.

14. The organic light-emitting diode of claim 13, wherein the light-emitting layer uses an anthracene derivative represented by the following Chemical Formula D as the host:

128

[Chemical Formula D]

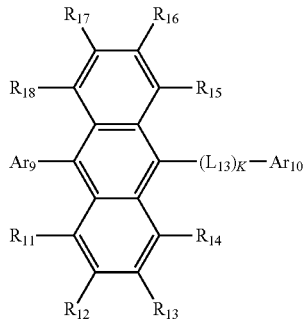

wherein,
$R_{11}$ to $R_{18}$, which are same or different, are each as defined for R in the boron compound represented by Chemical Formula A;
$Ar_9$ and $Ar_{10}$, which are same or different, are each independently any one selected from a substituted or unsubstituted alkyl of 1 to 30 carbon atoms, a substituted or unsubstituted aryl of 6 to 50 carbon atoms, a substituted or unsubstituted cycloalkyl of 3 to 30 carbon atoms, a substituted or unsubstituted heteroaryl of 2 to 50 carbon atoms, a substituted or unsubstituted alkylsilyl of 1 to 30 carbon atoms, and a substituted or unsubstituted arylsilyl of 6 to 30 carbon atoms;
$L_{13}$, which functions as a linker, is a single bond or is selected from a substituted or unsubstituted arylene of 6 to 20 carbon atoms, and a substituted or unsubstituted heteroarylene of 2 to 20 carbon atoms; and
k is an integer of 1 to 3, wherein when k is 2 or greater, the corresponding $L_{13}$'s are the same or different, and
the term substituted in the expression substituted or unsubstituted being as defined in Chemical Formula A of claim 1.

15. The organic light-emitting diode of claim 14, wherein $Ar_9$ in Chemical Formula D is a substituent represented by the following Chemical Formula D-1:

[Chemical Formula D-1]

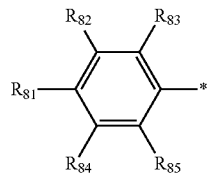

wherein, $R_{81}$ to $R_{85}$, which are same or different, are each independently any one selected from a hydrogen atom, a deuterium atom, a substituted or unsubstituted, linear, branched, or cyclic alkyl of 1 to 24 carbon atoms, a substituted or unsubstituted, linear, branched, or cyclic halogenated alkyl of 1 to 24 carbon atoms, a substituted or unsubstituted aryl of 6 to 24 carbon atoms, a substituted or unsubstituted heteroaryl of 2 to 24 carbon atoms, a substituted or unsubstituted alkylsilyl of 1 to 24 carbon atoms, a substituted or unsubstituted arylsilyl of 6 to 24 carbon atoms, a nitro, a cyano, and a halogen; and
each of the $R_{81}$ to $R_{85}$, other than hydrogen or deuterium may be linked to an adjacent one to form a saturated or unsaturated cyclic ring.

16. The organic light-emitting diode of claim 14, wherein $L_{13}$ is a single bond or a substituted or unsubstituted arylene of 6 to 20 carbon atoms, and k is 1 or 2, with a proviso that when k is 2, corresponding $L_{13}$'s are the same or different.

17. The organic light-emitting diode of claim 14, wherein the anthracene derivative is any one selected from the compounds represented by the following [Chemical Formula D1] to [Chemical Formula D48]:

<Chemical Formula D1>

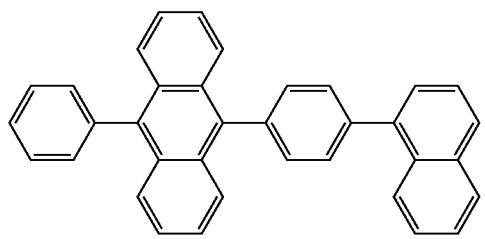

<Chemical Formula D2>

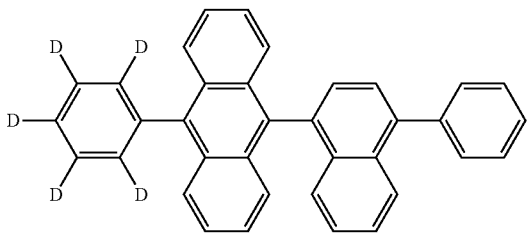

<Chemical Formula D3>

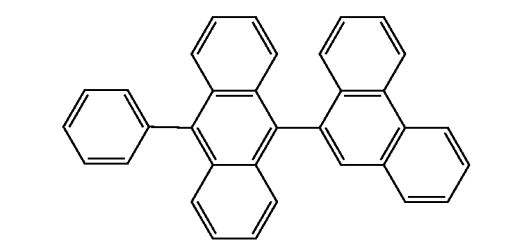

<Chemical Formula D4>

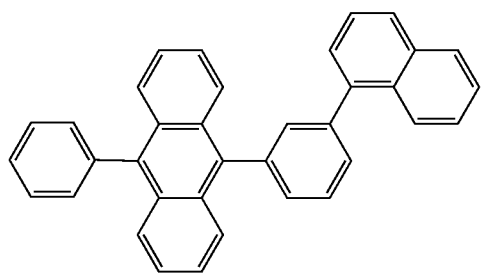

<Chemical Formula D5>

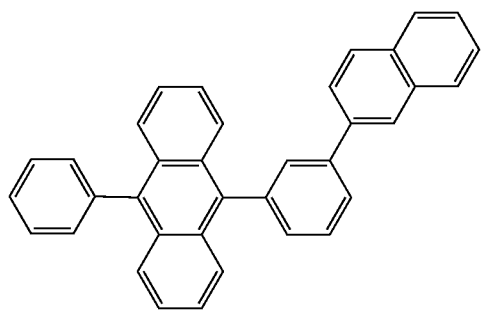

-continued

<Chemical Formula D 6>

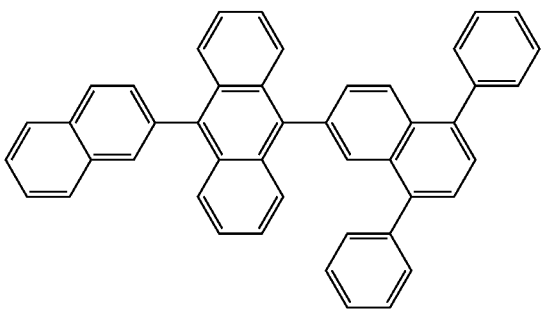

<Chemical Formula D7>

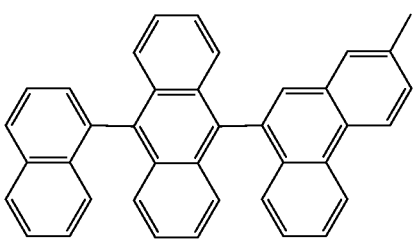

<Chemical Formula D8>

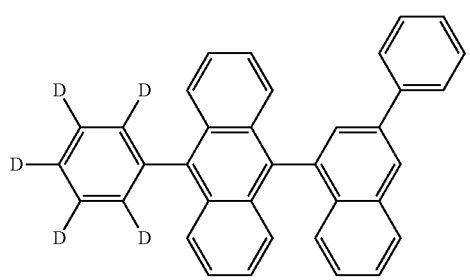

<Chemical Formula D9>

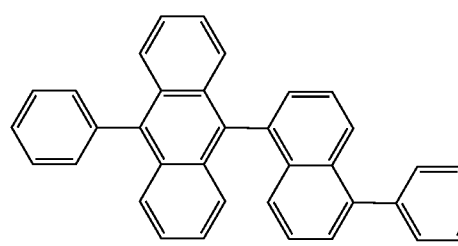

<Chemical Formula D10>

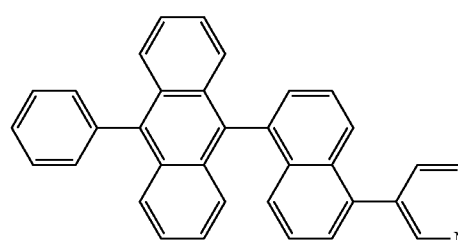

<Chemical Formula D11>
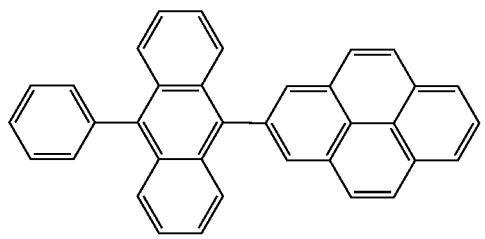
<Chemical Formula D12>
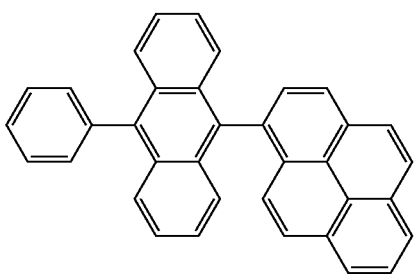
<Chemical Formula D13>
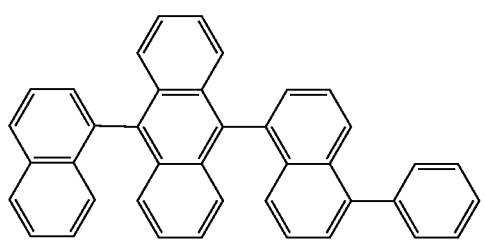
<Chemical Formula D14>
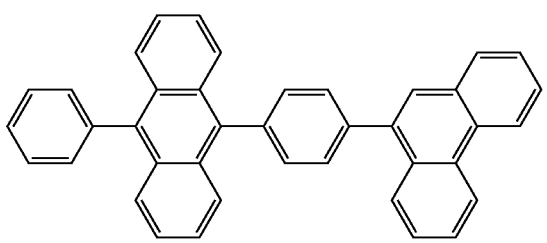
<Chemical Formula D15>
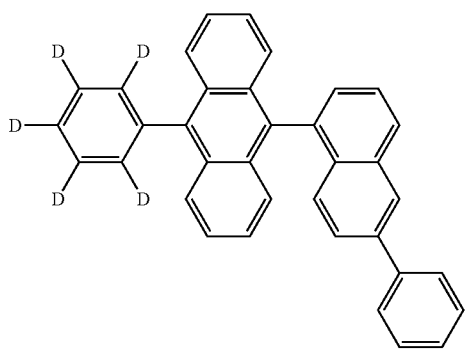
<Chemical Formula D16>
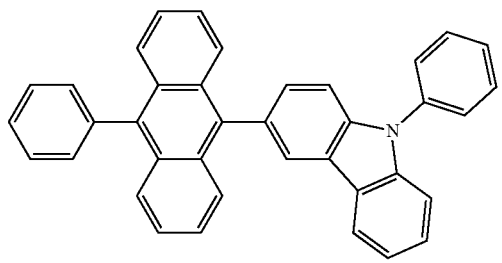
<Chemical Formula D17>
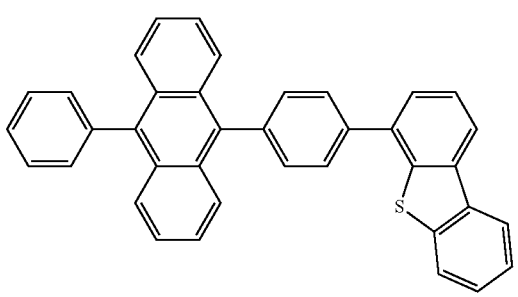
<Chemical Formula D18>
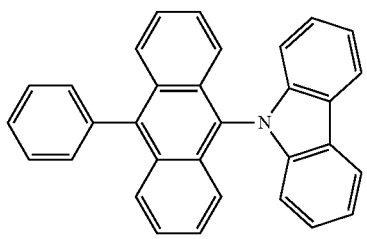
<Chemical Formula D19>
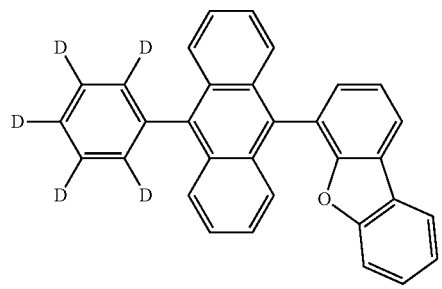
<Chemical Formula D20>
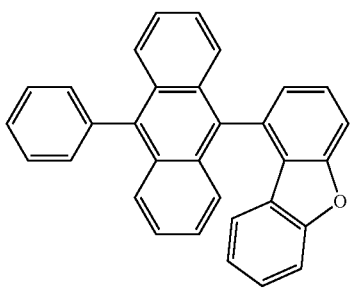

<Chemical Formula D21>
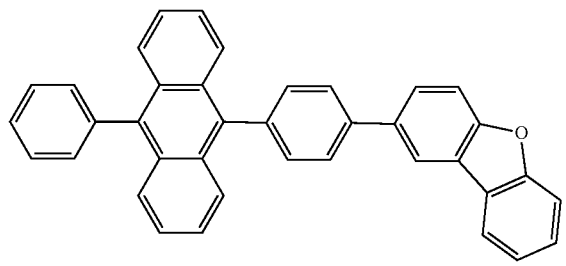
<Chemical Formula D22>
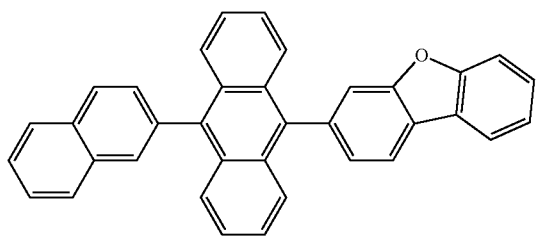
<Chemical Formula D23>
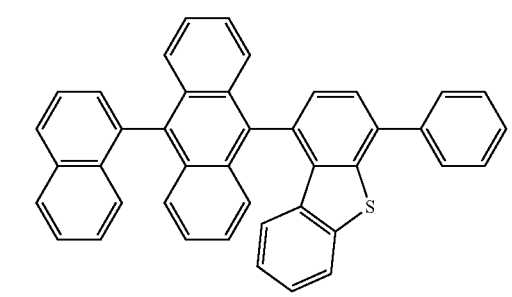
<Chemical Formula D24>
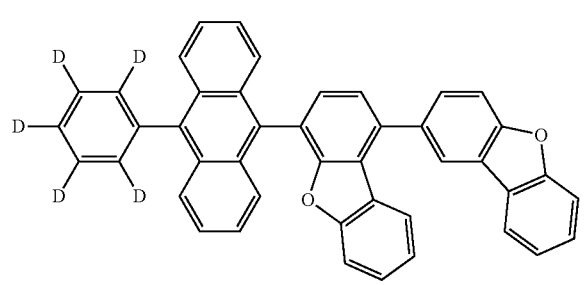
<Chemical Formula D25>
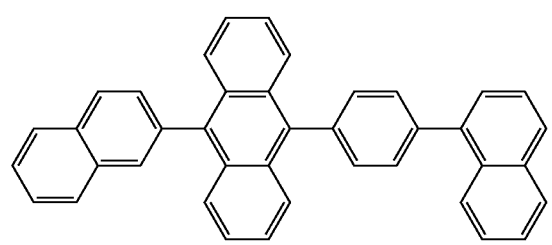
<Chemical Formula D26>
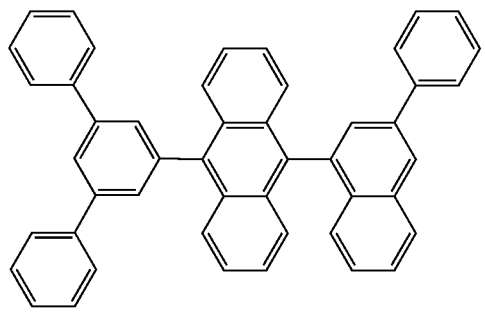
<Chemical Formula D27>
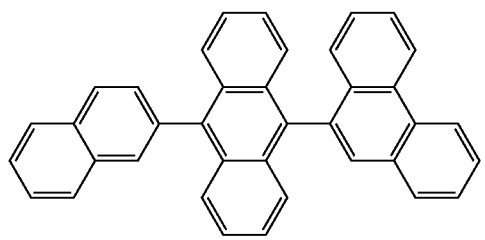
<Chemical Formula D28>
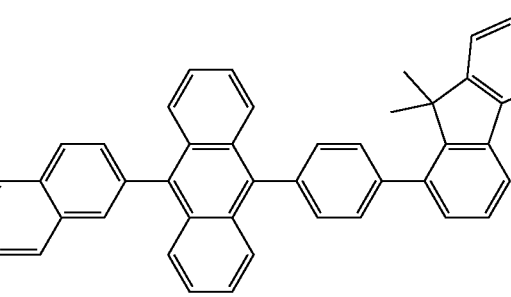
<Chemical Formula D29>
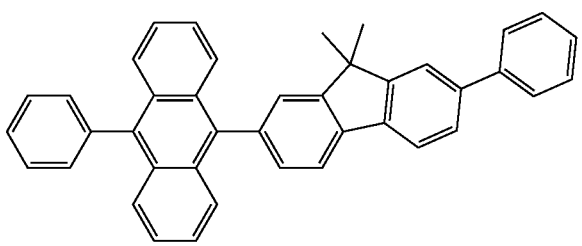
<Chemical Formula D30>
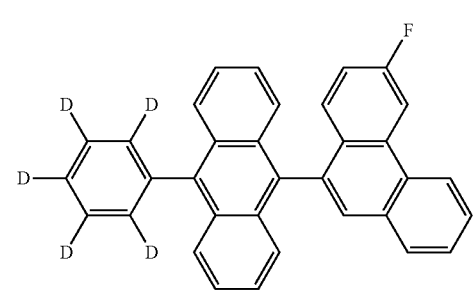

<Chemical Formula D31>
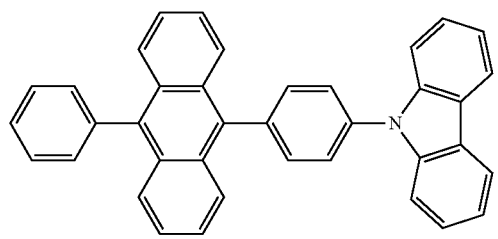
<Chemical Formula D32>
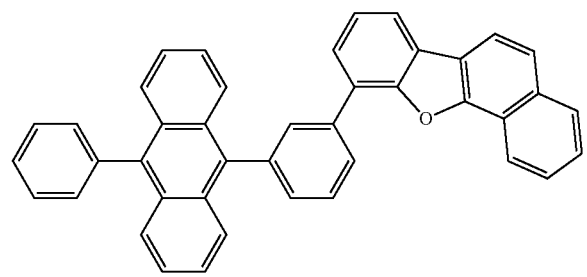
<Chemical Formula D33>
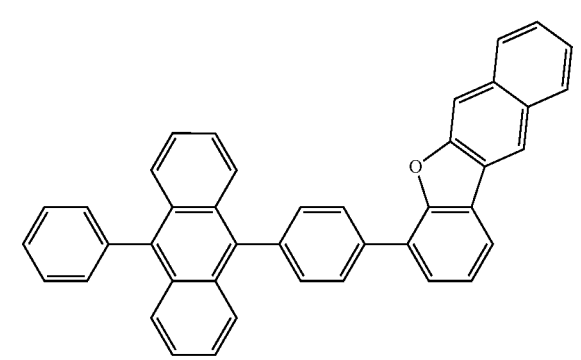
<Chemical Formula D34>
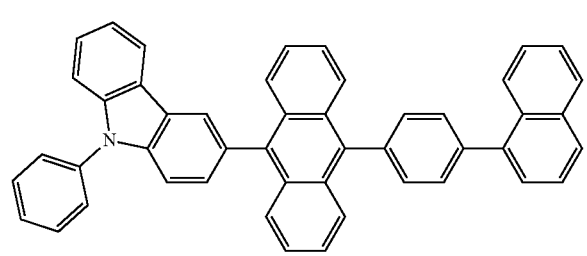
<Chemical Formula D35>
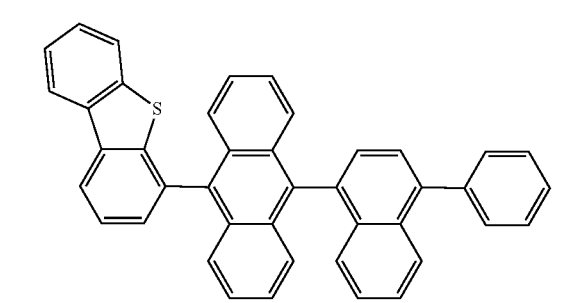
<Chemical Formula D36>
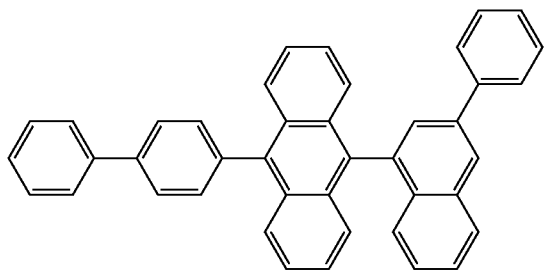
<Chemical Formula D37>
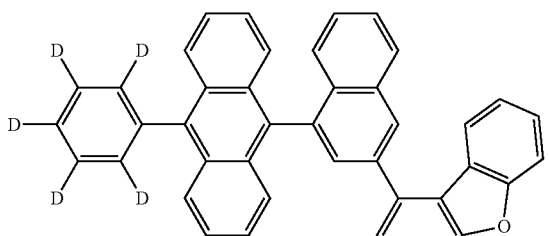
<Chemical Formula D38>
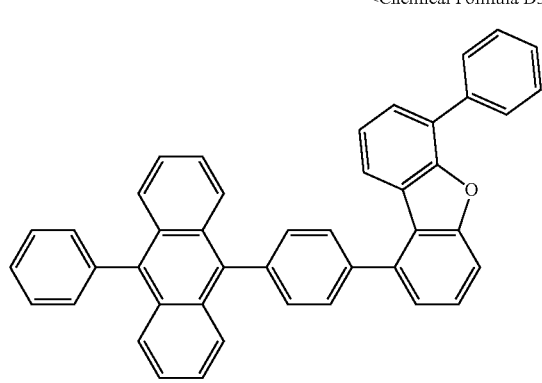
<Chemical Formula D39>
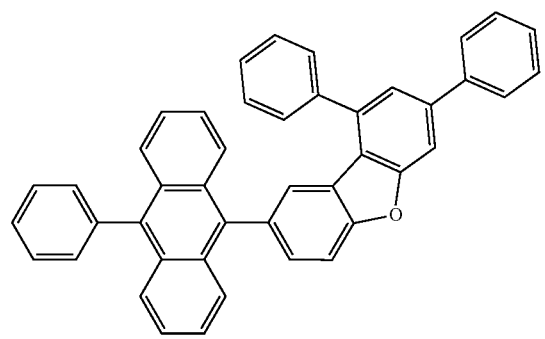
<Chemical Formula D40>
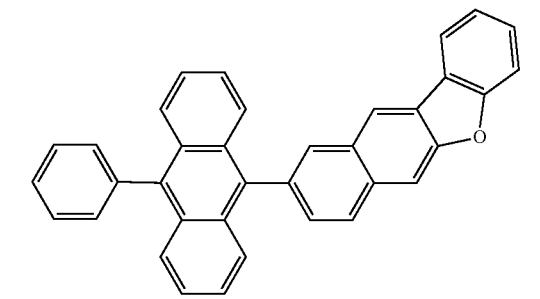

-continued

<Chemical Formula D41>

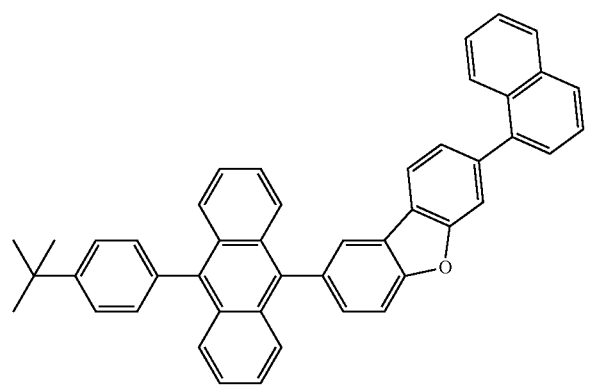

<Chemical Formula D42>

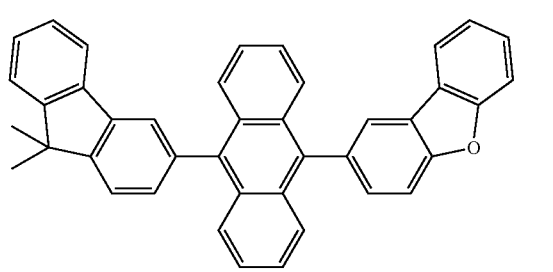

<Chemical Formula D43>

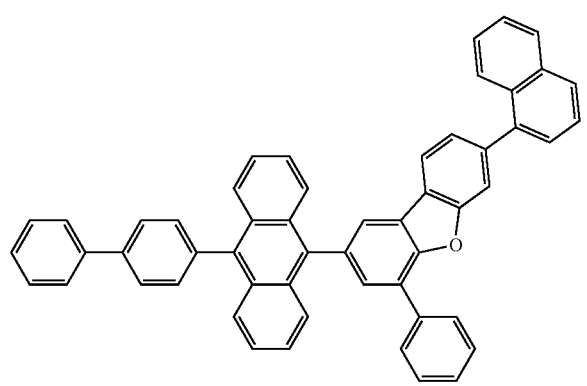

<Chemical Formula D44>

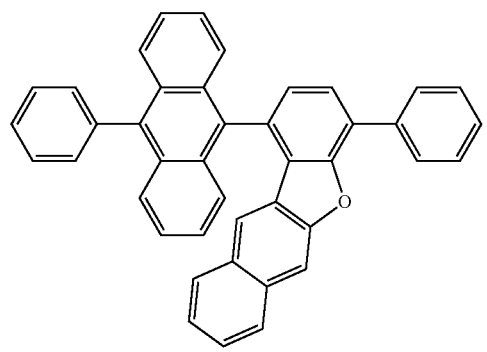

-continued

<Chemical Formula D45>

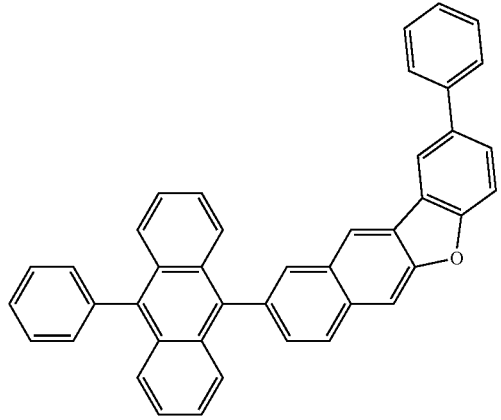

<Chemical Formula D46>

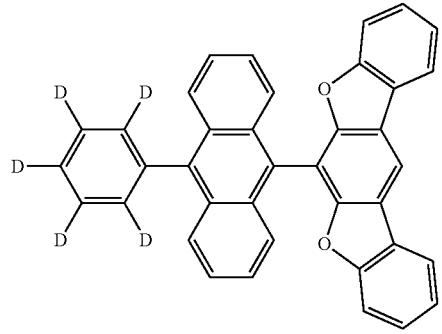

<Chemical Formula D47>

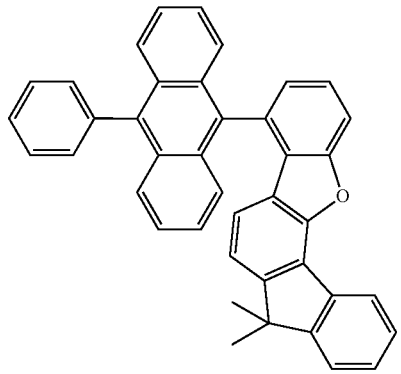

<Chemical Formula D48>

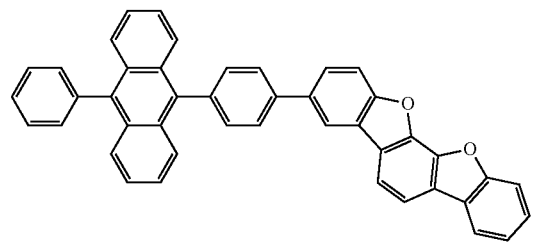

18. The organic light-emitting diode of claim 12, wherein at least one selected from among the layers is deposited using a single-molecule deposition process or a solution process.

19. The organic light-emitting diode of claim 11, wherein the organic light-emitting diode is used for a device selected from among a flat display device; a flexible display device;

a monochrome or grayscale flat illumination; and a monochrome or grayscale flexible illumination.

\* \* \* \* \*